US008781056B2

(12) United States Patent
Hyde et al.

(10) Patent No.: US 8,781,056 B2
(45) Date of Patent: Jul. 15, 2014

(54) ELECTROMAGNETIC FLOW REGULATOR, SYSTEM, AND METHODS FOR REGULATING FLOW OF AN ELECTRICALLY CONDUCTIVE FLUID

(75) Inventors: Roderick A. Hyde, Redmond, WA (US); Muriel Y. Ishikawa, Livermore, CA (US); Jon D. McWhirter, Kirkland, WA (US); Ashok Odedra, Bellevue, WA (US); Joshua C. Walter, Kirkland, WA (US); Kevan D. Weaver, Redmond, WA (US); Lowell L. Wood, Jr., Bellevue, WA (US)

(73) Assignee: TerraPower, LLC., Bellevue, WA (US)

( * ) Notice: Subject to any disclaimer, the term of this patent is extended or adjusted under 35 U.S.C. 154(b) by 764 days.

(21) Appl. No.: 12/930,147

(22) Filed: Dec. 28, 2010

(65) Prior Publication Data

US 2012/0085419 A1    Apr. 12, 2012

Related U.S. Application Data

(63) Continuation-in-part of application No. 12/924,914, filed on Oct. 6, 2010, now Pat. No. 8,397,760.

(51) Int. Cl.
*G21C 7/32* (2006.01)
*H02K 44/02* (2006.01)
*G21C 7/00* (2006.01)
*H02K 44/00* (2006.01)

(52) U.S. Cl.
USPC ........... 376/210; 376/207; 376/219; 376/228; 376/229; 417/48; 417/50

(58) Field of Classification Search
USPC ......... 376/207, 210, 211, 212, 219, 220, 228, 376/229, 242, 245, 250, 251, 253, 256, 277, 376/283, 287, 293, 294, 347, 361, 402–406, 376/463; 417/48, 50; 188/266, 267.2; 137/561 R, 599.01, 601.14, 625, 137/625.28, 803, 807, 825, 827, 909
See application file for complete search history.

(56) References Cited

U.S. PATENT DOCUMENTS

| 1,757,059 | A |   | 5/1930  | Rickenberg |           |
|-----------|---|---|---------|------------|-----------|
| 2,558,698 | A | * | 6/1951  | Wade       | 417/50    |
| 2,770,590 | A | * | 11/1956 | Serduke    | 417/50    |
| 3,377,251 | A | * | 4/1968  | Hanthorn et al. | 376/212 |
| 3,575,804 | A | * | 4/1971  | Ripley     | 376/229   |
| 3,612,860 | A | * | 10/1971 | Hackney    | 376/253   |
| 3,830,095 | A | * | 8/1974  | Jaross     | 376/256   |
| 4,048,011 | A | * | 9/1977  | Kovin et al. | 376/404 |
| 4,207,919 | A |   | 6/1980  | Hutton     |           |
| 4,225,387 | A |   | 9/1980  | Gatley     |           |
| 4,362,694 | A | * | 12/1982 | Kayser     | 376/405   |

(Continued)

OTHER PUBLICATIONS

PCT International Search Report; International App. No. PCT/US 11/01653; Feb. 22, 2012; pp. 1-2.

(Continued)

*Primary Examiner* — Bernarr Gregory

(57) ABSTRACT

Disclosed embodiments include electromagnetic flow regulators for regulating flow of an electrically conductive fluid, systems for regulating flow of an electrically conductive fluid, methods of regulating flow of an electrically conductive fluid, nuclear fission reactors, systems for regulating flow of an electrically conductive reactor coolant, and methods of regulating flow of an electrically conductive reactor coolant in a nuclear fission reactor.

51 Claims, 81 Drawing Sheets

(56) References Cited

U.S. PATENT DOCUMENTS

| | | | |
|---|---|---|---|
| 4,367,194 A | | 1/1983 | Schenewerk et al. |
| 4,382,907 A | * | 5/1983 | Robin .................... 376/283 |
| 4,412,785 A | | 11/1983 | Roman |
| 4,527,955 A | * | 7/1985 | Duncombe et al. ........ 417/50 |
| 4,608,224 A | * | 8/1986 | Brachet .................. 376/405 |
| 4,655,237 A | | 4/1987 | Gloor et al. |
| 4,687,418 A | | 8/1987 | Gotou et al. |
| 4,698,203 A | | 10/1987 | Ehlers et al. |
| 4,765,948 A | | 8/1988 | DeLuca et al. |
| 4,773,826 A | * | 9/1988 | Mole ....................... 417/50 |
| 4,802,531 A | | 2/1989 | Nathenson et al. |
| 4,808,080 A | | 2/1989 | Alexion et al. |
| 4,824,329 A | * | 4/1989 | Yamamoto et al. ....... 417/50 |
| 4,828,459 A | * | 5/1989 | Behrens .................. 417/50 |
| 4,841,834 A | | 6/1989 | Gruden |
| 4,842,054 A | | 6/1989 | Nathenson et al. |
| 4,869,647 A | | 9/1989 | Aoyama et al. |
| 4,905,757 A | * | 3/1990 | Boardman et al. ....... 376/405 |
| 4,949,362 A | | 8/1990 | Gaubatz |
| 4,974,707 A | | 12/1990 | Neumann et al. |
| 5,021,211 A | * | 6/1991 | Hunsbedt et al. ........ 376/404 |
| 5,094,803 A | * | 3/1992 | Nishiguchi ............... 376/405 |
| 5,137,045 A | | 8/1992 | Gerber et al. |
| 5,229,067 A | * | 7/1993 | Hammers ................ 376/294 |
| 5,263,068 A | * | 11/1993 | Dahl et al. ............... 376/404 |
| 5,263,070 A | * | 11/1993 | Kumaoka ................ 376/406 |
| 5,265,136 A | * | 11/1993 | Yamazaki et al. ........ 376/405 |
| 5,333,646 A | | 8/1994 | Delot |
| 5,420,897 A | * | 5/1995 | Kasai et al. ............. 376/220 |
| 5,440,600 A | * | 8/1995 | Fanning .................. 376/463 |
| 5,530,308 A | | 6/1996 | Fanning et al. |
| 5,621,776 A | * | 4/1997 | Gaubatz .................. 376/242 |
| 5,816,376 A | | 10/1998 | Hatori |
| 5,917,393 A | | 6/1999 | Kupiszewski et al. |
| 6,044,858 A | | 4/2000 | Nathenson |
| 6,217,825 B1 | | 4/2001 | Brückner et al. |
| 6,315,029 B1 | | 11/2001 | Cho et al. |
| 6,327,323 B1 | | 12/2001 | Rohde et al. |
| 7,588,131 B2 | | 9/2009 | Steinwender |
| 8,397,760 B2 | * | 3/2013 | Hyde et al. .................... 376/210 |
| 2004/0096026 A1 | | 5/2004 | Choe et al. |
| 2004/0247067 A1 | | 12/2004 | Hattori et al. |
| 2008/0050247 A1 | | 2/2008 | Peysakhovich et al. |
| 2008/0123795 A1 | | 5/2008 | Hyde et al. |
| 2008/0123797 A1 | | 5/2008 | Hyde et al. |
| 2008/0277004 A1 | | 11/2008 | Hagseth et al. |
| 2009/0080587 A1 | | 3/2009 | Ahlfeld et al. |
| 2009/0190710 A1 | | 7/2009 | Sakai et al. |
| 2010/0065992 A1 | | 3/2010 | Ahlfeld et al. |
| 2010/0067641 A1 | | 3/2010 | Yokoyama et al. |
| 2010/0071883 A1 | | 3/2010 | Vetrovec |
| 2010/0266088 A1 | | 10/2010 | Ahlfeld et al. |
| 2011/0174406 A1 | | 7/2011 | Morgenstern |
| 2011/0297239 A1 | | 12/2011 | Nikrityuk et al. |

OTHER PUBLICATIONS

PCT International Search Report; International App. No. PCT/US 11/01652; Feb. 27, 2012; pp. 1-2.
PCT International Search Report; International App. No. PCT/US 11/01651; Feb. 27, 2012; pp. 1-2.
PCT International Search Report; International App. No. PCT/US11/01654; May 1, 2012; pp. 1-2.
PCT International Search Report; International App. No. PCT/US2011/001649; Jan. 13, 2012; pp. 1-2.
PCT International Search Report under Article 18, Rules 43 and 44; Application No. PCT/US 11/01650; Feb. 21, 2012; pp. 1-2.
PCT International Search Report; International App. No. PCT/US11/01637; Feb. 23, 2012; pp. 1-2.
Baker, R. S.; "Design of an Eddy-Current Brake for a Sodium-Cooled Nuclear Power Reactor"; Atomics International; bearing a date of Jul. 10, 1958; pp. 1-13; North American Aviation, Inc.

\* cited by examiner

ELECTROMAGNETIC FLOW REGULATOR, SYSTEM, AND METHODS FOR REGULATING FLOW OF AN ELECTRICALLY CONDUCTIVE FLUID

RELATED APPLICATIONS

The present application is a continuation-in-part of U.S. patent application Ser. No. 12/924,914, entitled ELECTROMAGNETIC FLOW REGULATOR, SYSTEM, AND METHODS FOR REGULATING FLOW OF AN ELECTRICALLY CONDUCTIVE FLUID, naming Roderick A. Hyde, Muriel Y. Ishikawa, Jon D. McWhirter, Ashok Odedra, Joshua C. Walter, Kevan D. Weaver, and Lowell L. Wood, Jr. as inventors, filed Oct. 6, 2010, which is currently or is an application of which a currently application is entitled to the benefit of the filing date now U.S. Pat. No. 8,397,760.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

BACKGROUND

This application generally relates to regulating flow of an electrically conductive fluid.

SUMMARY

Disclosed embodiments include electromagnetic flow regulators for regulating flow of an electrically conductive fluid, systems for regulating flow of an electrically conductive fluid, methods of regulating flow of an electrically conductive fluid, nuclear fission reactors, systems for regulating flow of an electrically conductive reactor coolant, and methods of regulating flow of an electrically conductive reactor coolant in a nuclear fission reactor.

In addition to the foregoing, various other method and/or device aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

While the specification concludes with claims particularly pointing-out and distinctly claiming the subject matter of the present disclosure, it is believed the disclosure will be better understood from the following detailed description when taken in conjunction with the accompanying drawings. In addition, the use of the same symbols in different drawings will typically indicate similar or identical items.

FIG. 2I is a flowchart of details of the method of FIG. 2H;

FIGS. 6H-6J are partial cutaway top plan views in partial schematic form of other illustrative reactor cores;

FIGS. 7U-7AH are flowcharts of details of the method of FIG. 7T;

FIG. 7AI is a flowchart of an illustrative method of regulating flow of another electrically conductive reactor coolant; and FIGS. 7AJ-7AW are flowcharts of details of the method of FIGURE. 7I.

DETAILED DESCRIPTION

Figure 1A:
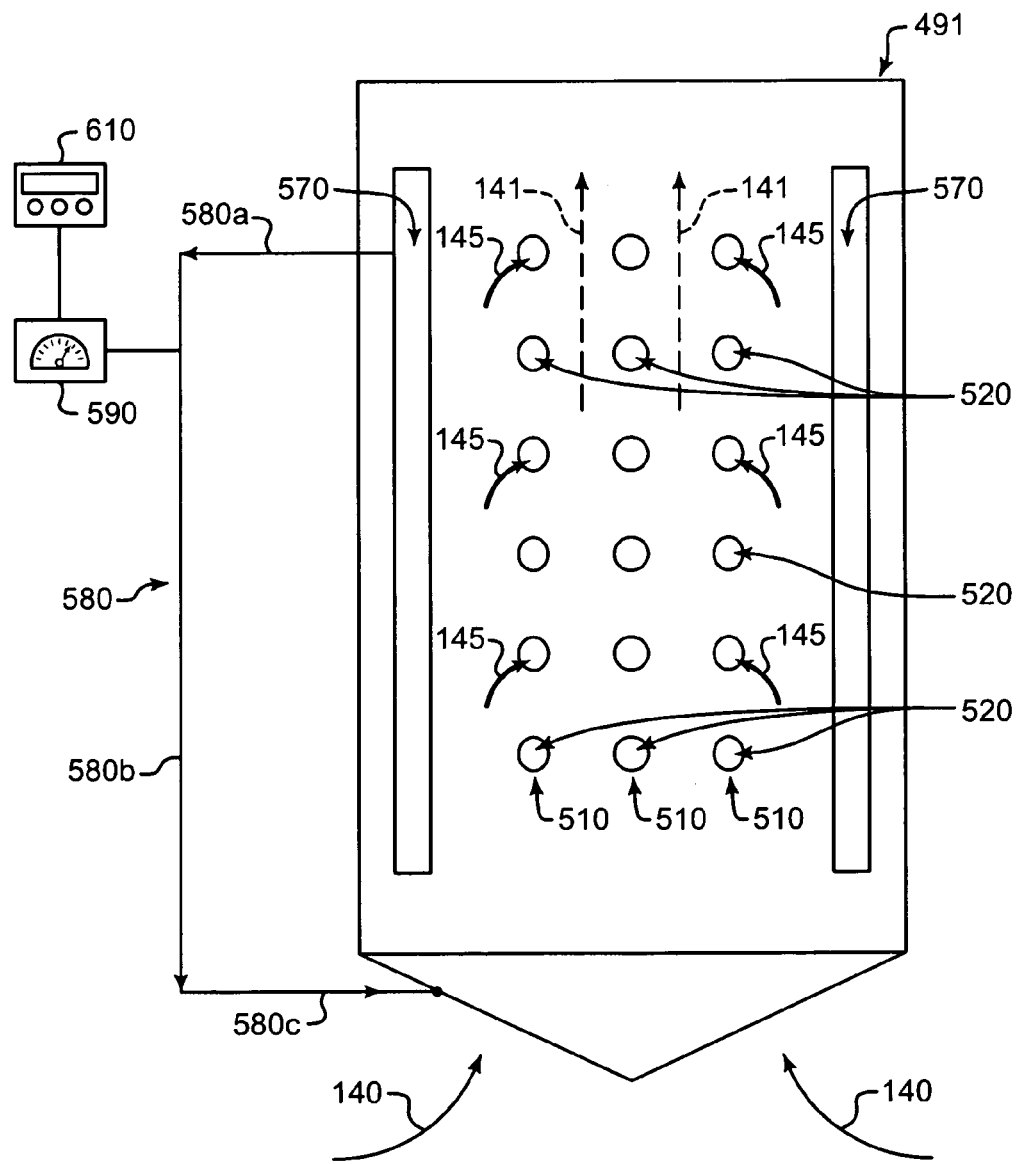
FIG. 1A is a side plan view in partial schematic form of an illustrative electromagnetic flow regulator.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

In addition, the present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Moreover, the herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to," "configurable to," "operable/operative to," "adapted/adaptable," "able to," "conformable/conformed to," etc. can generally encompass active-state components and/or inactive-state components and/or standby-state components, unless context requires otherwise.

Illustrative Electromagnetic Flow Regulator, Systems, and Methods

Given by way of overview and referring to FIG. 1A, an illustrative electromagnetic flow regulator 490 is provided for regulating flow of an electrically conductive fluid. Magnetic conductors 510 are arranged in fixed relative location, such as by being attached to a frame 491. The magnetic conductors 510 define therealong a fluid flow path 141 for an electrically conductive fluid through the electromagnetic flow regulator 490. The magnetic conductors 510 define therethrough a fluid inlet path for the electrically conductive fluid that is substantially orthogonal to the fluid flow path 141. A field generation winding 570 that is capable of carrying an electrical current is electromagnetically couplable to the magnetic conductors 510 such that at least one magnetic field is generatable by the field generation winding 570 at the fluid inlet path.

In some embodiments the fluid inlet path may be defined by flow holes 520 that are defined in the magnetic conductors 510. In addition, the fluid flow path 141 through the electromagnetic flow regulator 490 may be defined inboard of the magnetic conductors 510.

The electromagnetic flow regulator 490 may be supplied with electrical power from a power supply 590 via an electrical circuit 580 (and its circuit segments 580a, 580b, and 580c). In some embodiments the power supply 590 may be controlled by a control unit 610. Illustrative details of the power supply 590 and the control unit will be set forth further below.

It will be appreciated that various embodiments of the electromagnetic flow regulator 490 may be provided for various applications, as desired. Given by way of nonlimiting example, an illustrative electromagnetic flow regulator 490a, that may regulate flow of the electrically conductive fluid by restricting flow of the electrically conductive fluid, will be discussed first. Another illustrative electromagnetic flow regulator 490b, that may regulate flow of the electrically conductive fluid by restricting flow of the electrically conductive fluid and/or forcing flow of the electrically conductive fluid, will then be discussed.

It will be appreciated that the electromagnetic flow regulators 490a and 490b may be used as desired for a particular application. Therefore, system-level applications and host environments will be described herein with reference to the electromagnetic flow regulator 490. Thus, references made herein to the electromagnetic flow regulator 490 in the context of system-level applications and host environments also encompass the electromagnetic flow regulator 490a and the electromagnetic flow regulator 490b. That is, any reference made herein to the electromagnetic flow regulator 490 in the context of system-level applications and host environments is also a reference to the electromagnetic flow regulator 490a or the electromagnetic flow regulator 490b or both the electromagnetic flow regulator 490a and the electromagnetic flow regulator 490b.

Still given by way of overview and still referring to FIG. 1A, the following information is provided as a high-level introduction to some aspects of the electromagnetic flow regulator 490a. As such, the following information is provided in addition to the information set forth above for the electromagnetic flow regulator 490 (which need not be repeated for an understanding). To that end, in various embodiments of the electromagnetic flow regulator 490a the field generation winding 570 is disposed outboard of the magnetic conductors 510. In some embodiments the field generation winding 570 may include a helical coil and in some other embodiments the field generation winding 570 may include substantially circular coils. In some embodiments magnetic nonconductors 530 may be attached to the frame 491 and disposed between adjacent ones of the magnetic conductors 510. In such cases the fluid flow path 141 is further defined along the magnetic nonconductors 530.

Figure 1B:
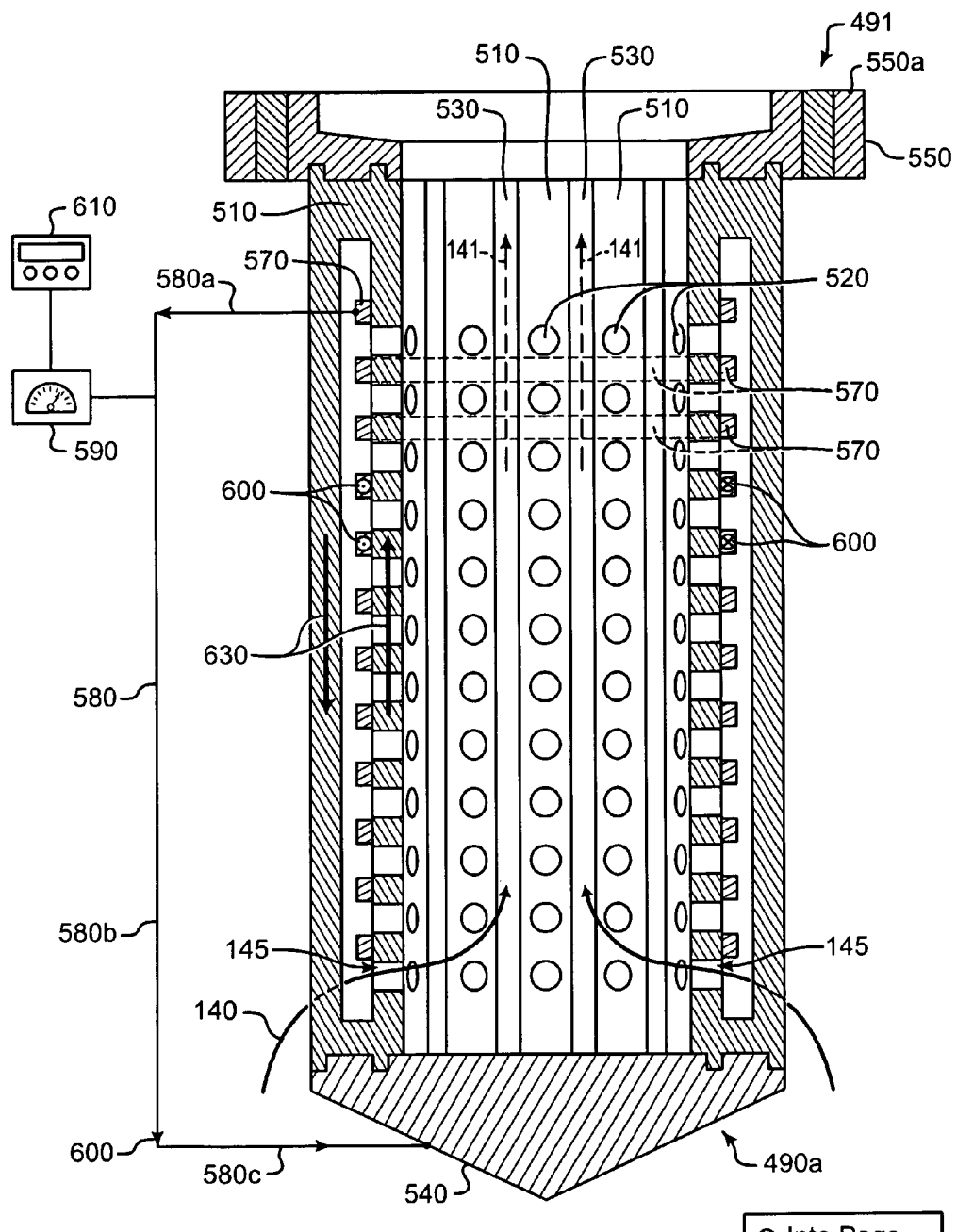
FIG. 1B is a side plan view in partial schematic form of another illustrative electromagnetic flow regulator.

An illustrative embodiment of the electromagnetic flow regulator 490a will now be set forth by way of nonlimiting example. Referring now to FIG. 1B and given by way of overview, the magnetic conductors 510 are arranged in fixed relative location, such as by being attached to the frame 491. The magnetic conductors 510 define therealong the fluid flow path 141 for the electrically conductive fluid through the electromagnetic flow regulator 490a. The magnetic conductors 510 define therethrough the flow holes 520 that define the fluid inlet path for the electrically conductive fluid that is substantially orthogonal to the fluid flow path 141. The field generation winding 570 that is capable of carrying an electrical current is disposed outboard of the magnetic conductors 510. The field generation winding 570 is electromagnetically couplable to the magnetic conductors 510 such that at least one magnetic field is generatable by the field generation winding 570 at the fluid inlet path.

Still referring to FIG. 1B and still by way of overview, in some embodiments the fluid flow path 141 through the electromagnetic flow regulator 490a may be further defined inboard of the magnetic conductors 510. In some embodiments magnetic nonconductors 530 may be attached to the frame 491 and disposed between adjacent ones of the magnetic conductors 510. In such cases, the fluid flow path 141 through the electromagnetic flow regulator 490a may be further defined along the magnetic nonconductors 530, such as by being defined inboard of the magnetic nonconductors 530. In some embodiments the field generation winding 570 may include a helical coil and in some other embodiments the field generation winding 570 may include substantially circular coils.

Now that an overview has been given, the structure and operation of the electromagnetic flow regulator 490a—that can restrict the flow of the electrically conductive fluid—will now be described.

Still referring to FIG. 1B, adjacent magnetic conductors 510 conduct a magnetic field 630 that is generated by an electrical current 600 that flows through the field generation winding 570. The magnetic conductors 510 may be made of cast iron, carbon steels, or specialty commercial alloys such as permalloys Deltamax and Sendust. In one embodiment, the magnetic conductors 510 may be upright, elongate, spaced-apart, and arranged in a generally cylindrical or tubular configuration for matingly disposing electromagnetic flow regulator 490a into a device, system, host environment, or the like through which flow of the electrically conductive fluid is to be regulated by the electromagnetic flow regulator 490a. Each magnetic conductor 510 may have a square, rectangular, parallelpiped, circular, or any other suitable transverse cross-section.

Each of the adjacent magnetic conductors 510 defines one or more flow holes 520 for allowing flow of the electrically conductive fluid through the magnetic conductors 510. The magnetic conductor 510 is used to concentrate the magnetic field potential within or in the vicinity of the conductive fluid flow path. It will be appreciated that the flow holes 520 are located at the portions 145 of the flow path 140. It will also be appreciated that the flow path through the interior of the electromagnetic flow regulator 490a of the electrically conductive fluid is defined along the magnetic conductors 510—that is, inboard of the magnetic conductors 510. It will further be appreciated that the inlet flow path of the electrically conductive fluid through the flow holes 520 is substantially orthogonal to the flow path through the interior of the electromagnetic flow regulator 490a of the electrically conductive fluid.

Interposed between adjacent ones of the magnetic conductors 510 are respective ones of magnetic nonconductors 530. The magnetic nonconductors 530 act to limit magnetic potential in areas outside the portions 145 of the electrically conductive fluid flow path 140. Proper use of magnetic conductors and non-conductors may help to maximize the magnetic field strength observed by the electrically conductive fluid in the area of the conductive fluid at the portions 145 of the flow path 140 for a given electrical current applied to the electromagnetic flow regulator 490a. The magnetic nonconductors 530 may be made of Type 300 stainless steel or the like. It will be appreciated that the flow path through the interior of the electromagnetic flow regulator 490a of the electrically conductive fluid is, therefore, also defined along the magnetic nonconductors 530—that is, inboard of the magnetic nonconductors 530.

It will be appreciated that the selection of the number of flow holes 520 involves consideration of the electrically conductive fluid's frictional flow resistance and the ability to provide a uniform magnetic field over the length and cross sectional flow area of the portions 145 of the flow path 140. In some embodiments, multiple flow holes 520 have been chosen such that the magnetic field requirement is reduced and the frictional loses are minimized.

Figure 1C:
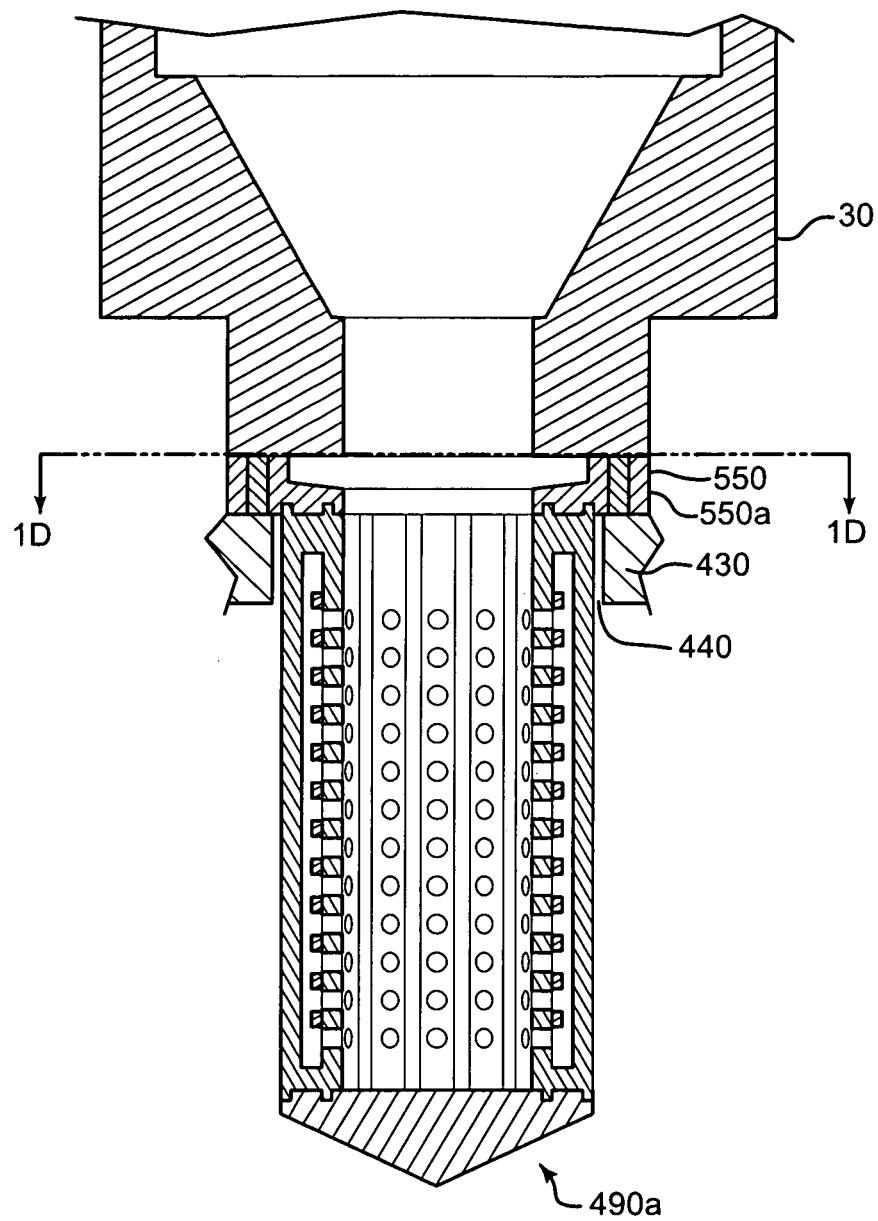
FIG. 1C is a partial cutaway side plan view of the electromagnetic flow regulator of FIG. 1B.
Figure 1D:
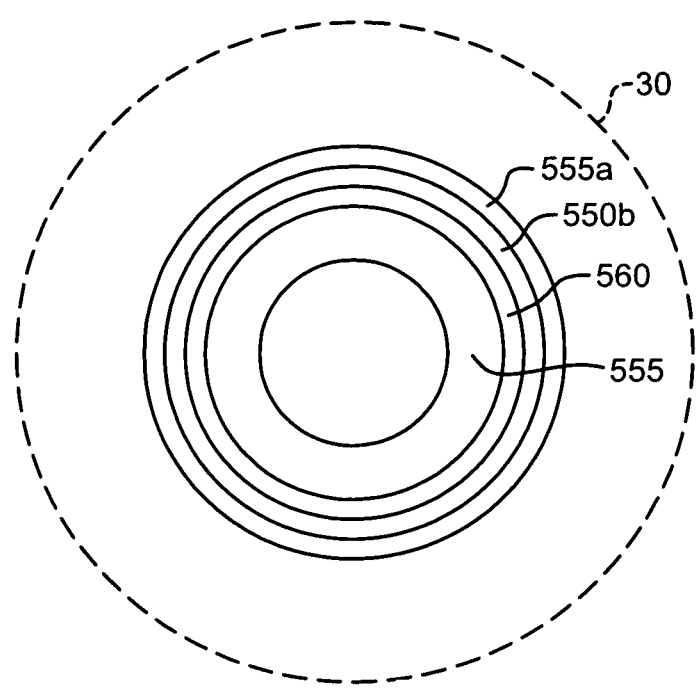
FIG. 1D is a view taken along section line 1D-1D of FIG. 1C.

Referring additionally to FIGS. 1C and 1D, the frame 491 includes a base member 540 and a yoke 550. Upper and lower ends of the magnetic conductors 510 and the magnetic nonconductors 530 are attached to the frame 491. The lower ends of the magnetic conductors 510 and the magnetic nonconductors 530 are attached to the base member 540. Attaching the lower ends of the magnetic conductors 510 and the magnetic nonconductors 530 to the base member 540 fixes the lower ends of the magnetic conductors 510 and the magnetic nonconductors 530, such that the lower ends of the magnetic conductors 510 and the magnetic nonconductors 530 cannot laterally move. Thus, the base member 540 enhances vibrational and structural rigidity of the electromagnetic flow regulator 490a as the electrically conductive fluid flows through the electromagnetic flow regulator 490a. More specifically, the lower ends of the magnetic conductors 510 and the magnetic nonconductors 530 may be attached to the base member 540 by a pair of location tabs 510a and 510b. However, it will be appreciated that the lower ends of the magnetic conductors 510 and the magnetic nonconductors 530 may be attached to the base member 540 by welding or by any suitable means of attachment.

The disk-shaped yoke 550 fixes the upper ends of the magnetic conductors 510 and the magnetic nonconductors 530, such that the upper ends of the magnetic conductors 510 and the magnetic nonconductors 530 cannot laterally move. Thus, the yoke 550 enhances vibrational and structural rigidity of the electromagnetic flow regulator 490a as the relatively high-velocity electrically conductive fluid flows through the electromagnetic flow regulator 490a. The yoke 550 includes a first portion 550a and a second portion 550b. The second portion 550b is arranged inwardly concentrically with respect to the first portion 550a. The upper ends of the magnetic conductors 510 and the magnetic nonconductors 530 are suitably attached to the second portion 550b, such as by a pair of location tabs 550c and 550d. However, it will be appreciated that the upper ends of the magnetic conductors 510 and the magnetic nonconductors 530 may be attached to the second portion 550b of the yoke 550 by welding or by any suitable means of attachment In some embodiments the yoke 550 may have a recess 555 for mating engagement of the electromagnetic flow regulator 490a with the device, system, host environment, or the like, through which flow is to be regulated (indicated generally at 30). Interposed between the first portion 550a and the second portion 550b is an annular insulator portion 560 for isolating the electromagnetic circuit from the device, system, host environment, or the like 30 through which flow is to be regulated. The insulator portion 560 is a dielectric (i.e., electrically nonconducting substance) and may be made from any suitable material for resisting flow of an electric current. In this regard, the insulator portion 560 may be made of porcelain, glass, plastic (e.g., Bakelite), rubber, acrylic, polyurethane, or the like. Another purpose of the base member 540 and the yoke 550, when made from a magnetic material, is to provide magnetic containment at the top and bottom of the electromagnetic flow regulator 490a.

Referring now to FIGS. 1B and 1C, in some embodiments the field generation winding 570 (sometimes referred to as an induction coil) may helically surround the tubular configuration of the magnetic conductors 510 and the magnetic nonconductors 530. In such cases the helical induction coil 570 extends spirally along the tubular configuration defined by the magnetic conductors 510 and the magnetic nonconductors 530. In some other embodiments, the induction coil 570 need not helically surround the tubular configuration defined by the magnetic conductors 510 and the magnetic nonconductors 530. For example, in some other embodiments the induction coil 570 may include separate, spaced-apart induction coils 570. In such cases, each induction coil 570 encircles the tubular configuration of the magnetic conductors 510 and the magnetic nonconductors 530.

Regardless of form of the field generation winding 570, the induction coils 570 are coupled to the magnetic conductors 510 and are interposed between and near respective ones of the flow holes 520. A purpose of the induction coils 570 is to generate magnetic fields at or near respective ones of the flow holes 520. The induction coils 570 may be made from any suitable electrically conductive material such as copper, silver, aluminum, or the like.

Figure 1E:
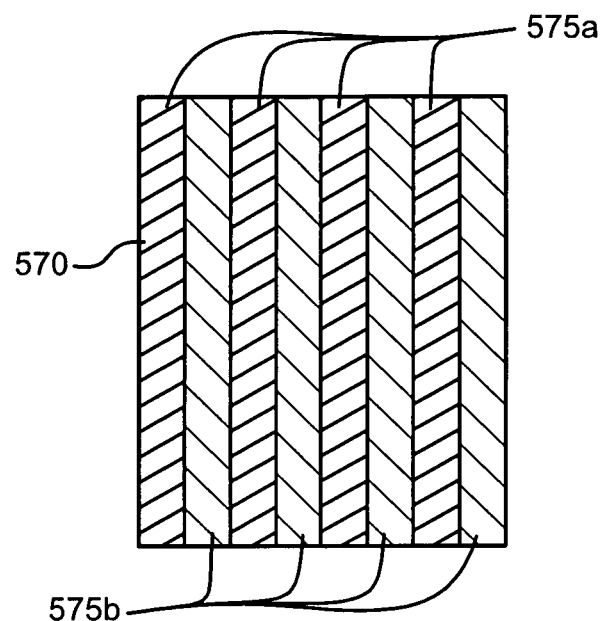
FIG. 1E is a magnified fragmentation view in transverse cross section of a detail of the electromagnetic flow regulator of FIG. 1B.

Moreover, the induction coils 570 may include adjacent current-carrying laminations or layers. Referring additionally to FIG. 1E, the laminations include a conductor layer 575a and an adjacent insulator layer 575b arranged side-by-side in an alternating fashion. The number of turns or layers in the current-carrying layers reduces the electrical current required to produce a magnetic field of a given strength.

Referring to FIG. 1B, the electromagnetic flow regulator 490a may be electrically coupled to an electrical circuit 580 that defines a circuit segment 580a having a first end thereof connected to the induction coil 570 and a second end thereof connected to a circuit segment 580b. In addition, the circuit 580 has a circuit segment 580c having a first end thereof connected to the circuit segment 580b and a second end thereof connected to the base member 540. In one embodiment, a power supply 590 is electrically connected to the electrical circuit 580 for supplying an electrical current to the induction coils 570. In this embodiment, the electrical current flows in the direction of directional arrows 600. The power supply 590 may be a direct current output power supply with variable output voltage. Such a commercially available power supply that may be suitable for this purpose may be available from Colutron Research Corporation located in Boulder, Colo. U.S.A.

A control unit 610 may be electrically connected to the power supply 590 for controlling and regulating the electric current supplied by the power supply 590. The magnitude of the magnetic force acting on the electrically conductive fluid is directly proportional to the output voltage of the power supply 590, such that varying the output voltage varies the magnitude of the force and flow rate of the electrically conductive fluid. In other words, increasing the output voltage increases the magnetic field and force acting on the electrically conductive fluid and decreasing the output voltage decreases the magnetic field and force acting on the electrically conductive fluid.

Figure 1F:
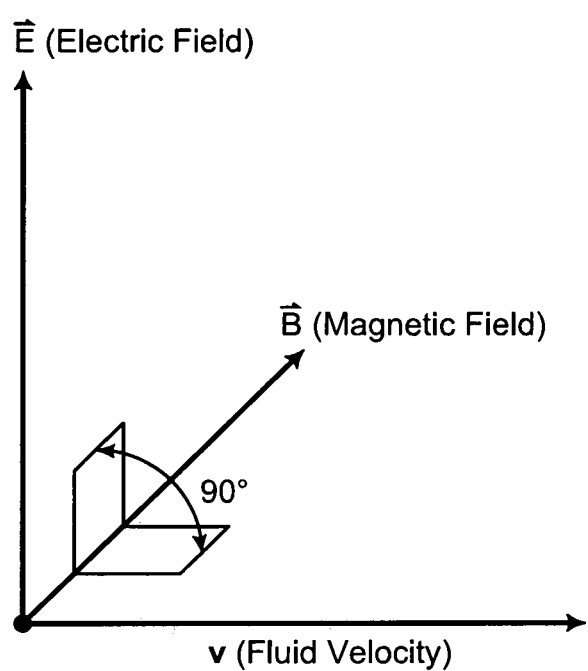
FIG. 1F is a graph of the relationship of velocity of an electrically conductive fluid, a magnetic field, and an induced electric field.
Figure 1G:
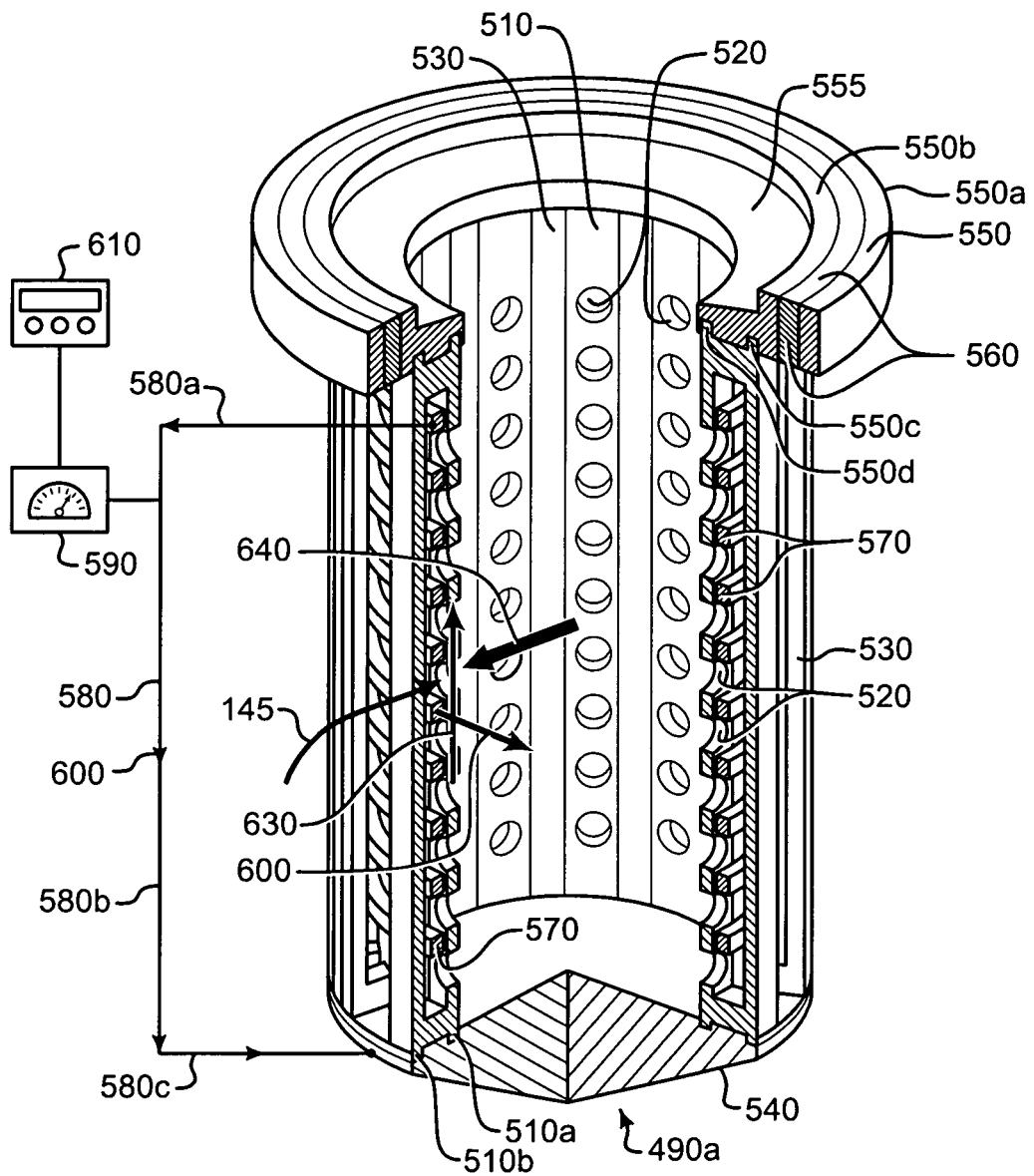
FIG. 1G is a partial cutaway perspective view of the electromagnetic flow regulator of FIG. 1B.
Figures 1H, 1I:
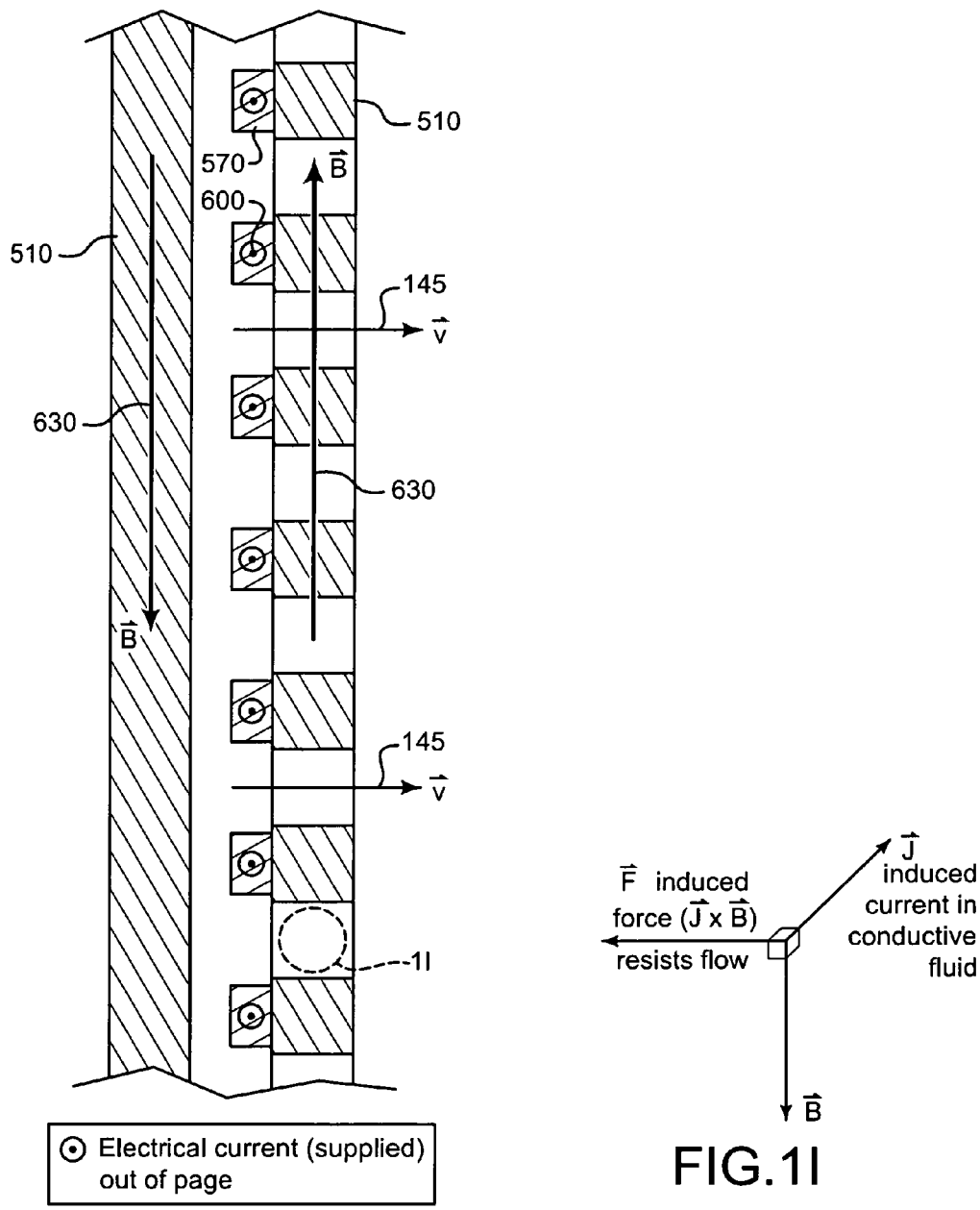
FIG. 1H is a is a magnified fragmentation view in transverse cross section of another detail of the electromagnetic flow regulator of FIG. 1B.
FIG. 1I is a graph of the relationship of induced current in an electrically conductive fluid, a magnetic field, and a resultant Lorentz force.
Figure 1J:
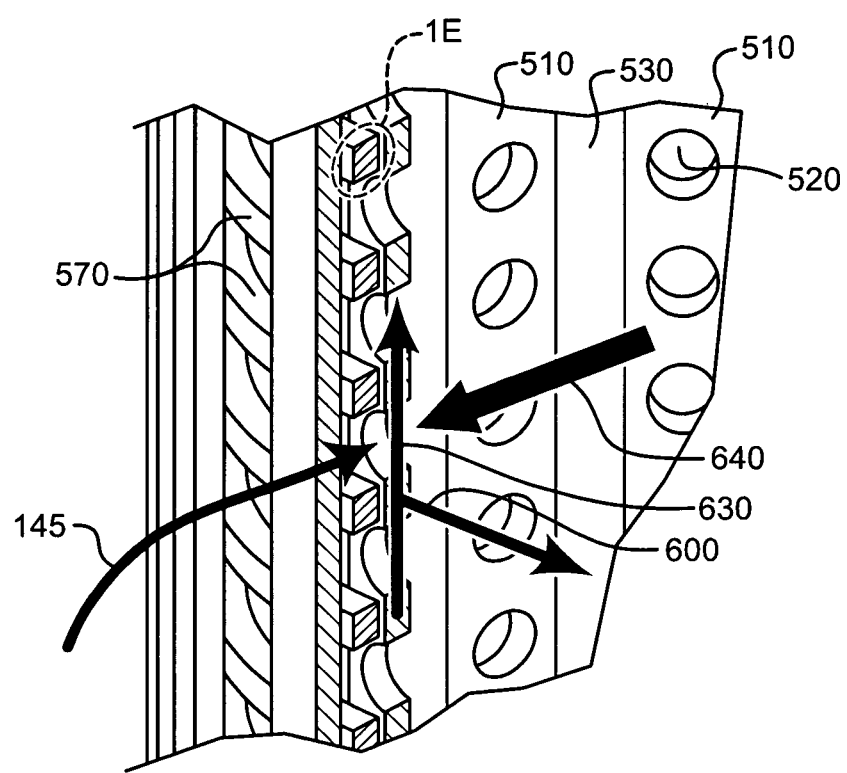
FIG. 1J is a magnified fragmentation view in perspective cross section of another detail of the electromagnetic flow regulator of FIG. 1B.
Figure 1K:
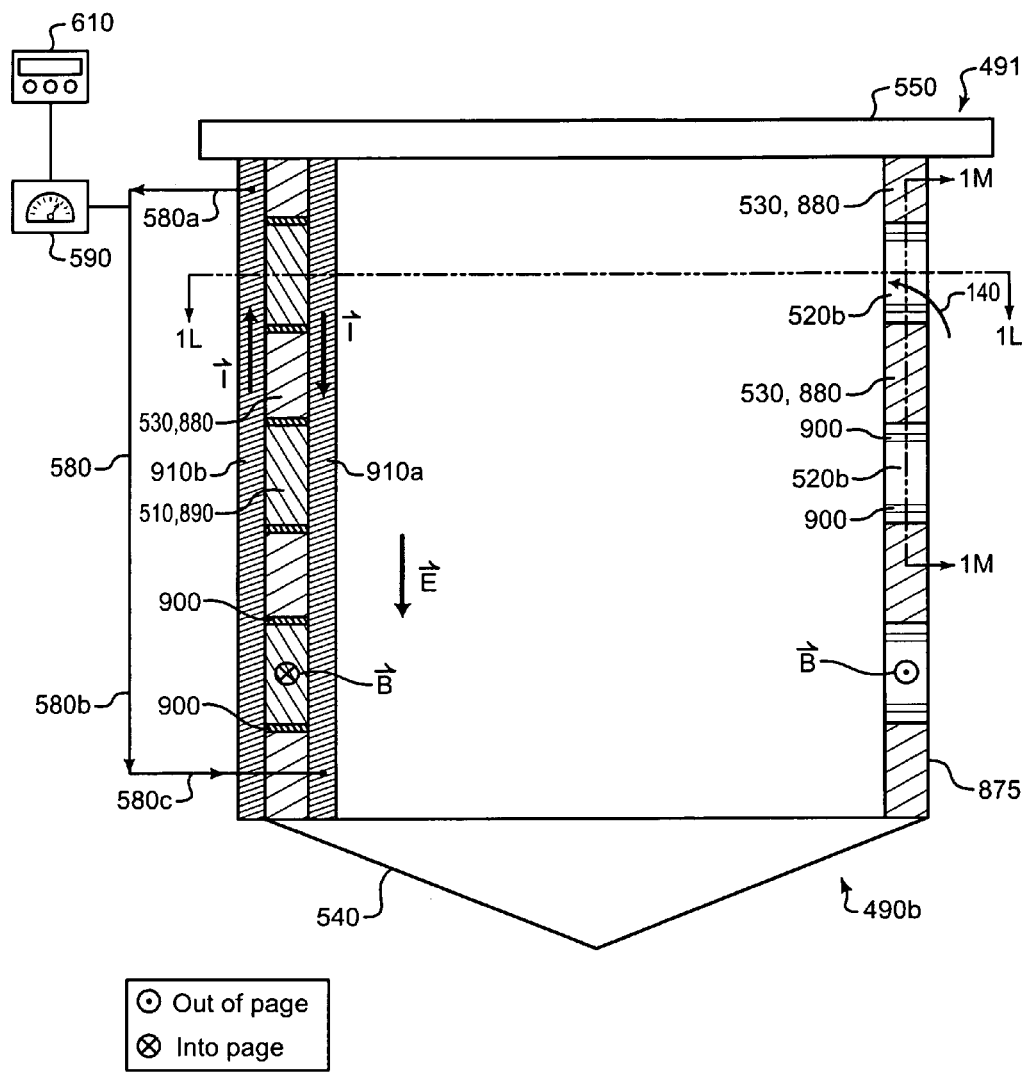
FIG. 1K is a side plan view in partial cutaway schematic form of another illustrative electromagnetic flow regulator.
Figure 1L:
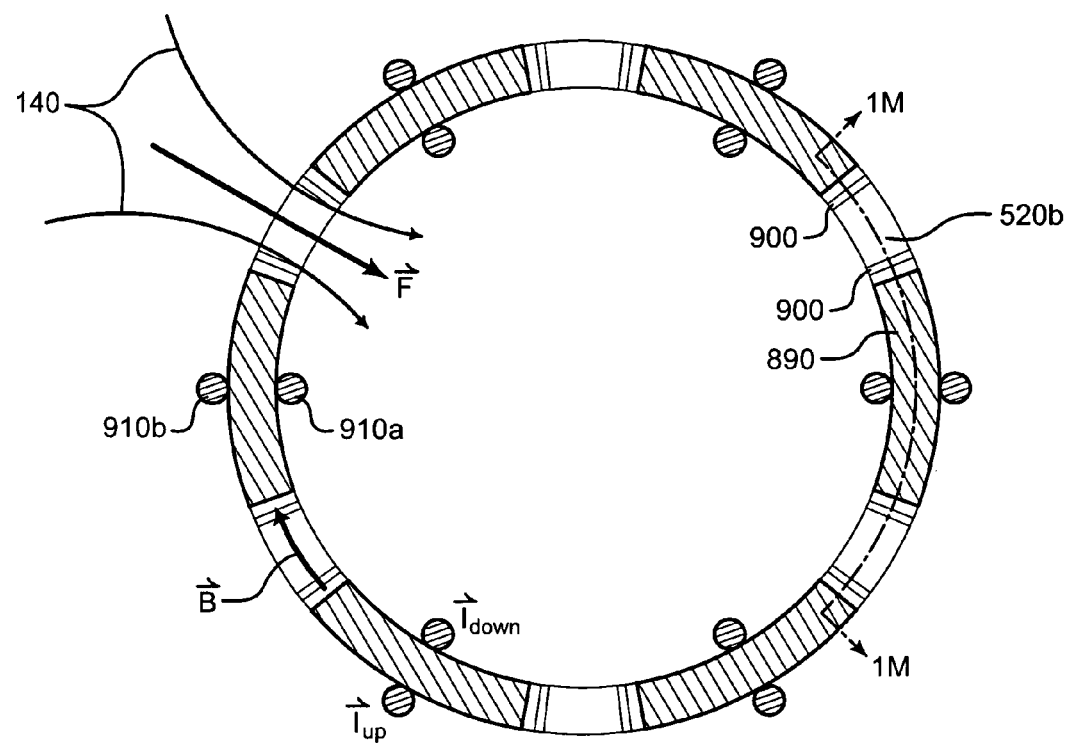
FIG. 1L is a view taken along section line 1L-1L of FIG. 1K.
Figure 1M:
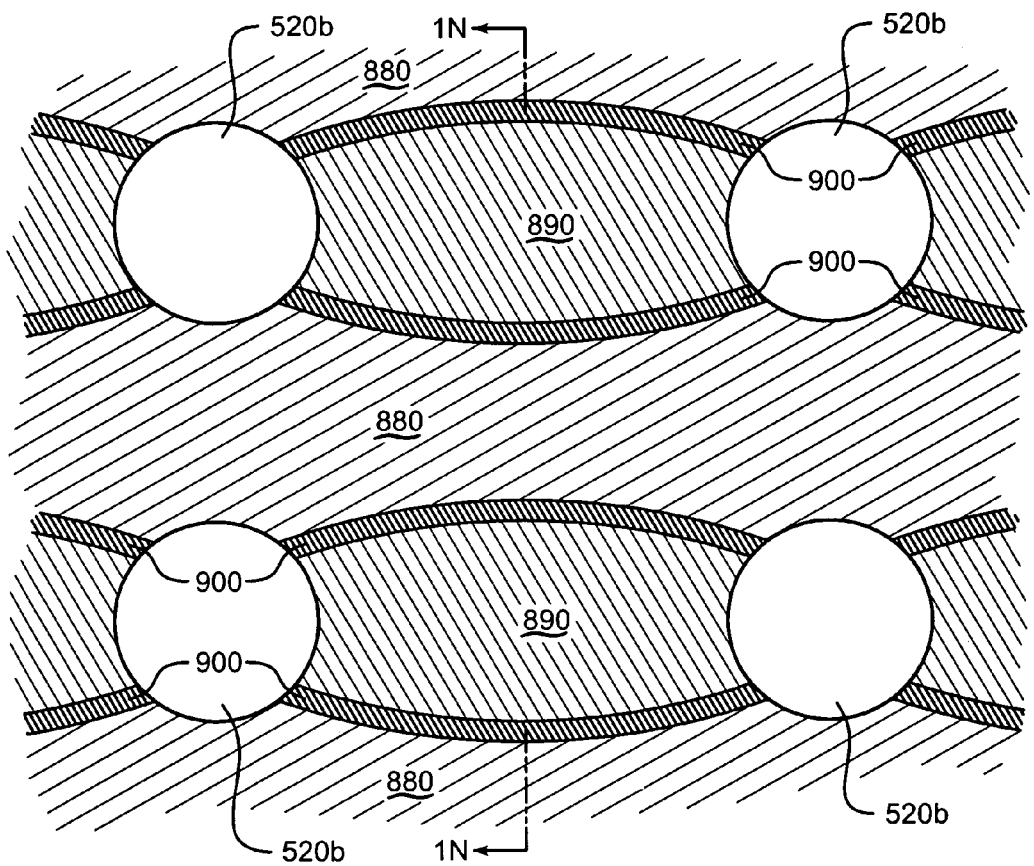
FIG. 1M is a view taken along section line 1M-1M of FIG. 1K.
Figure 1N:
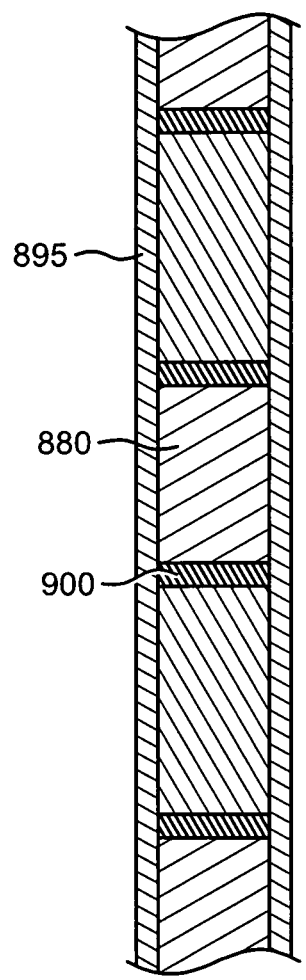
FIG. 1N is a view taken along section line 1N-1N of FIG. 1M.

Referring now to FIG. 1F, an induced electric field "E" will affect or resist an established flow of electrically conductive fluid into the electromagnetic flow regulator 490a. The movement of an electrically conductive fluid through a magnetic field results in the induced electric field according to the equation:

$$E = v \times B, \qquad \text{Equation (1)}$$

where,

B is the magnetic field vector (e.g., in Tesla);

E is the induced electric field vector (e.g., in volts per meter);

v is the velocity of the electrically conductive fluid (e.g., in meters per second);

Because of the electrical conductivity of the fluid, the electric field E causes a current density J in the fluid. The current J then produces a Lorentz force density f, and resultant total force F, that opposes the flow of the electrically conductive fluid as shown in the expressions:

$$f = J \times B \text{(the Lorentz Force Law)} \qquad \text{Equation (2)}$$

and $$F = f \times \text{volume} \qquad \text{Equation (3)}$$

Referring additionally to FIGS. 1G, 1H, 1I, and 1J, the electric current supplied from the power supply 590 and the electrical circuit 580 to the induction coils 570 flows along the induction coils 570 generally in the direction illustrated by the directional arrows 600. In this case, the magnetic field B will act generally in the direction illustrated by the directional arrow 630. The magnetic field B that is indicated by the arrow 630 acts substantially perpendicularly to the flow of the electrically conductive fluid through the portion 145 of the fluid flow path 140. The generated Lorentz force F will act in the direction of the directional arrow 640 substantially perpendicularly to the magnetic field B indicated by the arrow 630. The terminology "substantially perpendicularly" is defined herein to mean an orientation that is within ±45° of being precisely perpendicular. It will be appreciated that the induced vectors are maximized or minimized when placed in perpendicular arrangements. It will also be understood that practical applications may not allow perpendicular orientation. However, such orientations may still result in sufficient vector magnitudes to perform the function described herein. The Lorentz force F acting in the direction of the arrow 640 will resist or otherwise oppose flow of the electrically conductive fluid as the electrically conductive fluid attempts to move through the flow holes 520. In other words, the force F applies a braking force to the electrically conductive fluid.

Given by way of another nonlimiting example, another illustrative electromagnetic flow regulator 490*b* may regulate flow of the electrically conductive fluid by restricting flow of the electrically conductive fluid and/or forcing flow of the electrically conductive fluid.

Given by way of overview and referring back to FIG. 1A, the following information is provided as a high-level introduction to some aspects of the electromagnetic flow regulator 490*b*. As such, the following information is provided in addition to the information set forth above for the electromagnetic flow regulator 490 (which need not be repeated for an understanding). To that end, in various embodiments of the electromagnetic flow regulator 490*b* the field generation winding 570 includes conductors 910*a* (not shown in FIG. 1A for purposes of clarity) that are capable of carrying electrical current and that that are disposed inboard of the magnetic conductors and conductors 910*b* that are capable of carrying electrical current and that are disposed outboard of the magnetic conductors. The electromagnetic flow regulator 490*b* may include magnetic nonconductors (not shown in FIG. 1A for purposes of clarity) that are attached to the frame and disposed between adjacent ones of the magnetic conductors. In such cases, the fluid flow path is further defined along the magnetic nonconductors, and the fluid inlet path is further defined through the magnetic nonconductors.

An illustrative embodiment of the electromagnetic flow regulator 490*b* will now be set forth by way of nonlimiting example. Referring now to FIGS. 1K, 1L, 1M, and 1N and given by way of overview, magnetic conductors 510, 890 are arranged in fixed relative location, such as by being attached to a frame 491. The magnetic conductors 510, 890 define therealong a fluid flow path for an electrically conductive fluid and define therethrough flow holes 520*b* that define a fluid inlet path for the electrically conductive fluid that is substantially orthogonal to the fluid flow path. A field generation winding 910*a*, 910*b* includes conductors 910*a* that are capable of carrying electrical current and that are disposed inboard of the magnetic conductors 510, 890 and conductors 910*b* that are capable of carrying electrical current and that are disposed outboard of the magnetic conductors 510, 890. The field generation winding 910*a*, 910*b* is electromagnetically couplable to the magnetic conductors 510, 890 such that at least one magnetic field is generatable by the field generation winding 910*a*, 910*b* at the fluid inlet path. Illustrative details will be set forth below.

The frame 491 includes a casing 875 that is attached at its lower end to the base member 540 and that is attached at its upper end to the yoke 550. The casing includes regions 880 of low magnetic susceptibility (that is, the magnetic nonconductors 530) and regions 890 of high magnetic susceptibility (that is, the magnetic conductors 510) as described below.

Flow holes 520*b* may be defined vertically and circumferentially around the casing 875 as follows. Each flow 520*b* is formed through a region 880 of low magnetic susceptibility material capable of conducting an electrical current—that is, a magnetic nonconductor 530—and through a region 890 of high magnetic susceptibility material—that is, a magnetic conductor 510—that are disposed on opposite sides of the flow hole 520*b*.

Interposed between the regions 880 and 890 are respective ones of insulation segments 900. Thus, the regions 880 and 890 and the insulation segments 900 are in communication with the flow hole 520*b*.

A field generation winding is composed of current-carrying wires 910*a* and 910*b*. The current-carrying wire 910*a* extends longitudinally along the interior of the casing 875. The current-carrying wire 910*b* is integrally connected to the current-carrying wire 910*a* and extends longitudinally along the exterior of the casing 875. A circuit segment 580*a* of an electrical circuit 580 is electrically connected to the current-carrying wire 910*a* and a circuit segment 580*c* of the electrical circuit 580 is electrically connected to the current-carrying wire 910*b*. This configuration results in a magnetic field B that is horizontal and the current-carrying wires 910*a* and 910*b* that are vertical. An electric field E is established in the vertical direction across the flow holes 520*b*.

A thin lamination or insulating layer 895 may be placed on the circumferential interior and exterior surfaces of the low magnetic susceptibility material 880 and high magnetic susceptibility material 890 to help prevent leakage of electrical current to material or areas surrounding the flow regulator 490*b*.

The current I, or the electric field E, can be reversed to either force or restrict movement of the electrically conductive fluid through the flow holes 520*b*. The current-carrying wire 910*a* (disposed on the interior of the casing 875) produces a downwardly flowing current and the current-carrying wire 910*b* (disposed on the exterior of the casing 875) produces an upwardly flowing current. Such an arrangement of the current-carrying wires 910*a* and 910*b* make a continuous magnetic field B that does not block the flow holes 520*b*.

While the current density J in Equation (2) is generated in a direction that opposes the flow of conducting fluid in the absence of an external driving force (such as in the flow regulator 490*a*), the application of an external driving force in the flow regulator 490*b* can increase or decrease J in either direction. The resultant force density f in Equation (2), and hence likewise the resultant force F, can then be driven to a direction that either aids or opposes the flow.

It will be appreciated that orientation of the electromagnetic flow regulators 490*a* and 490*b* (and their components) may be vertical (as described and shown herein) or horizontal, as determined by a particular application. Thus, the terms "horizontal" and "vertical" are used above only to explain the nonlimiting illustrative examples presented herein. In some applications, the orientation of the electromagnetic flow regulator 490*a* and/or 490*b* may be orthogonal to the nonlimiting orientation described and illustrated herein. Therefore, it will be appreciated that the terms "horizontal" and "vertical" may be interchanged with each other, as determined by orientations entailed in particular applications.

Referring back to FIG. 1A, it will be appreciated that a system for electromagnetically regulating flow of an electrically conductive fluid may include a source of electrical power, such as the power supply 590, and the electromagnetic flow regulator 490. Another system for electromagnetically regulating flow of an electrically conductive fluid may include a source of electrical power, such as the power supply 590, and the electromagnetic flow regulator 490*a*. Similarly, another system for electromagnetically regulating flow of an electrically conductive fluid may include a source of electrical power, such as the power supply 590, and the electromagnetic flow regulator 490*b*. Any of the above systems may also include a controller, such as the control unit 610, if desired. The power supply 590, the control unit 610, and the electromagnetic flow regulators 490, 490*a*, and 490*b* have been discussed above. Details of their construction and operation need not be repeated for an understanding.

Now that illustrative details have been set forth above regarding construction and operation of the electromagnetic flow regulators 490, 490*a*, and 490*b*, various methods for electromagnetically regulating flow of an electrically conductive fluid will be set forth.

Figure 2A:
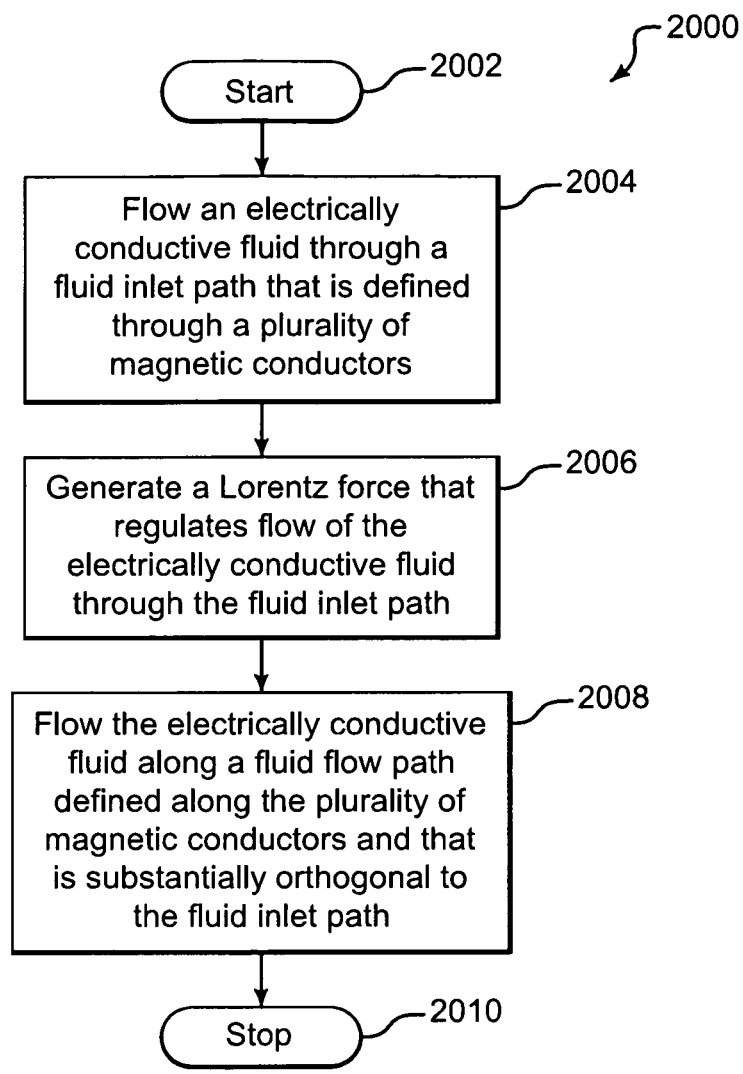
FIG. 2A is a flowchart of an illustrative method of regulating flow of an electrically conductive fluid.

Referring now to FIG. 2A, an illustrative method 2000 is provided for regulating flow of an electrically conductive fluid. The method 2000 starts at a block 2002. At a block 2004 an electrically conductive fluid is flowed through a fluid inlet path that is defined through a plurality of magnetic conductors of an electromagnetic flow regulator. At a block 2006 a Lorentz force that regulates flow of the electrically conductive fluid through the fluid inlet path is generated. At a block 2008 the electrically conductive fluid is flowed along a fluid flow path defined along the plurality of magnetic conductors and that is substantially orthogonal to the fluid inlet path. The method 2000 stops at a block 2010.

Figure 2B:
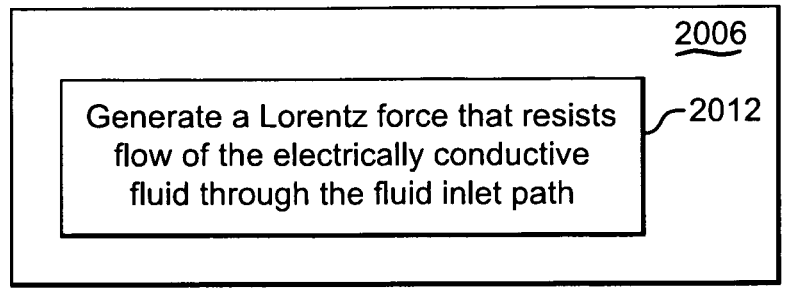
FIGS. 2B-2E are flowcharts of details of the method of FIG. 2A.
Figure 2C:
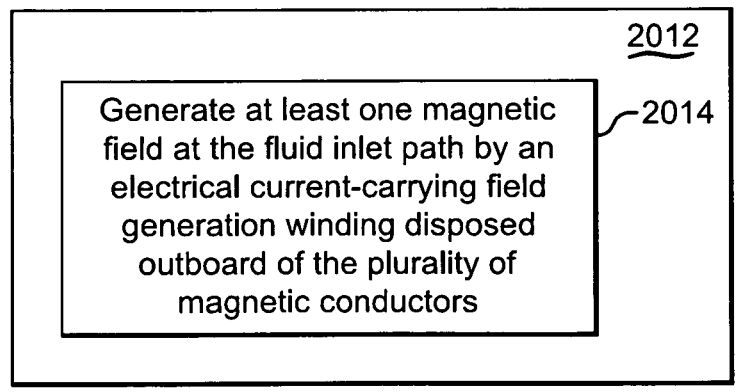

Referring additionally to FIG. 2B, in an embodiment generating a Lorentz force that regulates flow of the electrically conductive fluid through the fluid inlet path at the block 2006 may include generating a Lorentz force that resists flow of the electrically conductive fluid through the fluid inlet path at a block 2012. For example and referring additionally to FIG. 2C, generating a Lorentz force that resists flow of the electrically conductive fluid through the fluid inlet path at the block 2012 may include generating at least one magnetic field at the fluid inlet path by an electrical current-carrying field generation winding disposed outboard of the plurality of magnetic conductors at a block 2014.

Figure 2D:
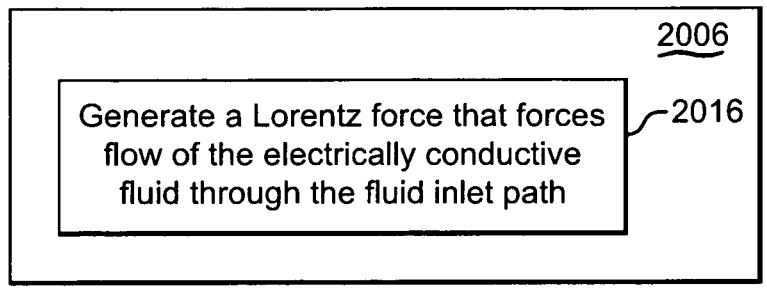
Figure 2E:
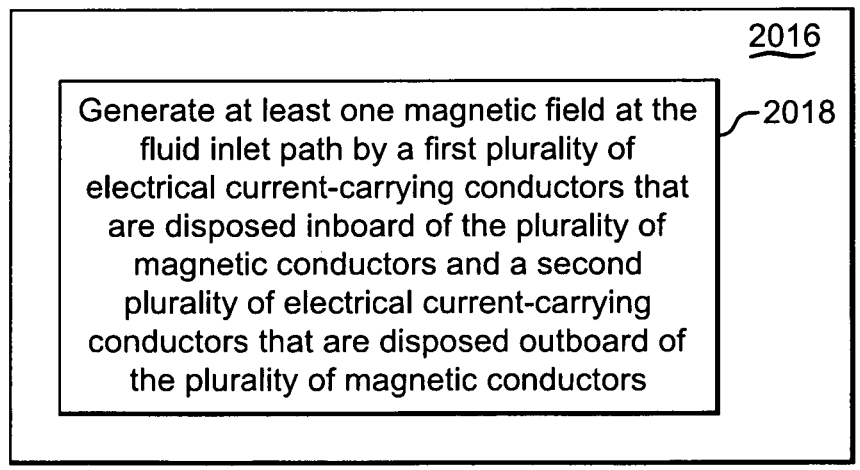

Referring now to FIGS. 2A and 2D, in another embodiment generating a Lorentz force that regulates flow of the electrically conductive fluid through the fluid inlet path at the block 2006 may include generating a Lorentz force that forces flow of the electrically conductive fluid through the fluid inlet path at a block 2016. For example, and referring additionally to FIG. 2E, generating a Lorentz force that forces flow of the electrically conductive fluid through the fluid inlet path at the block 2016 may include generating at least one magnetic field at the fluid inlet path by a first plurality of electrical current-carrying conductors that are disposed inboard of the plurality of magnetic conductors and a second plurality of electrical current-carrying conductors that are disposed outboard of the plurality of magnetic conductors at a block 2018.

Figure 2F:
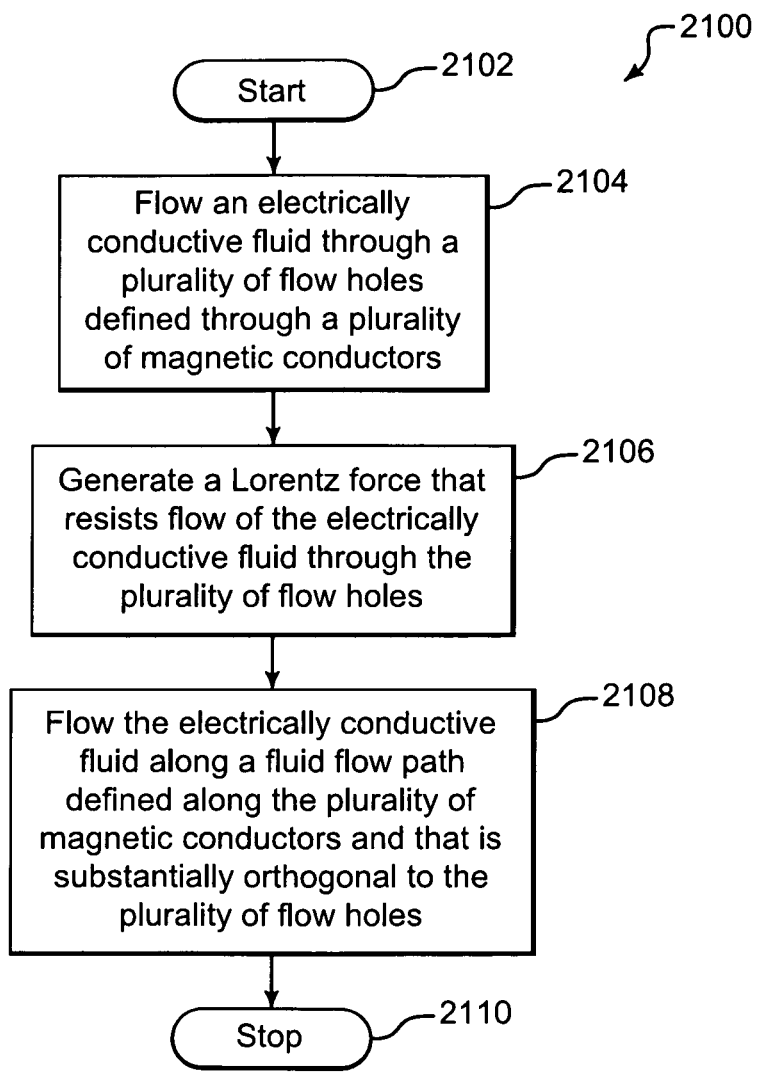
FIG. 2F is a flowchart of another illustrative method of regulating flow of an electrically conductive fluid.

Referring now to FIG. 2F, an illustrative method 2100 is provided for regulating flow of an electrically conductive fluid. It will be appreciated that the method 2100 regulates flow of an electrically conductive fluid by restricting flow of the electrically conductive fluid.

The method 2100 starts at a block 2102. At a block 2104 an electrically conductive fluid is flowed through a plurality of flow holes defined through a plurality of magnetic conductors in an electromagnetic flow regulator. At a block 2106 a Lorentz force that resists flow of the electrically conductive fluid through the plurality of flow holes is generated. At a block 2108 the electrically conductive fluid is flowed along a fluid flow path defined along the plurality of magnetic conductors and that is substantially orthogonal to flow of the electrically conductive fluid through the plurality of flow holes. The method 2100 stops at a block 2110.

Figure 2G:
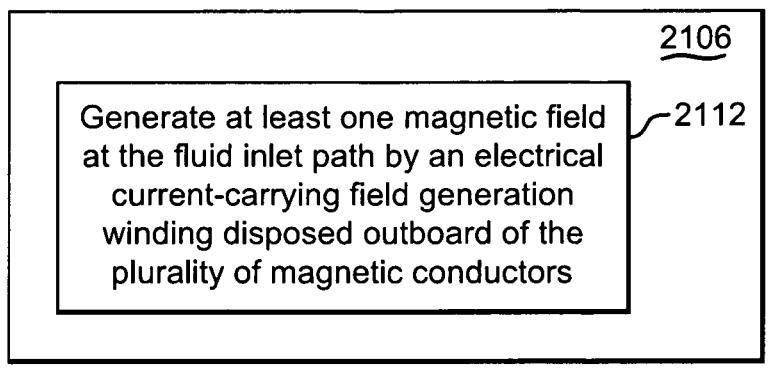
FIG. 2G is a flowchart of details of the method of FIG. 2F.

Referring additionally to FIG. 2G, generating a Lorentz force that resists flow of the electrically conductive fluid through the plurality of flow holes at the block 2106 may include generating at least one magnetic field at the plurality of flow holes by an electrical current-carrying field generation winding disposed outboard of the plurality of magnetic conductors at a block 2112.

Figure 2H:
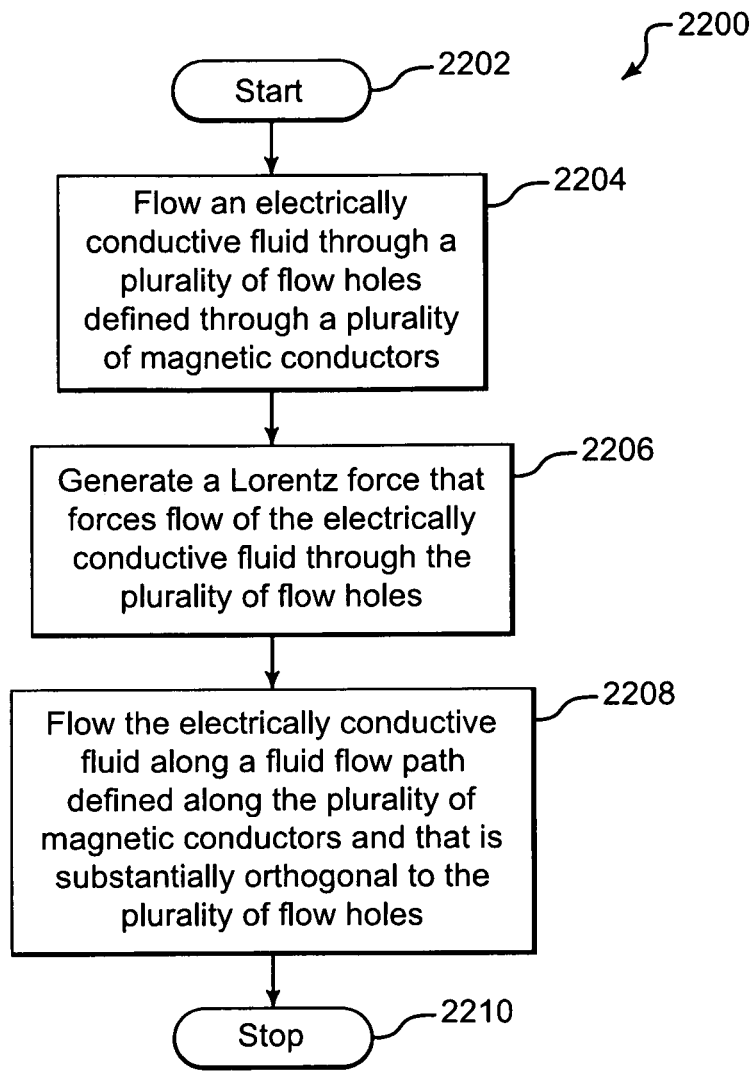
FIG. 2H is a flowchart of another illustrative method of regulating flow of an electrically conductive fluid.
Figure 21:
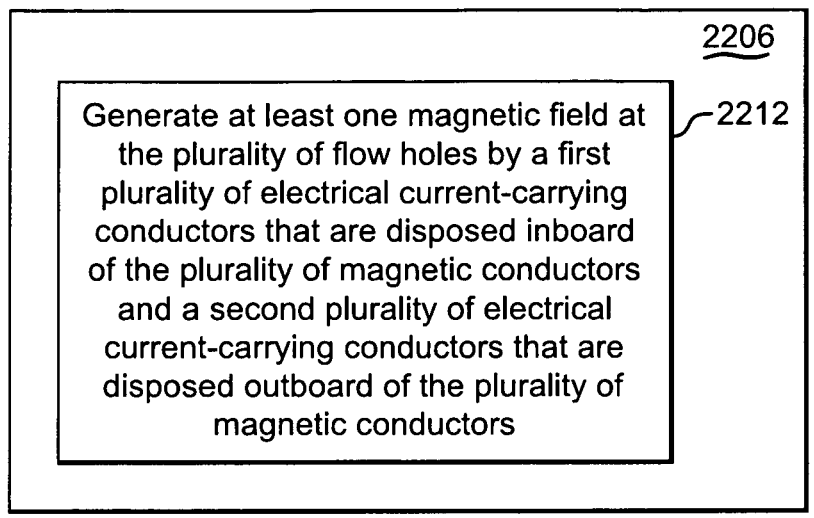

Referring now to FIG. 2H, an illustrative method 2200 is provided for regulating flow of an electrically conductive fluid. It will be appreciated that the method 2200 regulates flow of an electrically conductive fluid by forcing flow of the electrically conductive fluid.

The method 2200 starts at a block 2202. At a block 2204 an electrically conductive fluid is flowed through a plurality of flow holes defined through a plurality of magnetic conductors. At a block 2206 a Lorentz force that forces flow of the electrically conductive fluid through the plurality of flow holes is generated. At a block 2208 the electrically conductive fluid is flowed along a fluid flow path defined along the plurality of magnetic conductors and that is substantially orthogonal to flow of the electrically conductive fluid through the plurality of flow holes. The method 2200 stops at a block 2210.

Referring additionally to FIG. 2I, generating a Lorentz force that forces flow of the electrically conductive fluid through the plurality of flow holes at the block 2206 may include generating at least one magnetic field at the plurality of flow holes by a first plurality of electrical current-carrying conductors that are disposed inboard of the plurality of magnetic conductors and a second plurality of electrical current-carrying conductors that are disposed outboard of the plurality of magnetic conductors at a block 2212.

Figure 3A:
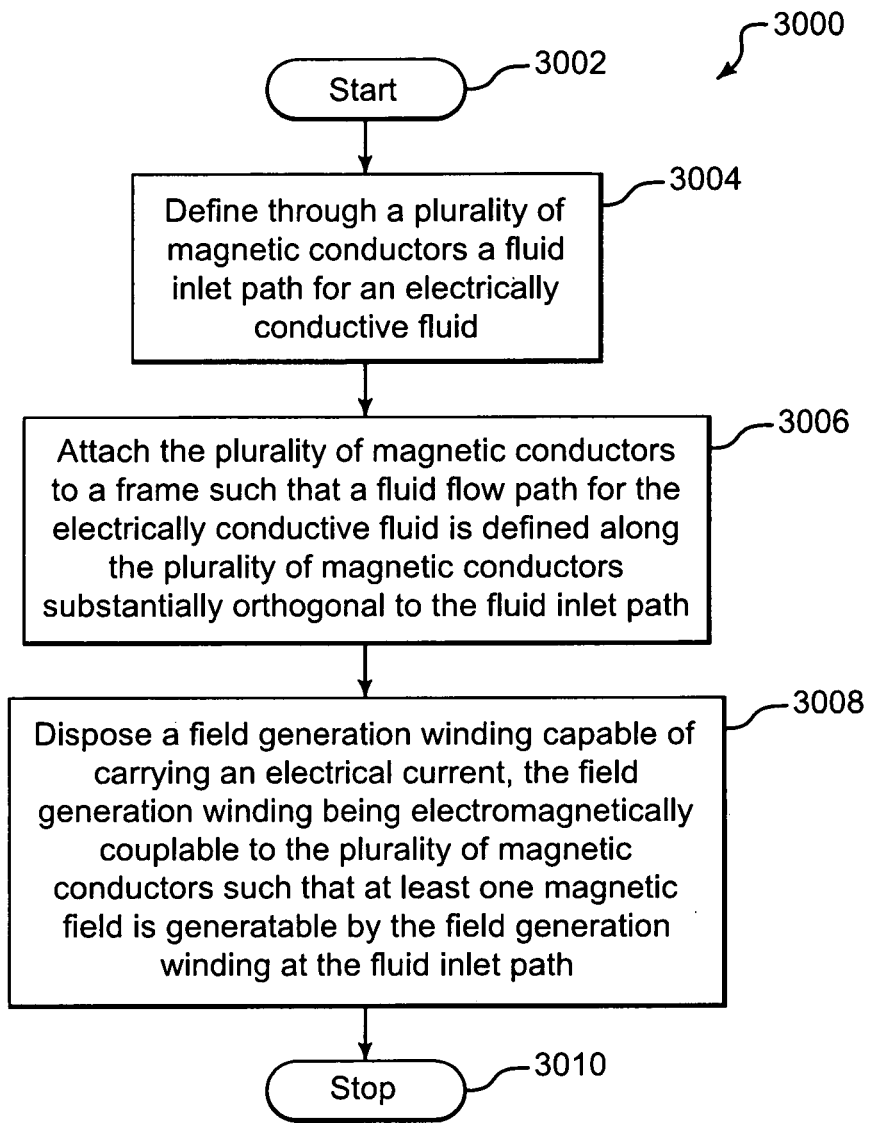
FIG. 3A is a flowchart of an illustrative method of fabricating an electromagnetic flow regulator.

Referring now to FIG. 3A, an illustrative method 3000 is provided for fabricating an electromagnetic flow regulator for regulating flow of an electrically conductive fluid. The method 3000 starts at a block 3002. At a block 3004 a fluid inlet path for an electrically conductive fluid is defined through a plurality of magnetic conductors. At a block 3006 the plurality of magnetic conductors is attached to a frame such that a fluid flow path for the electrically conductive fluid is defined along the plurality of magnetic conductors substantially orthogonal to the fluid inlet path. At a block 3008 a field generation winding capable of carrying an electrical current is disposed, the field generation winding being electromagnetically couplable to the plurality of magnetic conductors such that at least one magnetic field is generatable by the field generation winding at the fluid inlet path.

Figure 3B:
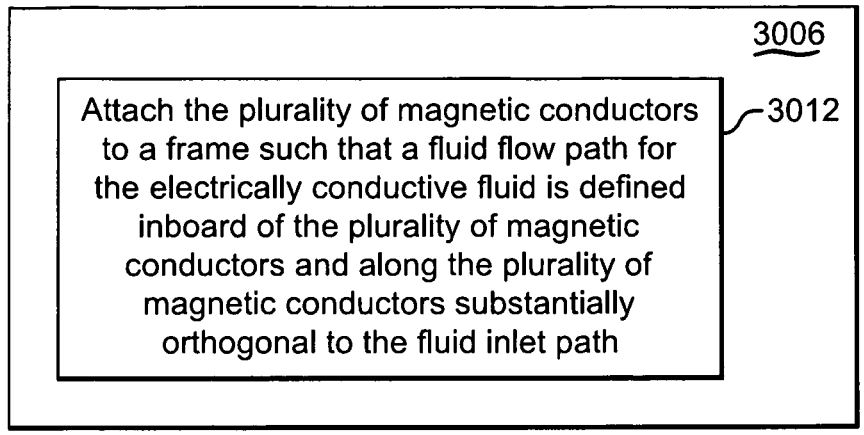
FIGS. 3B-3K are flowcharts of details of the method of FIG. 3A.

Referring additionally to FIG. 3B, attaching the plurality of magnetic conductors to a frame such that a fluid flow path for the electrically conductive fluid is defined along the plurality of magnetic conductors substantially orthogonal to the fluid inlet path at the block 3006 may include attaching the plurality of magnetic conductors to a frame such that a fluid flow path for the electrically conductive fluid is defined inboard of the plurality of magnetic conductors and along the plurality of magnetic conductors substantially orthogonal to the fluid inlet path at a block 3012.

Figure 3C:
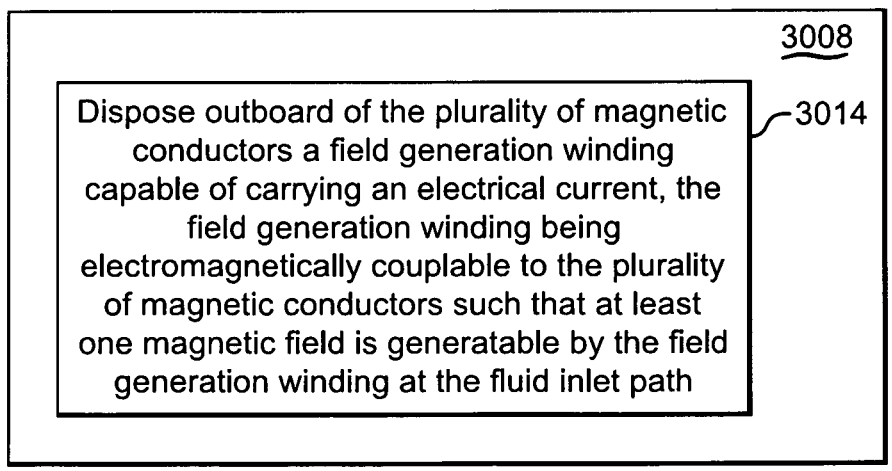

Referring now to FIGS. 3A and 3C, in some embodiments disposing a field generation winding capable of carrying an electrical current, the field generation winding being electromagnetically couplable to the plurality of magnetic conductors such that at least one magnetic field is generatable by the field generation winding at the fluid inlet path at the block 3008 may include disposing outboard of the plurality of magnetic conductors a field generation winding capable of carrying an electrical current, the field generation winding being electromagnetically couplable to the plurality of magnetic conductors such that at least one magnetic field is generatable by the field generation winding at the fluid inlet path at a block 3014. It will be appreciated that the block 3014 is performed to fabricate embodiments of an electromagnetic flow regulator that may regulate flow of an electrically conductive fluid by restricting flow of the electrically conductive fluid.

Figure 3D:
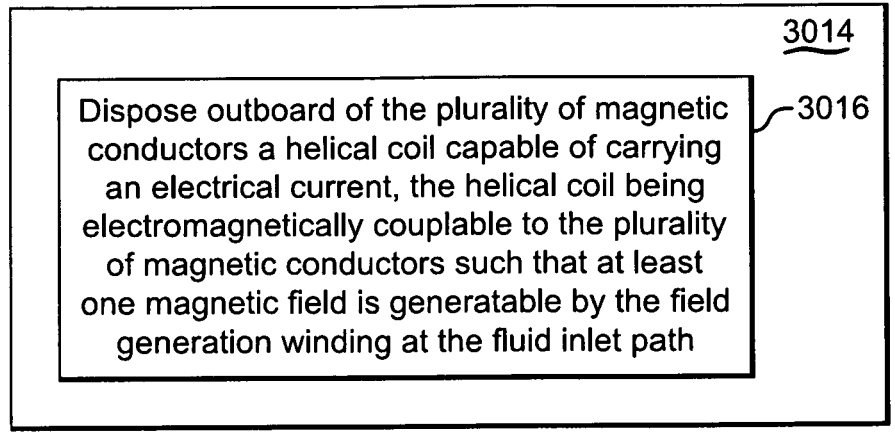

For example and referring to FIG. 3D, in some embodiments disposing outboard of the plurality of magnetic conductors a field generation winding capable of carrying an electrical current, the field generation winding being electromagnetically couplable to the plurality of magnetic conductors such that at least one magnetic field is generatable by the field generation winding at the fluid inlet path at the block 3014 may include disposing a helical coil outboard of the plurality of magnetic conductors a field generation winding capable of carrying an electrical current, the field generation winding being electromagnetically couplable to the plurality of magnetic conductors such that at least one magnetic field is generatable by the field generation winding at the fluid inlet path at a block 3016.

Figure 3E:
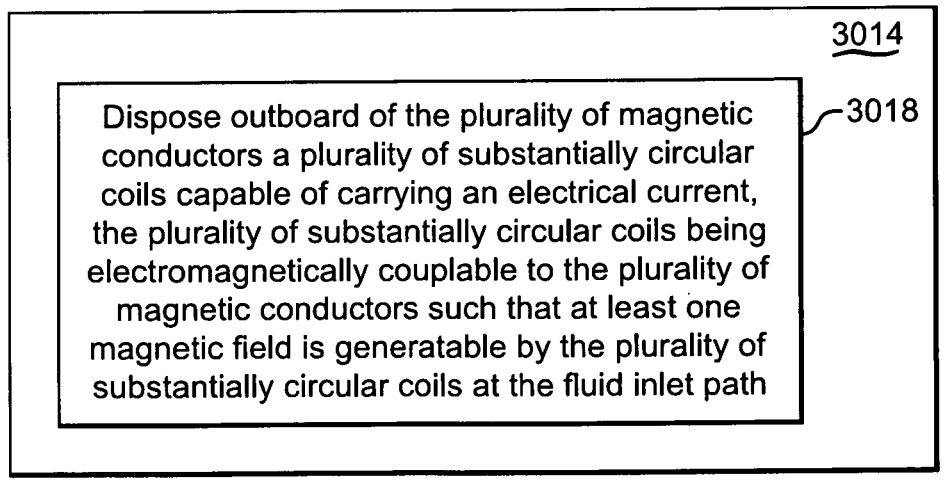

As another example and referring now to FIG. 3E, in some other embodiments disposing outboard of the plurality of magnetic conductors a field generation winding capable of carrying an electrical current, the field generation winding being electromagnetically couplable to the plurality of magnetic conductors such that at least one magnetic field is generatable by the field generation winding at the fluid inlet path at the block 3014 may include disposing a plurality of substantially circular coils outboard of the plurality of magnetic conductors a field generation winding capable of carrying an electrical current, the field generation winding being electromagnetically couplable to the plurality of magnetic conductors such that at least one magnetic field is generatable by the field generation winding at the fluid inlet path at a block 3018.

Figure 3F:
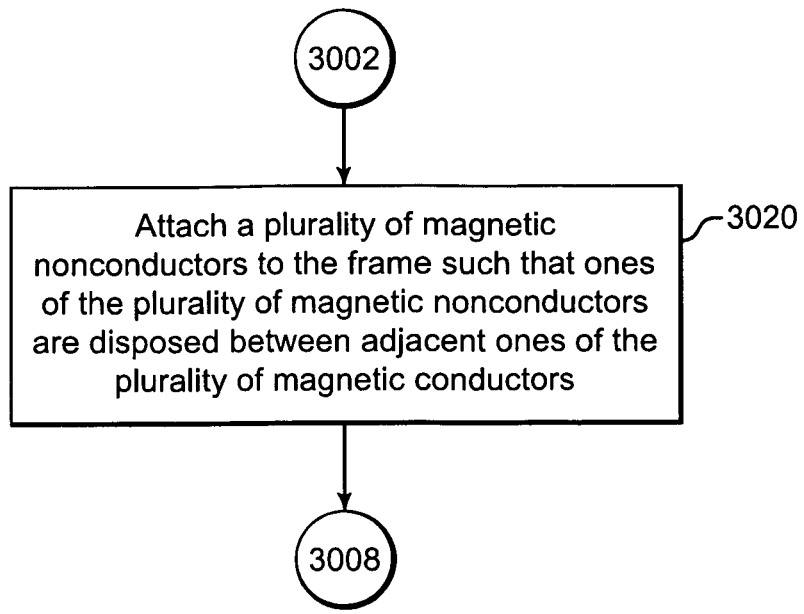
Figure 3G:
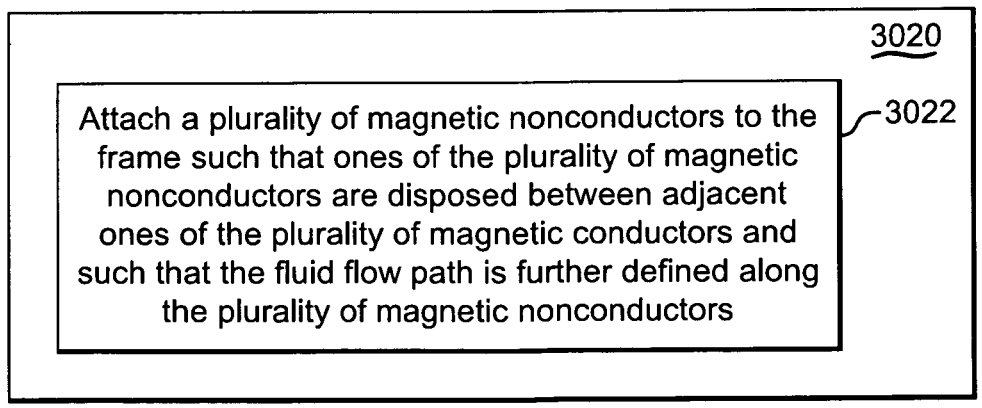

Referring now to FIGS. 3A and 3F, in some embodiments at a block 3020 a plurality of magnetic nonconductors may be attached to the frame such that ones of the plurality of magnetic nonconductors are disposed between adjacent ones of the plurality of magnetic conductors. Referring additionally to FIG. 3G, in some embodiments attaching a plurality of magnetic nonconductors to the frame such that ones of the plurality of magnetic nonconductors are disposed between adjacent ones of the plurality of magnetic conductors at the block 3020 may include attaching a plurality of magnetic nonconductors to the frame such that ones of the plurality of magnetic nonconductors are disposed between adjacent ones of the plurality of magnetic conductors and such that the fluid flow path is further defined along the plurality of magnetic nonconductors at a block 3022.

Figure 3H:
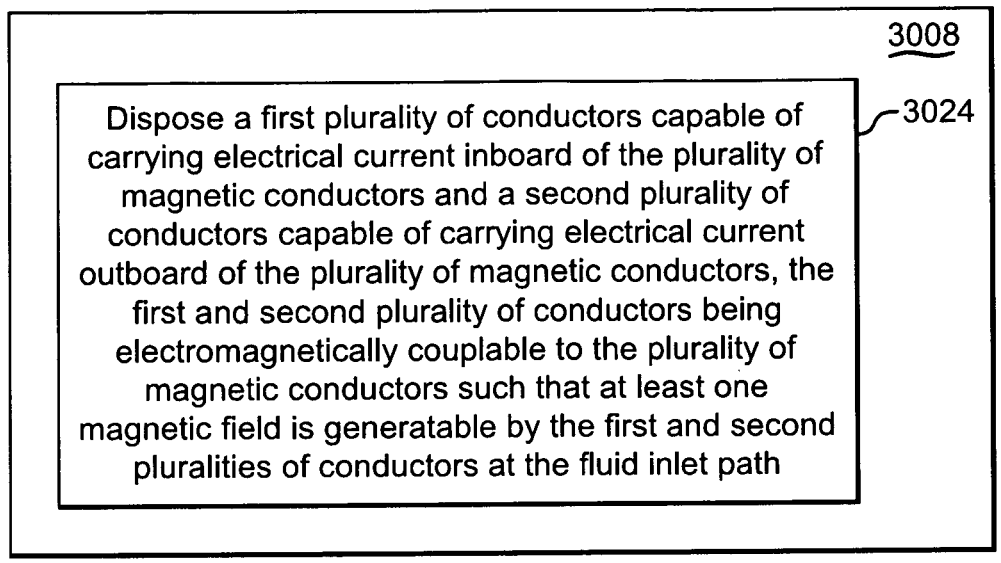

Referring now to FIGS. 3A and 3H, in some embodiments disposing a field generation winding capable of carrying an electrical current, the field generation winding being electromagnetically couplable to the plurality of magnetic conductors such that at least one magnetic field is generatable by the field generation winding at the fluid inlet path at the block 3008 may include disposing a first plurality of electrical conductors inboard of the plurality of magnetic conductors and a second plurality of electrical conductors outboard of the plurality of magnetic conductors, the first and second plurality of conductors being electromagnetically couplable to the plurality of magnetic conductors such that at least one magnetic field is generatable by the first and second pluralities of conductors at the fluid inlet path at a block 3024. It will be appreciated that the block 3024 is performed to fabricate embodiments of an electromagnetic flow regulator that may regulate flow of an electrically conductive fluid by restricting flow of the electrically conductive fluid.

Figure 3I:
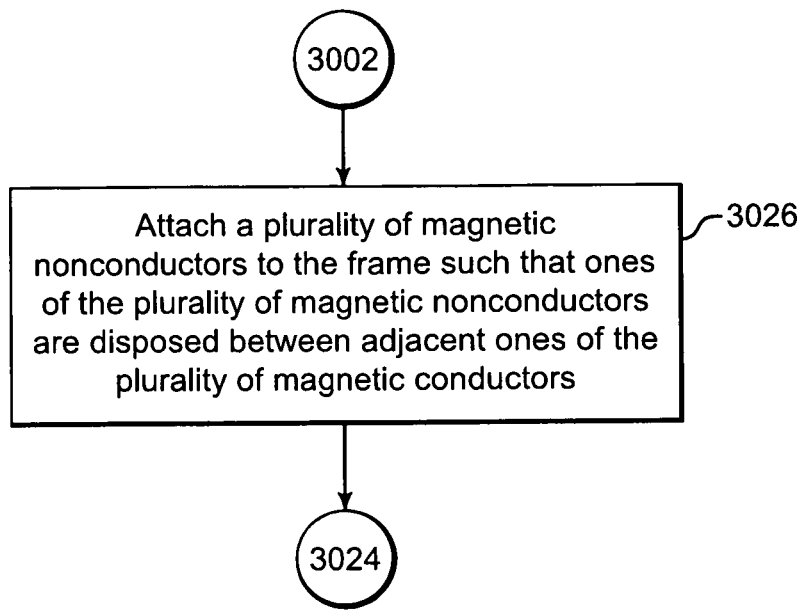
Figure 3J:
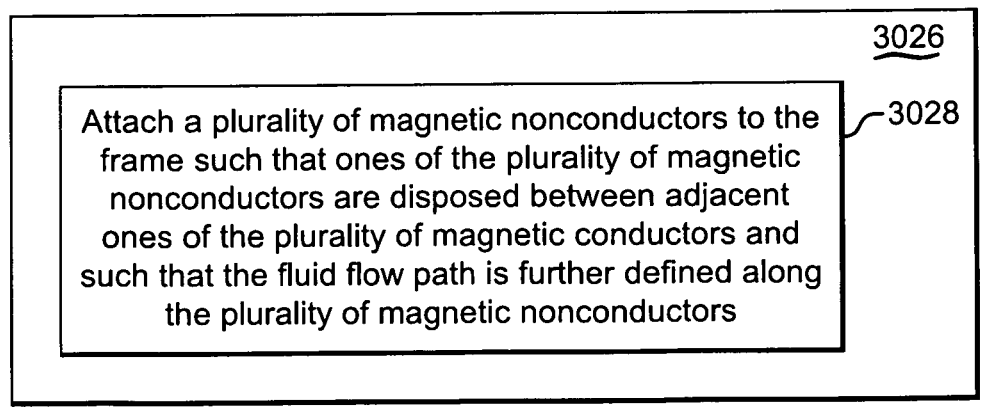
Figure 3K:
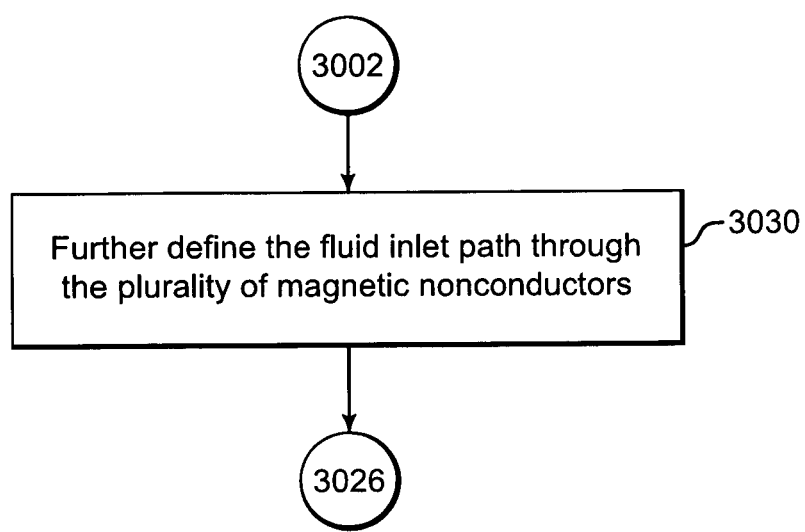

Referring additionally to FIG. 3I, in some embodiments at a block 3026 a plurality of magnetic nonconductors may be attached to the frame such that ones of the plurality of magnetic nonconductors are disposed between adjacent ones of the plurality of magnetic conductors. For example, referring additionally to FIG. 3J in some embodiments attaching a plurality of magnetic nonconductors to the frame such that ones of the plurality of magnetic nonconductors are disposed between adjacent ones of the plurality of magnetic conductors at the block 3026 may include attaching a plurality of magnetic nonconductors to the frame such that ones of the plurality of magnetic nonconductors are disposed between adjacent ones of the plurality of magnetic conductors and such that the fluid flow path is further defined along the plurality of magnetic nonconductors at a block 3028. Referring additionally to FIG. 3K, at a block 3030 the fluid inlet path may be further defined through the plurality of magnetic nonconductors.

Figure 3L:
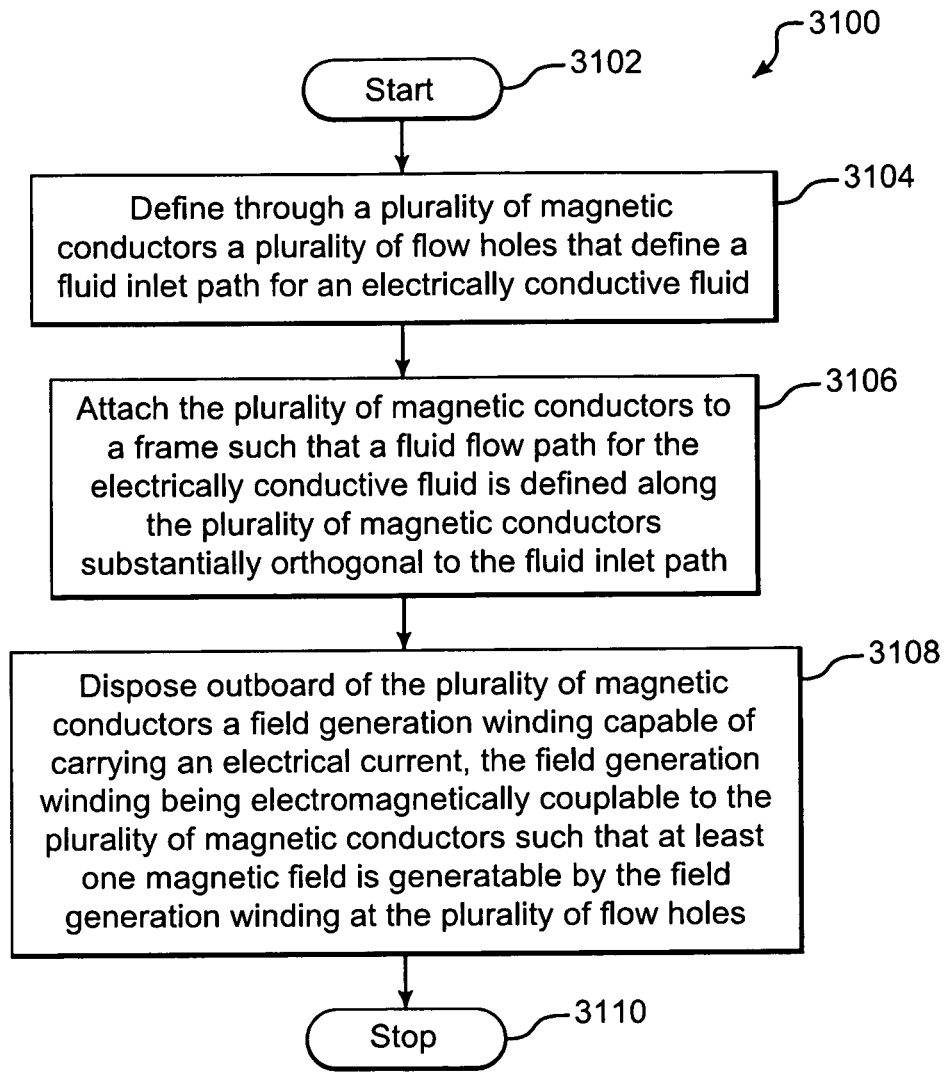
FIG. 3L is a flowchart of another illustrative method of fabricating an electromagnetic flow regulator.

Referring now to FIG. 3L, a method 3100 is provided for fabricating an electromagnetic flow regulator for regulating flow of an electrically conductive fluid. It will be appreciated that the method 3100 is performed to fabricate embodiments of an electromagnetic flow regulator that may regulate flow of an electrically conductive fluid by restricting flow of the electrically conductive fluid.

The method 3100 starts at a block 3102. At a block 3104 a plurality of flow holes that defines a fluid inlet path for an electrically conductive fluid is defined through a plurality of magnetic conductors. At a block 3106 the plurality of magnetic conductors is attached to a frame such that a fluid flow path for the electrically conductive fluid is defined along the plurality of magnetic conductors substantially orthogonal to the fluid inlet path. At a block 3108 a field generation winding capable of carrying an electrical current is disposed outboard of the plurality of magnetic conductors, the field generation winding being electromagnetically couplable to the plurality of magnetic conductors such that at least one magnetic field is generatable by the field generation winding at the plurality of flow holes. The method 3100 stops at a block 3110.

Figure 3M:
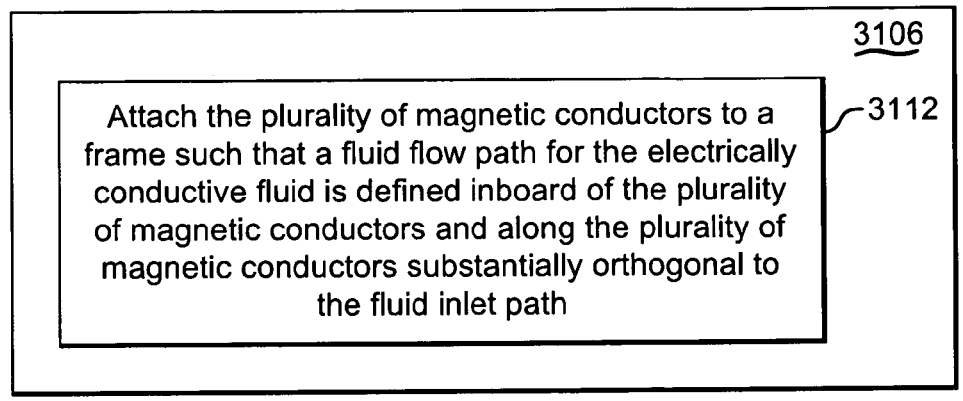
FIGS. 3M-3P are flowcharts of details of the method of FIG. 3L.

Referring additionally to FIG. 3M, attaching the plurality of magnetic conductors to a frame such that a fluid flow path for the electrically conductive fluid is defined along the plurality of magnetic conductors substantially orthogonal to the fluid inlet path at the block 3106 may include attaching the plurality of magnetic conductors to a frame such that a fluid flow path for the electrically conductive fluid is defined inboard of the plurality of magnetic conductors and along the plurality of magnetic conductors substantially orthogonal to the fluid inlet path at a block 3112.

Figure 3N:
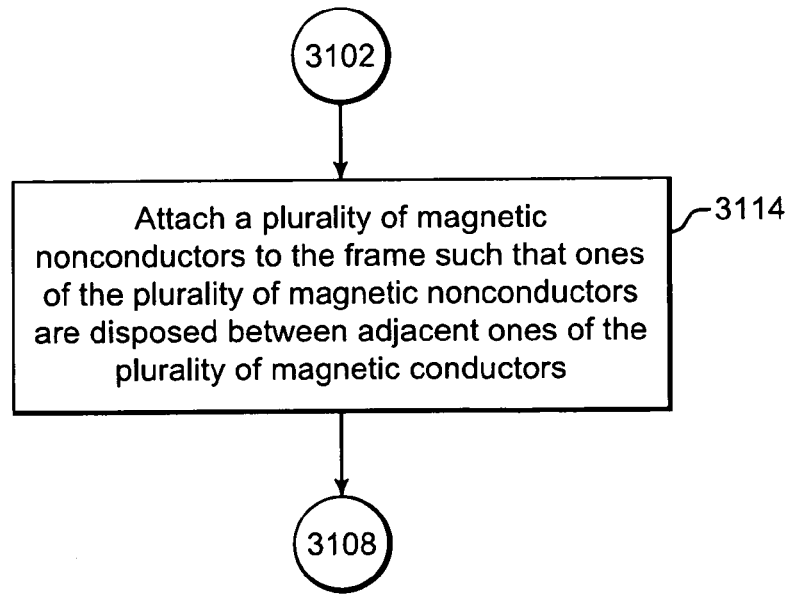

Referring to FIGS. 3L and 3N, at a block 3114 a plurality of magnetic nonconductors may be attached to the frame such that ones of the plurality of magnetic nonconductors are disposed between adjacent ones of the plurality of magnetic conductors.

Figure 3O:
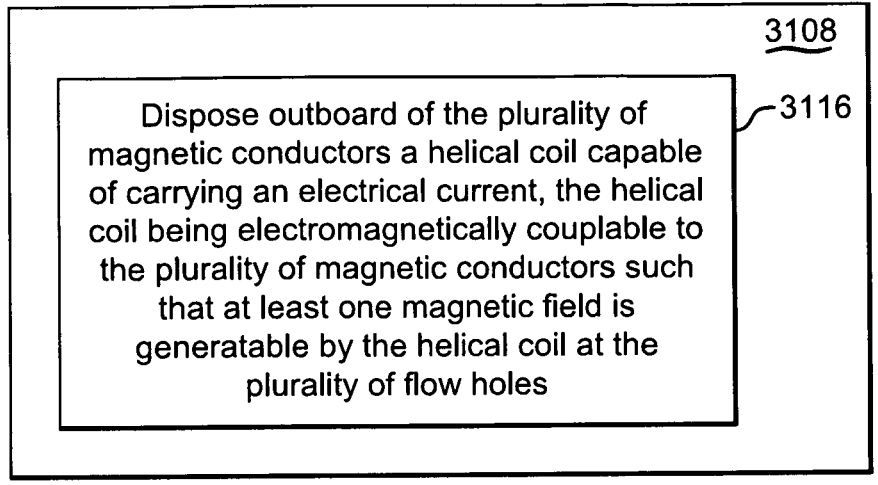

Referring to FIGS. 3L and 3O, in some embodiments disposing outboard of the plurality of magnetic conductors a field generation winding capable of carrying an electrical current, the field generation winding being electromagnetically couplable to the plurality of magnetic conductors such that at least one magnetic field is generatable by the field generation winding at the plurality of flow holes at the block 3108 may include disposing outboard of the plurality of magnetic conductors a helical coil capable of carrying an electrical current, the helical coil being electromagnetically couplable to the plurality of magnetic conductors such that at least one magnetic field is generatable by the helical coil at the plurality of flow holes at a block 3116.

Figure 3P:
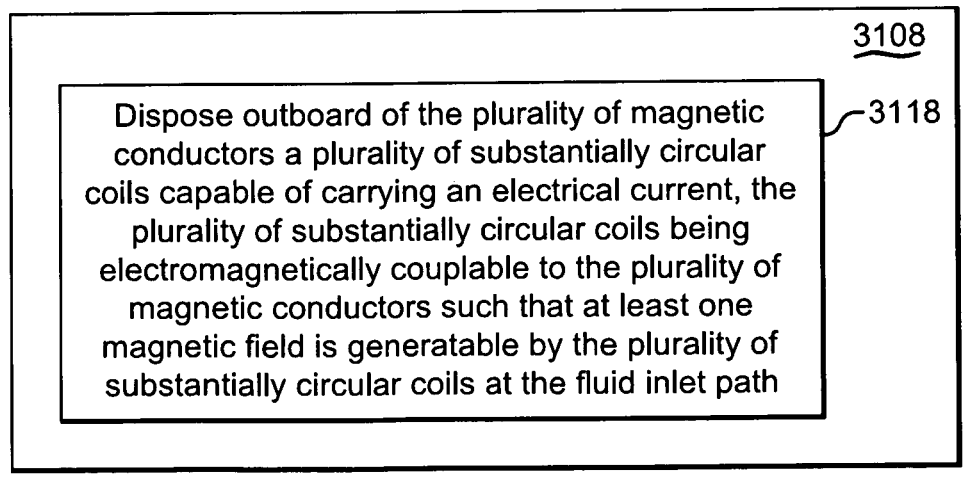

Referring to FIGS. 3L and 3P, in some other embodiments disposing outboard of the plurality of magnetic conductors a field generation winding capable of carrying an electrical current, the field generation winding being electromagnetically couplable to the plurality of magnetic conductors such that at least one magnetic field is generatable by the field generation winding at the plurality of flow holes at the block 3108 may include disposing outboard of the plurality of magnetic conductors a plurality of substantially circular coils capable of carrying an electrical current, the plurality of substantially circular coils being electromagnetically couplable to the plurality of magnetic conductors such that at least one magnetic field is generatable by the plurality of substantially circular coils at the plurality of flow holes at a block 3118.

Figure 3Q:
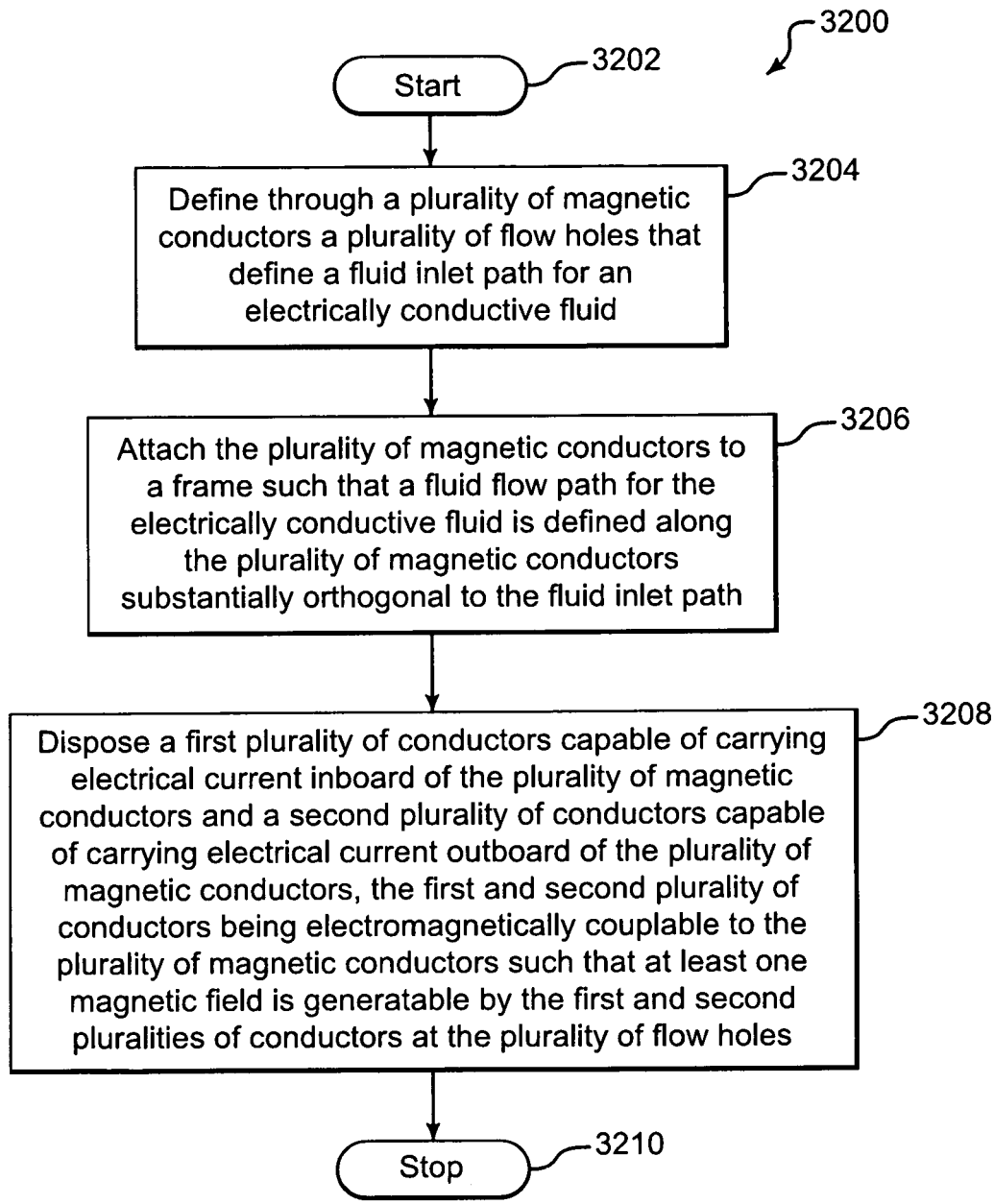
FIG. 3Q is a flowchart of another illustrative method of fabricating an electromagnetic flow regulator.

Referring now to FIG. 3Q, a method 3200 is provided for fabricating an electromagnetic flow regulator for regulating flow of an electrically conductive fluid. It will be appreciated that the method 3200 is performed to fabricate embodiments of an electromagnetic flow regulator that may regulate flow of an electrically conductive fluid by forcing flow of the electrically conductive fluid.

The method 3200 starts at a block 3202. At a block 3204 a plurality of flow holes that defines a fluid inlet path for an electrically conductive fluid is defined through a plurality of magnetic conductors. At a block 3206 the plurality of magnetic conductors is attached to a frame such that a fluid flow path for the electrically conductive fluid is defined along the plurality of magnetic conductors substantially orthogonal to the fluid inlet path. At a block 3208 a first plurality of electrical conductors is disposed inboard of the plurality of magnetic conductors and a second plurality of electrical conductors is disposed outboard of the plurality of magnetic conductors, the first and second plurality of conductors being electromagnetically couplable to the plurality of magnetic conductors such that at least one magnetic field is generatable by the first and second pluralities of conductors at the plurality of flow holes. The method 3200 stops at a block 3210.

Figure 3R:
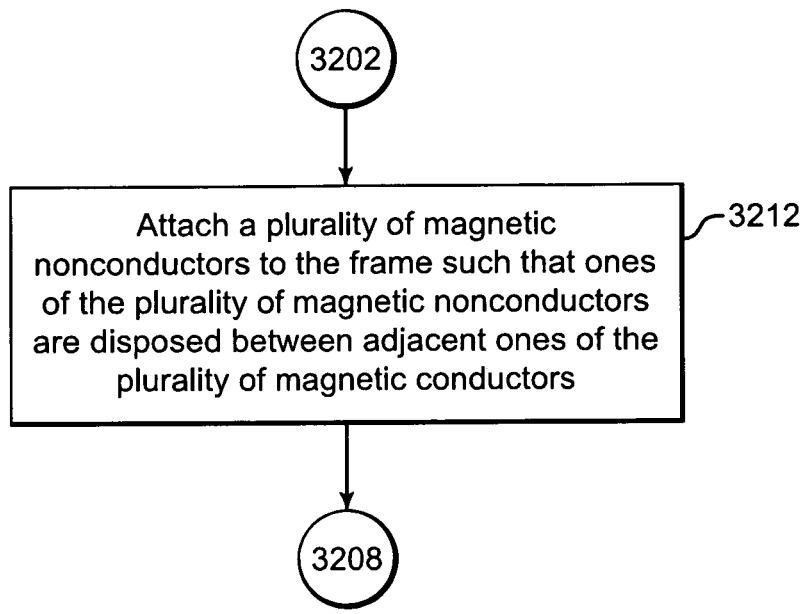
FIGS. 3R-3T are flowcharts of details of the method of FIG. 3Q.
Figure 3S:
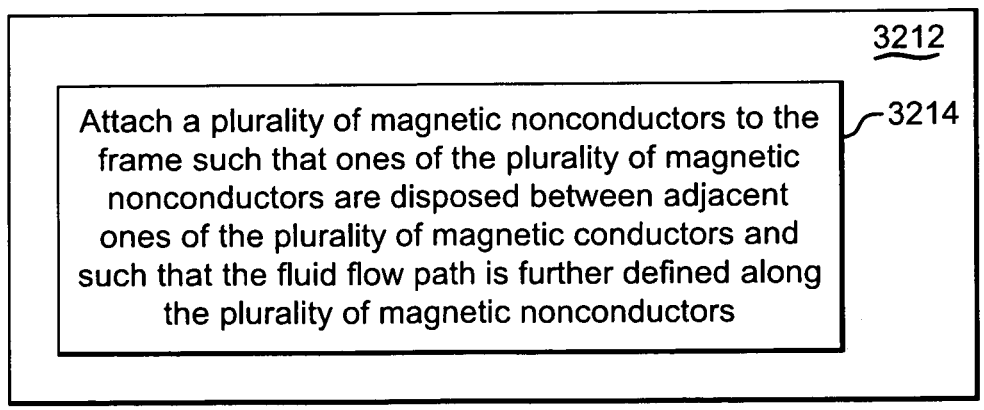

Referring additionally to FIG. 3R, in some embodiments a plurality of magnetic nonconductors may be attached to the frame such that ones of the plurality of magnetic nonconductors are disposed between adjacent ones of the plurality of magnetic conductors at a block 3212. For example and referring additionally to FIG. 3S, attaching a plurality of magnetic nonconductors to the frame such that ones of the plurality of magnetic nonconductors are disposed between adjacent ones of the plurality of magnetic conductors at the block 3212 may include attaching a plurality of magnetic nonconductors to the frame such that ones of the plurality of magnetic nonconductors are disposed between adjacent ones of the plurality of magnetic conductors and such that the fluid flow path is further defined along the plurality of magnetic nonconductors at a block 3214.

Figure 3T:
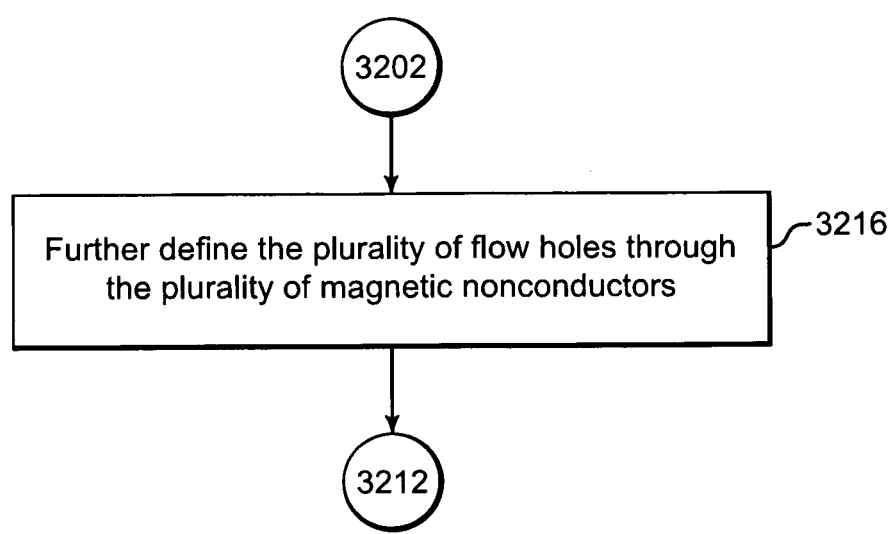

Referring additionally to FIG. 3T, the plurality of flow holes may be further defined through the plurality of magnetic nonconductors at a block 3216.

Illustrative Host Environments

It will be appreciated that embodiments of the electromagnetic flow regulator 490 may be used in any host environment in which it is desired to electromagnetically regulate flow of an electrically conductive fluid. Given by way of example only and not of limitation, embodiments of the electromagnetic flow regulator 490 may be used to: regulate flow of a molten metal (e.g., zinc, lead, aluminum, iron and magnesium in the primary metals industries; rapidly start and stop a shot of molten metal into a mold for casting; regulate the flow of a liquid metal coolant to a computer chip; modulate the rate of release of molten filler wire during electric arc welding; and the like.

Given by way of another nonlimiting example, embodiments of the electromagnetic flow regulator 490 may be used in a nuclear fission reactor to regulate flow of an electrically conductive reactor coolant. Illustrative examples related to electromagnetically regulating flow of an electrically conductive reactor coolant in a nuclear fission reactor will be discussed below.

It will be appreciated that, as discussed above, embodiments of the electromagnetic flow regulator 490 may be used in any host environment in which it is desired to electromagnetically regulate flow of an electrically conductive fluid. In the interest of brevity, discussions of host environments will be limited to that of a nuclear fission reactor. However, no limitation of applicable host environments to that of a nuclear fission reactor is intended and should not be inferred.

Reference is made in the following discussion to the electromagnetic flow regulator 490 and the drawings illustrate the electromagnetic flow regulator 490. It will be appreciated that such references and illustrations of the electromagnetic flow regulator 490 are intended to include the electromagnetic flow regulators 490*a* and 490*b*. However, in the interest of brevity, references and illustrations are made only regarding the electromagnetic flow regulator 490.

Illustrative Nuclear Fission Reactor, Systems, and Methods

Illustrative nuclear fission reactors, systems for regulating flow of an electrically conductive reactor coolant, and methods of regulating flow of an electrically conductive reactor coolant in a nuclear fission reactor will now be discussed below by way of nonlimiting examples. The examples will be discussed below by way of illustration only and not of limitation.

It may be desired to regulate flow of electrically conductive reactor coolant in a nuclear fission reactor with one or more of the electromagnetic flow regulators 490. As is known, heat is produced in a nuclear fission reactor when neutrons are liberated by fissile nuclides. This phenomenon is used in a commercial nuclear fission reactor to produce continuous heat that, in turn, is used to generate electricity.

However, possibility of heat damage to some reactor structural materials may be increased due to "peak" temperature (i.e., hot channel peaking factor) which, in turn, occurs due to uneven neutron flux distribution in the reactor core. This peak temperature is, in turn, due to heterogeneous control rod/fuel rod distribution. Heat damage may occur if the peak temperature exceeds material limits.

In addition, reactors operating in the fast neutron spectrum may be designed to have a fertile fuel "breeding blanket" material present at the core periphery. Such reactors will tend to breed fuel into the breeding blanket material through neutron absorption. This results in an increasing power output in the reactor periphery as the reactor approaches the end of a fuel cycle.

Flow of coolant through the peripheral assemblies at the beginning of a reactor fuel cycle can be established to maintain a safe operating temperature and compensate for the increase in power which will occur as burn-up increases during the fuel cycle. Typically, this requires that excess coolant pumping power be used at the beginning of a fuel cycle than is needed.

Additionally, in the case of a traveling wave nuclear fission reactor, the heat generation rate of a nuclear fission module (or assembly) may change with respect to proximity of the nuclear fission module to a nuclear fission deflagration wave associated with operating the traveling wave nuclear fission reactor.

A reactivity change (i.e., change in the responsiveness of the reactor) may be produced because of fuel burnup. Burnup is typically defined as the amount of energy generated per unit mass of fuel and is usually expressed in units of megawatt-days per metric tonne of heavy metal (MWd/MTHM) or gigawatt-days per metric tonne of heavy metal (GWd/MTHM). More specifically, reactivity change is related to the relative ability of the reactor to produce more or less neutrons than the exact amount needed to sustain a critical chain reaction. Responsiveness of a reactor is typically characterized as the time derivative of a reactivity change causing the reactor to increase or decrease in power exponentially where the time constant is known as the reactor period.

In this regard, control rods made of neutron absorbing material are typically used to adjust and control the changing reactivity. Such control rods are reciprocated in and out of the reactor core to variably control neutron absorption and thus the neutron flux level and reactivity in the reactor core. The neutron flux level is depressed in the vicinity of the control rod and potentially higher in areas remote from the control rod. Thus, the neutron flux is not uniform across the reactor core. This results in higher fuel burnup in those areas of higher neutron flux.

It will be appreciated that neutron flux and power density variations are due to many factors. Proximity to a control rod may or may not be the primary factor. For example, the neutron flux typically drops significantly at core boundaries when no nearby control rod is present. This effect, in turn, may cause overheating or peak temperatures in those areas of higher neutron flux. Such peak temperatures may undesirably reduce the operational life of structures subjected to such peak temperatures by altering the mechanical properties of the structures. Also, reactor power density, which is proportional to the product of the neutron flux and the fission macroscopic cross-section, may be limited by the ability of core structural materials to withstand such peak temperatures without damage.

Regulating flow of reactor coolant into individual nuclear fission fuel assemblies (sometimes referred to herein as nuclear fission modules) can help tailor flow of reactor coolant as desired to help achieve a more uniform temperature profile and/or power density profile across the reactor core. A more uniform temperature profile or power density profile across the reactor core can help lessen the possibility of heat damage to some reactor structural materials. In cases when the reactor coolant is an electrically conductive fluid, the electromagnetic flow regulator 490 may be used to help regulate flow of the electrically conductive reactor coolant. Some illustrative details will be discussed below by way of illustration only and not of limitation.

Figure 4A:
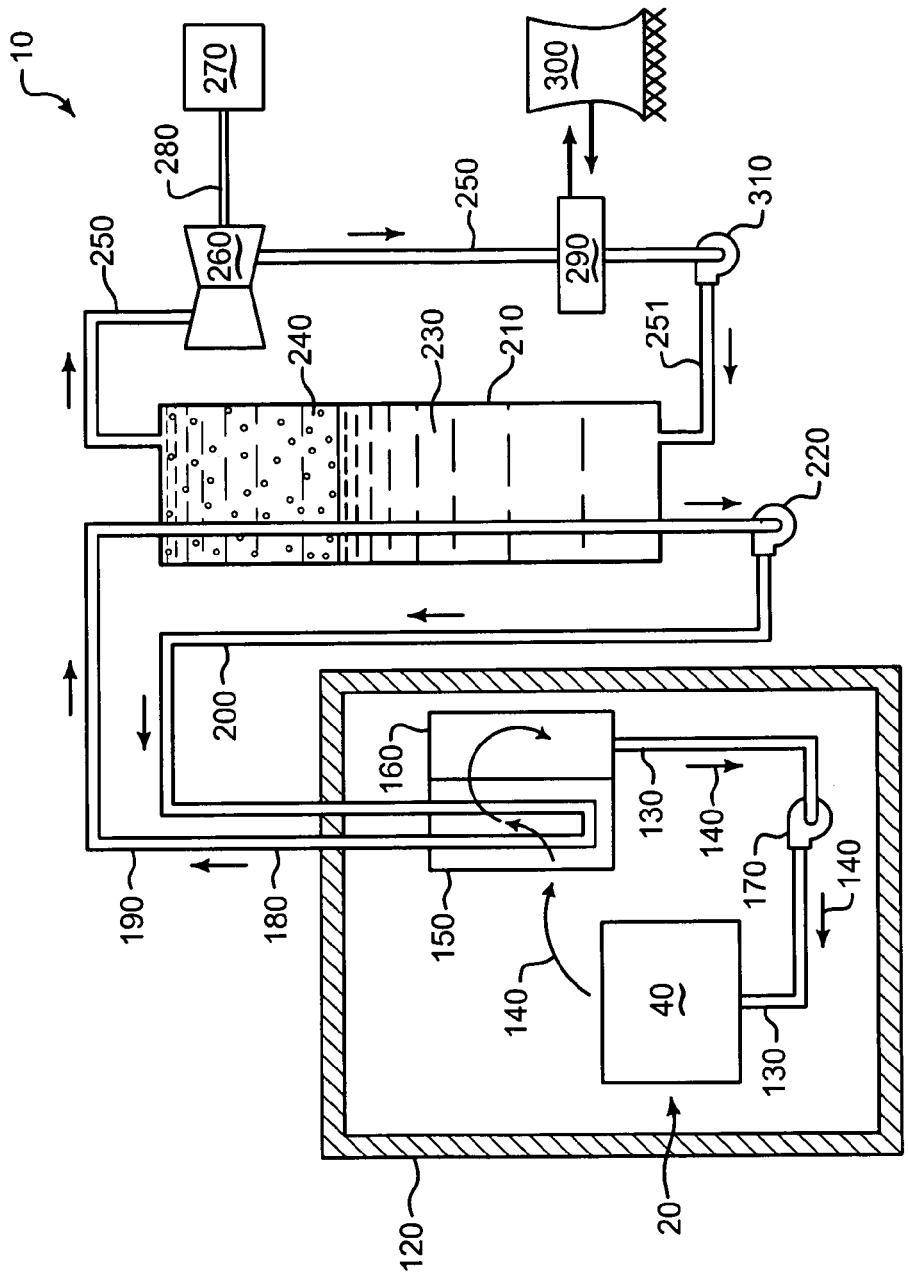
FIG. 4A is a schematic illustration of an illustrative nuclear fission reactor system.

Referring now to FIG. 4A by way of example only and not by way of limitation, a nuclear fission reactor system 10 includes an electrically conductive reactor coolant. The nuclear fission reactor system 10 includes at least one electromagnetic flow regulator 490 (not shown in FIG. 4A for purposes of clarity) to help regulate flow of the electrically conductive reactor coolant. As described more fully hereinbelow, the nuclear fission reactor system 10 may be a "traveling wave" nuclear fission reactor system.

Given by way of brief overview, in some embodiments the reactor system 10 generates electricity that is transmitted over transmission lines (not shown) to users of the electricity. In some other embodiments the reactor system 10 may be used to conduct tests, such as tests to determine effects of temperature on reactor materials.

Figure 4B:
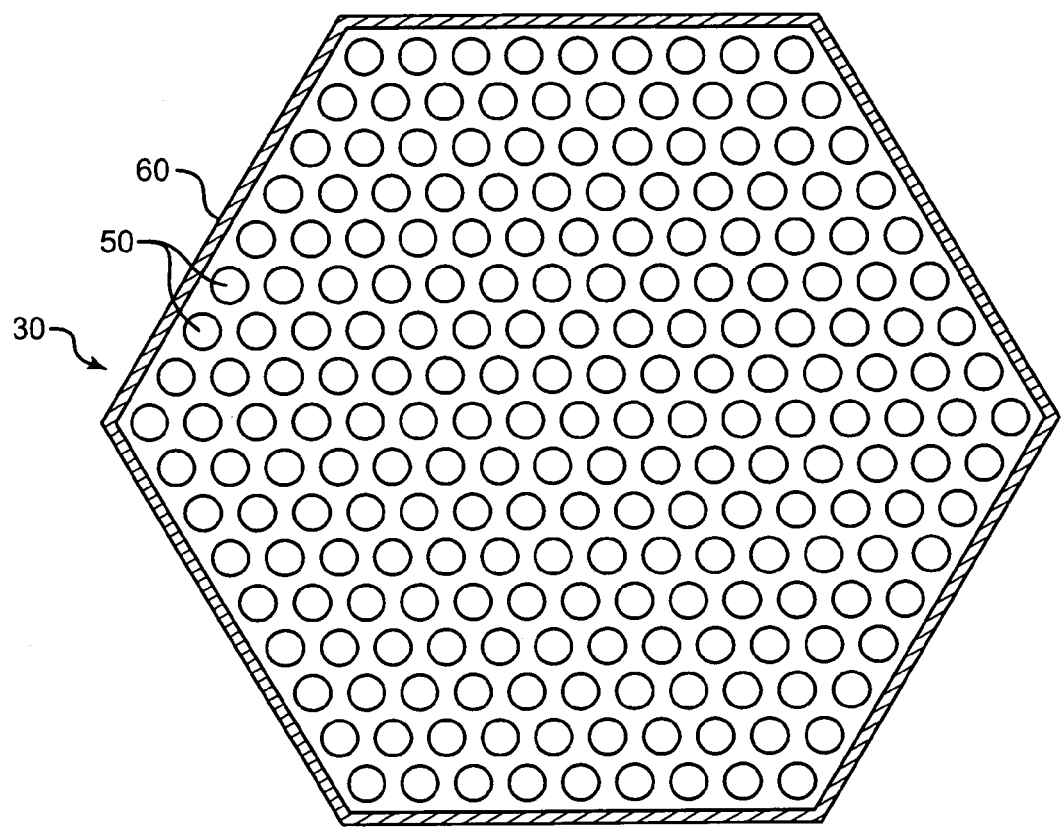
FIG. 4B is a top plan view in partial schematic form of an illustrative nuclear fission module.

Referring to FIGS. 4A and 4B, the reactor system 10 includes a nuclear fission reactor core 20 that includes nuclear fission fuel assemblies or, as also referred to herein, nuclear fission modules 30. The nuclear fission reactor core 20 is sealingly housed within a reactor core enclosure 40. By way of example only and not by way of limitation, each nuclear fission module 30 may form a hexagonally shaped structure in transverse cross-section, as shown, so that more nuclear fission modules 30 may be closely packed together within the reactor core 20 (as compared to other shapes for the nuclear fission module 30, such as cylindrical or spherical shapes). Each nuclear fission module 30 includes fuel rods 50 for generating heat due to the nuclear fission chain reaction process.

The fuel rods 50 may be surrounded by a fuel rod canister 60, if desired, for adding structural rigidity to the nuclear fission modules 30 and for segregating the nuclear fission modules 30 one from another the when nuclear fission modules 30 are disposed in the nuclear fission reactor core 20. Segregating the nuclear fission modules 30 one from another avoids transverse coolant cross flow between adjacent nuclear fission modules 30. Avoiding transverse coolant cross flow prevents transverse vibration of the nuclear fission modules 30. Such transverse vibration might otherwise increase risk of damage to the fuel rods 50.

In addition, segregating the nuclear fission modules 30 one from another allows control of coolant flow on an individual module-by-module basis, as described more fully hereinbelow. Controlling coolant flow to individual nuclear fission modules 30 efficiently manages coolant flow within the reactor core 20, such as by directing coolant flow substantially according to the non-uniform temperature distribution in the reactor core 20. In other words, more coolant may be directed to those nuclear fission modules 30 having higher temperature.

In some illustrative embodiments and given by way of illustration and not of limitation, the coolant may have an average nominal volumetric flow rate of approximately 5.5 $m^3$/sec (i.e., approximately 194 cubic $ft^3$/sec) and an average nominal velocity of approximately 2.3 m/sec (i.e., approximately 7.55 ft/sec) in the case of an illustrative sodium cooled reactor during normal operation. The fuel rods 50 are adjacent one to another and define a coolant flow channel 80 (see FIG. 4C) therebetween for allowing flow of coolant along the exterior of the fuel rods 50. The canister 60 may include means (not shown) for supporting and for tying the fuel rods 50 together. Thus, the fuel rods 50 are bundled together within the canister 60 so as to form the hexagonal nuclear fission modules 30. Although the fuel rods 50 are adjacent to each other, the fuel rods 50 are maintained in a spaced-apart relationship by a wire wrapper 90 (see FIG. 5B) that surrounds and extends spirally along the length of each fuel rod 50 in a serpentine fashion.

The fuel rods 50 include nuclear fuel material. Some of the fuel rods 50 include a fissile nuclide, such as without limitation uranium-235, uranium-233, or plutonium-239. Some of the fuel rods 50 may include a fertile nuclide, such as without limitation thorium-232 and/or uranium-238, which may be transmuted via neutron capture during the fission process into fissile nuclides. In some embodiments some of the fuel rods 50 may include a predetermined mixture of fissile and fertile nuclides.

Referring back to FIG. 4A, the reactor core 20 is disposed within a reactor pressure vessel 120 for preventing leakage of radioactive materials, gasses or liquids from the reactor core 20 to the surrounding biosphere. The pressure vessel 120 may be made of steel or other material of suitable size and thickness to reduce risk of such radiation leakage and to support required pressure loads. In addition, in some embodiments a containment vessel (not shown) may sealingly surround parts of the reactor system 10 for further reducing possibility of leakage of radioactive particles, gasses or liquids from the reactor core 20 to the surrounding biosphere.

A primary loop coolant pipe 130 is coupled to the reactor core 20 for allowing a suitable coolant to flow through the reactor core 20 in order to cool the reactor core 20. The primary loop coolant pipe 130 may be made from any suitable material, such as stainless steel. It will be appreciated that, if desired, the primary coolant loop pipe 130 may be made not only from ferrous alloys, but also from non-ferrous alloys, zirconium-based alloys or other suitable structural materials or composites As discussed above, the coolant carried by primary loop coolant pipe 130 is an electrically conductive fluid, which is defined herein to mean any fluid that facilitates the passage of electrical current. For example, in some embodiments the electrically conductive fluid may be a liquid metal such as without limitation sodium, potassium, lithium, lead and mixtures thereof. For example, in an illustrative embodiment the coolant may suitably be a liquid sodium (Na) metal or sodium metal mixture, such as sodium-potassium (Na—K). In some other embodiments the coolant may be a metal alloy, such as lead-bismuth (Pb—Bi). In some other embodiments the electrically conductive fluid may have electrically conductive metal particles dispersed in a carrier fluid by means of a dispersant, such as mineral oil or the like.

Depending on the particular reactor core design and operating history, normal operating temperature of a sodium-cooled reactor core may be relatively high. For example, in the case of a 500 to 1,500 MWe sodium-cooled reactor with mixed uranium-plutonium oxide fuel, the reactor core outlet temperature during normal operation may range from approximately 510° Celsius (i.e., 950° Fahrenheit) to approximately 550° Celsius (i.e., 1,020° Fahrenheit). On the other hand, during a LOCA (Loss Of Coolant Accident) or LOFTA (Loss of Flow Transient Accident) peak fuel cladding temperatures may reach about 600° Celsius (i.e. 1,110° Fahrenheit) or more, depending on reactor core design and operating history. Moreover, decay heat build-up during post-LOCA or post-LOFTA scenarios and also during suspension of reactor operations may produce unacceptable heat accumulation. In some cases, therefore, it is appropriate to control coolant flow to the reactor core 20 during both normal operation and post accident scenarios.

As briefly mentioned above, the temperature profile in the reactor core 20 varies as a function of location. In this regard, the temperature distribution in the reactor core 20 may closely follow the power density spatial distribution in the reactor core 20. It will be appreciated that the power density near the center of the reactor core 20 is generally higher than the power density near the periphery of the reactor core 20—particularly in the presence of a suitable neutron reflector or neutron breeding "blanket" surrounding the periphery of the reactor core 20. Thus, it is to be expected that coolant flow parameters for the nuclear fission modules 30 near the periphery of the reactor core 20 would be less than coolant flow parameters for the nuclear fission modules 30 near the center of the reactor core 20, especially at the beginning of core life.

Hence, in this case, it would be unnecessary to provide the same or uniform coolant mass flow rate to each nuclear fission module 30. As described in detail hereinbelow, the electromagnetic flow regulator 490 is provided to vary coolant flow to individual nuclear fission modules 30 depending on location of the nuclear fission modules 30 in the reactor core 20 and/or depending on desired reactor operating parameters.

Still referring to FIG. 4A as a brief overview, the heat-bearing coolant flows along a coolant flow stream or flow path 140 to an intermediate heat exchanger 150 and into a plenum volume 160 associated with the intermediate heat exchanger 150. After flowing into the plenum volume 160, the coolant continues through the primary loop pipe 130. The coolant leaving plenum volume 160 has been cooled due to the heat transfer occurring in the intermediate heat exchanger 150. A pump 170 is coupled to the primary loop pipe 130 and is in fluid communication with the reactor coolant. The pump 170 pumps the reactor coolant through the primary loop pipe 130, through the reactor core 20, along the coolant flow path 140, into the intermediate heat exchanger 150, and into the plenum volume 160.

Details regarding coupling of the electromagnetic flow regulator 490 will be discussed later. In general, in embodiments in which the electromagnetic flow regulator 490 is configured as the electromagnetic flow regulator 490a, the electromagnetic flow regulator 490a is capable of restricting flow of the electrically conductive reactor coolant from the pump 170. The electromagnetic flow regulator 490a may develop all or a portion of the pressure drop conventionally developed using flow orificing. Use of the electromagnetic flow regulator 490a can help reduce or, in some cases, may help eliminate pressure drop dependence from orificing.

In other embodiments in which the electromagnetic flow regulator 490 is configured into the electromagnetic flow regulator 490b, the electromagnetic flow regulator 490b can help to establish, accelerate, or maintain flow velocity of the electrically conductive reactor coolant or can be used to restrict flow of the electrically conductive reactor coolant.

Thus, it will be appreciated that the electromagnetic flow regulator 490 can be configured as the electromagnetic flow regulator 490a to restrict flow of the electrically conductive reactor coolant from the pump 170 to individual nuclear fission modules 30 or as the electromagnetic flow regulator 490b to either controllably supplement or restrict flow of the electrically conductive reactor coolant from the pump 170 to individual nuclear fission modules 30.

In some embodiments, the electromagnetic flow regulator 490b can be configured to provide all or a portion of the flow established by the pump 170. In this regard, the pump 170 and the electromagnetic flow regulator 490b can operate simultaneously or individually to provide and regulate coolant flow to the reactor core 20 and individual nuclear fission modules 30.

Referring still to FIG. 4A, a secondary loop pipe 180 is provided for removing heat from the intermediate heat exchanger 150. The secondary loop pipe 180 includes a secondary "hot" leg pipe segment 190 and a secondary "cold" leg pipe segment 200. The secondary cold leg pipe segment 200 is integrally formed with the secondary hot leg pipe segment 190 so as to form a closed loop. The secondary loop pipe 180 contains a fluid, which suitably may be liquid sodium or a liquid sodium mixture. The secondary hot leg pipe segment 190 extends from the intermediate heat exchanger 150 to a steam generator 210. In some embodiments, the steam generator 210 may be configured as a steam generator and superheater combination.

After passing through the steam generator 210, the coolant flowing through the secondary loop pipe 180 and exiting the steam generator 210 is at a lower temperature and enthalpy than before entering the steam generator 210 due to the heat transfer occurring within the steam generator 210. After passing through the steam generator 210, the coolant is pumped by a pump 220 along the "cold" leg pipe segment 200, which extends into the intermediate heat exchanger 150 for transferring heat from the coolant flow path 140 to the secondary loop pipe 180.

A body of water 230 disposed in the steam generator 210 has a predetermined temperature and pressure. The fluid flowing through the secondary hot leg pipe segment 190 will transfer its heat to the body of water 230, which is at a lower temperature than the fluid flowing through the secondary hot leg pipe segment 190. As the fluid flowing through the secondary hot leg pipe segment 190 transfers its heat to the body of water 230, a portion of the body of water 230 will vaporize to steam 240 according to the predetermined temperature and pressure within the steam generator 210. The steam 240 will then travel through a steam line 250 which has one end thereof in vapor communication with the steam 240 and another end thereof in liquid communication with the body of water 230. A rotatable turbine 260 is coupled to the steam line 250, such that turbine the 260 rotates as the steam 240 passes therethrough. An electrical generator 270, which is coupled to the turbine 260, such as by a rotatable turbine shaft 280, generates electricity as the turbine 260 rotates. In addition, a condenser 290 is coupled to the steam line 250 and receives the steam passing through the turbine 260. The condenser 290 condenses the steam 240 to liquid water and passes any waste heat to a heat sink 300, such as a cooling tower or the like, which is associated with the condenser 290. The liquid water condensed by the condenser 290 is pumped along the steam line 250 from the condenser 290 to the steam generator 210 by a pump 310 interposed between the condenser 290 and the steam generator 210.

It will be appreciated that the reactor system 10 discussed above has been given by way of a nonlimiting example. The reactor system 10 and its details have been explained by way of illustration only and not of limitation.

It will be appreciated that the nuclear fission modules 30 may be arranged within the reactor core 20 in any configuration as desired. For example, in various embodiments the nuclear fission modules 30 may be arranged to define a hexagonally shaped configuration, a cylindrically-shaped configuration, a parallelpiped shaped configuration, or the like.

Figure 4C:
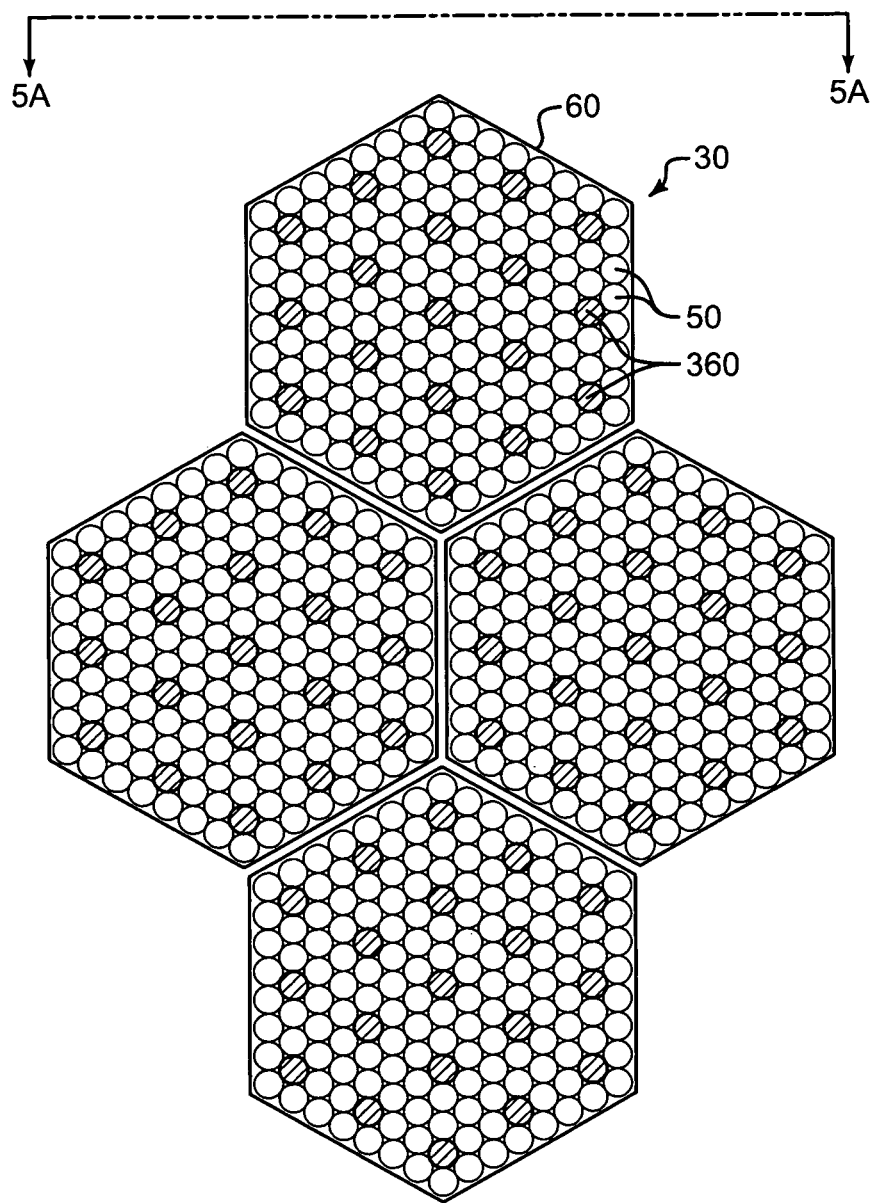
FIG. 4C is a top plan view in partial schematic form of illustrative nuclear fission modules of FIG. 4B.

Referring to FIG. 4C, regardless of the configuration chosen for the reactor core 20, spaced apart, longitudinally extending and longitudinally movable control rods 360 are each disposed within a control rod guide tube or cladding (not shown). The control rods 360 are symmetrically disposed within selected nuclear fission modules 30 and extend the length of a predetermined number of nuclear fission modules 30. The control rods 360, which are shown disposed in a predetermined number of the nuclear fission modules 30, control the neutron fission reaction occurring in nuclear fission modules 30. In other words, the control rods 360 include a suitable neutron absorber material having an acceptably high neutron capture or absorption cross-section. In this regard, the absorber material may be a metal or metalloid such as without limitation lithium, silver, indium, cadmium, boron, cobalt, hafnium, dysprosium, gadolinium, samarium, erbium, europium and mixtures thereof, or a compound or alloy such as without limitation silver-indium-cadmium, boron carbide, zirconium diboride, titanium diboride, hafnium diboride, gadolinium titanate, dysprosium titanate and mixtures thereof.

The control rods 360 will controllably supply negative reactivity to the reactor core 20. Thus, the control rods 360 provide a reactivity management capability to the reactor core 20. In other words, the control rods 360 are capable of controlling the neutron flux profile across the reactor core 20 and thus influence the temperature profile across the reactor core 20.

Figure 4D:
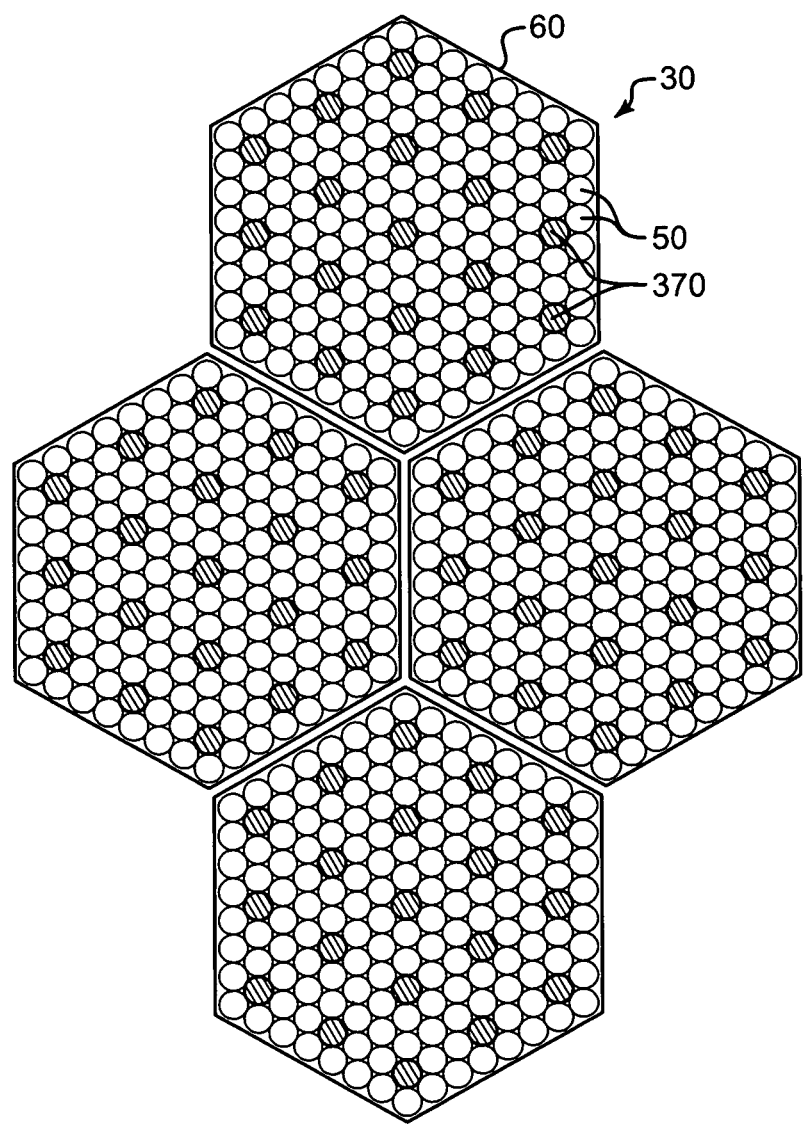
FIG. 4D is a top plan view in partial schematic form of other illustrative nuclear fission modules of FIG. 4B.
Figure 4E:
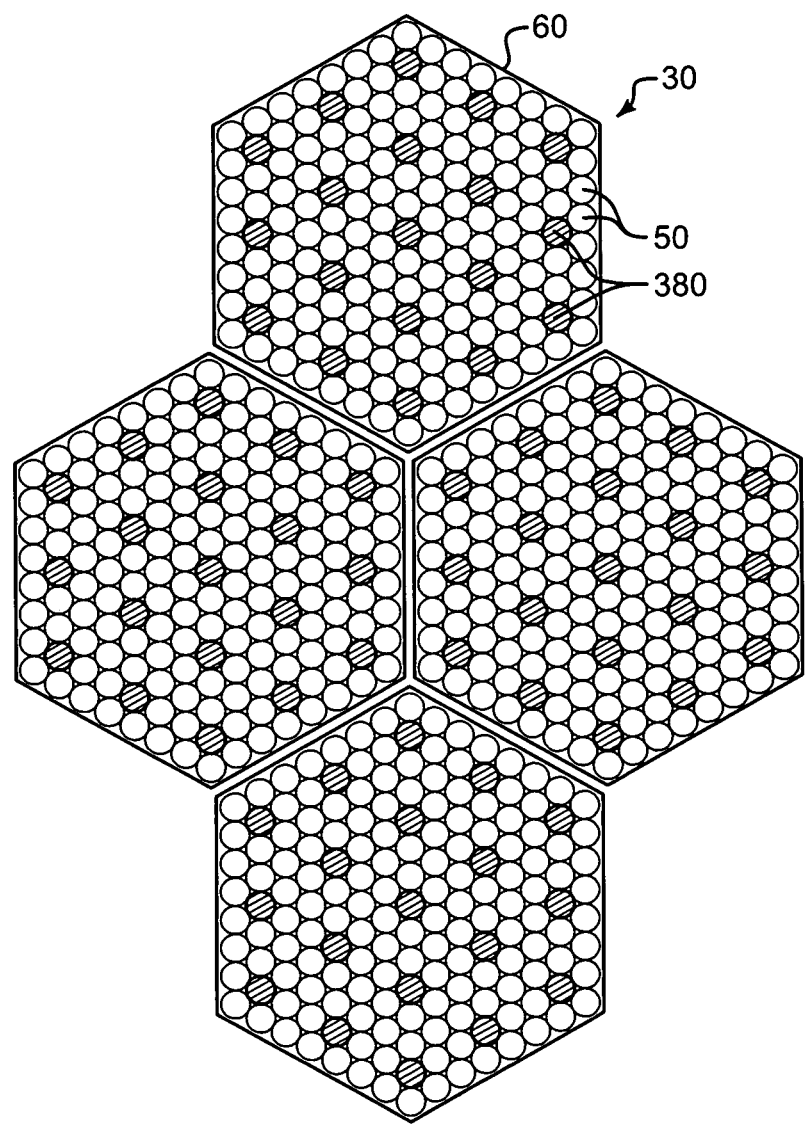
FIG. 4E is a top plan view in partial schematic form of other illustrative nuclear fission modules of FIG. 4B.

Referring to FIGS. 4D and 4E, in some embodiments the nuclear fission module 30 need not be neutronically active. In other words, the nuclear fission module 30 need not contain any fissile material. In this case, the nuclear fission module 30 may be a purely fertile assembly or a purely reflective assembly or a combination of both. In this regard, the nuclear fission module 30 may be a breeder nuclear fission module including breeder rods 370 (FIG. 4D) containing nuclear breeding material or a reflective nuclear fission module including reflector rods 380 (FIG. 4E) containing a reflective material.

In some other embodiments, the nuclear fission module 30 may contain fuel rods 50 in combination with the breeder rods 370 (FIG. 4D) or the reflector rods 380 (FIG. 4E).

Thus, it will be appreciated that the nuclear fission module 30 may include any suitable combination of nuclear fuel rods 50, control rods 360, breeding rods 370, and reflector rods 380.

Regardless of whether or not the fuel rods 50 are included in the nuclear fission module 30, the fertile nuclear breeding material in the breeding rods 370 may include without limitation thorium-232 and/or uranium-238. Also regardless of whether or not the fuel rods 50 are included in the nuclear fission module 30, the reflector material may include a material such as without limitation beryllium (Be), tungsten (W), vanadium (V), depleted or natural uranium (U), thorium (Th), lead alloys and mixtures thereof.

Figure 4F:
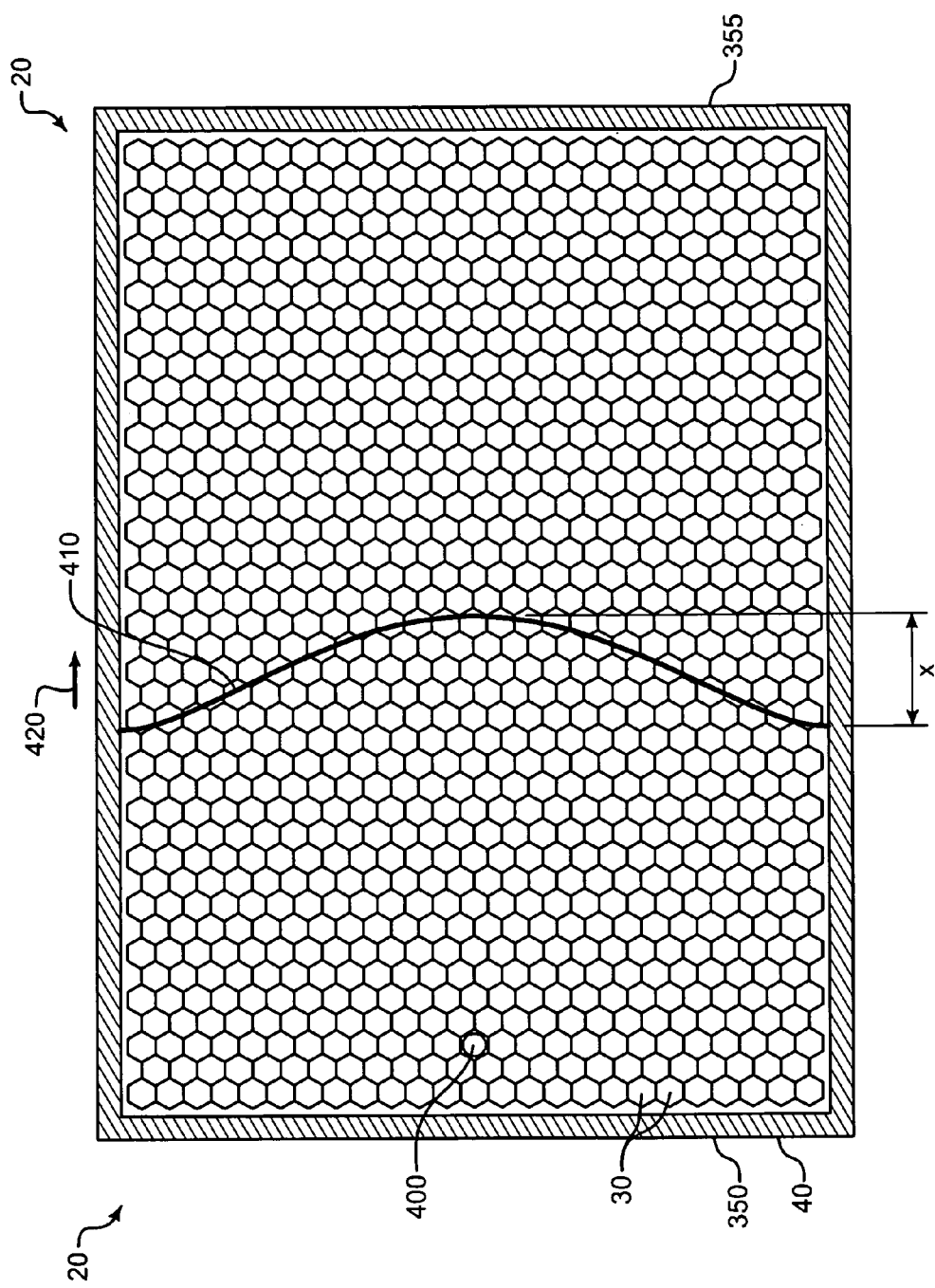
FIG. 4F is a top plan view in partial schematic form of an illustrative traveling wave reactor core.

Referring now to FIG. 4F, regardless of the configuration selected for the nuclear fission reactor core 20, the nuclear fission reactor core 20 may be configured as a traveling wave nuclear fission reactor core. In this regard, a nuclear fission igniter 400, which may include isotopic enrichment of nuclear fissionable material such as without limitation, U-233, U-235 or Pu-239, is suitably located in any desired location within the reactor core 20. By way of example only and not by way of limitation, in a parallelpiped configuration as shown, the igniter 400 may be located near a first end 350 that is opposite a second end 355 of the reactor core 20. Neutrons are released by the igniter 400. The neutrons that are released by the igniter 400 are captured by fissile and/or fertile material within the nuclear fission modules 30 to initiate the fission chain reaction. The igniter 400 may be removed once the fission chain reaction becomes self-sustaining, if desired.

The igniter 400 initiates a three-dimensional, traveling wave 410 (sometimes referred to as a propagating wave or a burn wave) having a width "x". When the igniter 400 releases its neutrons to cause "ignition", the burn wave 410 travels outwardly from the igniter 400 toward the second end 355 of the reactor core 20, so as to form the traveling or propagating burn wave 410. Thus, each nuclear fission module 30 is capable of accepting at least a portion of the traveling burn wave 410 as the burn wave 410 propagates through the reactor core 20.

Speed of the traveling burn wave 410 may be constant or non-constant. Thus, the speed at which the burn wave 410 propagates can be controlled. For example, longitudinal movement of the control rods 360 (not shown in FIG. 4F for clarity purposes) in a predetermined or programmed manner can drive down or lower neutronic reactivity of the fuel rods 50 (not shown in FIG. 4F for clarity purposes) that are disposed in the nuclear fission modules 30. In this manner, neutronic reactivity of the fuel rods 50 that are presently being burned at the location of the burn wave 410 can be driven down or lowered relative to neutronic reactivity of "unburned" fuel rods 50 ahead of the burn wave 410.

This result gives the burn wave propagation direction indicated by arrow 420. Controlling reactivity in this manner enhances the propagation rate of the burn wave 410 subject to operating constraints for the reactor core 20. For example, enhancing the propagation rate of the burn wave 410 can help control burn-up above a minimum value needed for propagation and a maximum value set, in part, by neutron fluence limitations of reactor core structural materials. Such control of propagation of a traveling wave is described in U.S. patent application Ser. No. 12/384,669, entitled TRAVELING WAVE NUCLEAR FISSION REACTOR, FUEL ASSEMBLY, AND METHOD OF CONTROLLING BURNUP THEREIN, naming CHARLES E. AHLFELD, JOHN ROGERS GILLELAND, RODERICK A. HYDE, MURIEL Y. ISHIKAWA, DAVID G. MCALEES, NATHAN P. MYHRVOLD, CHARLES WHITMER, LOWELL L. WOOD, JR., AND GEORGE B. ZIMMERMAN as inventors, filed Apr. 6, 2009, the contents of which are hereby incorporated by reference.

The basic principles of a traveling wave nuclear fission reactor are disclosed in more detail in U.S. patent application Ser. No. 11/605,943, entitled NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference.

Figure 5A:
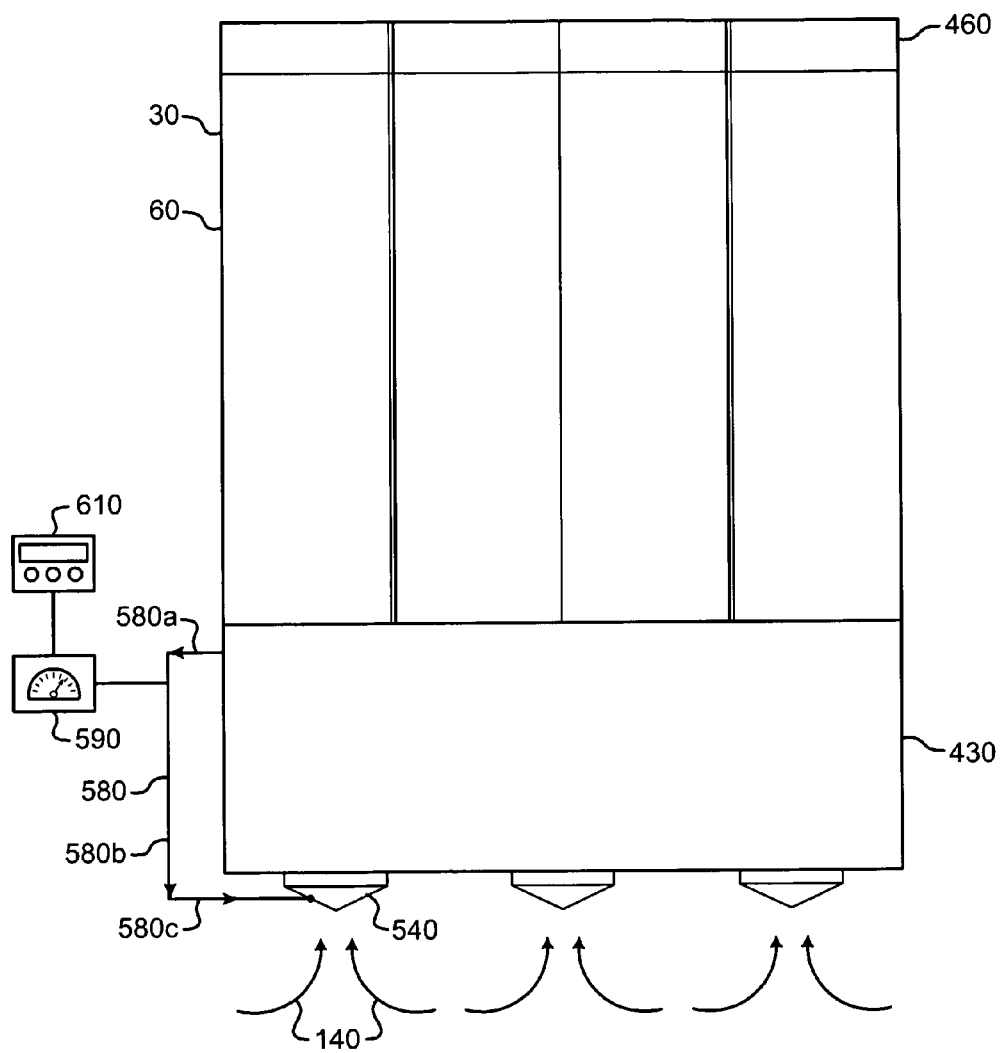
FIG. 5A is a schematic illustration of components of an illustrative nuclear fission reactor.
Figure 5B:
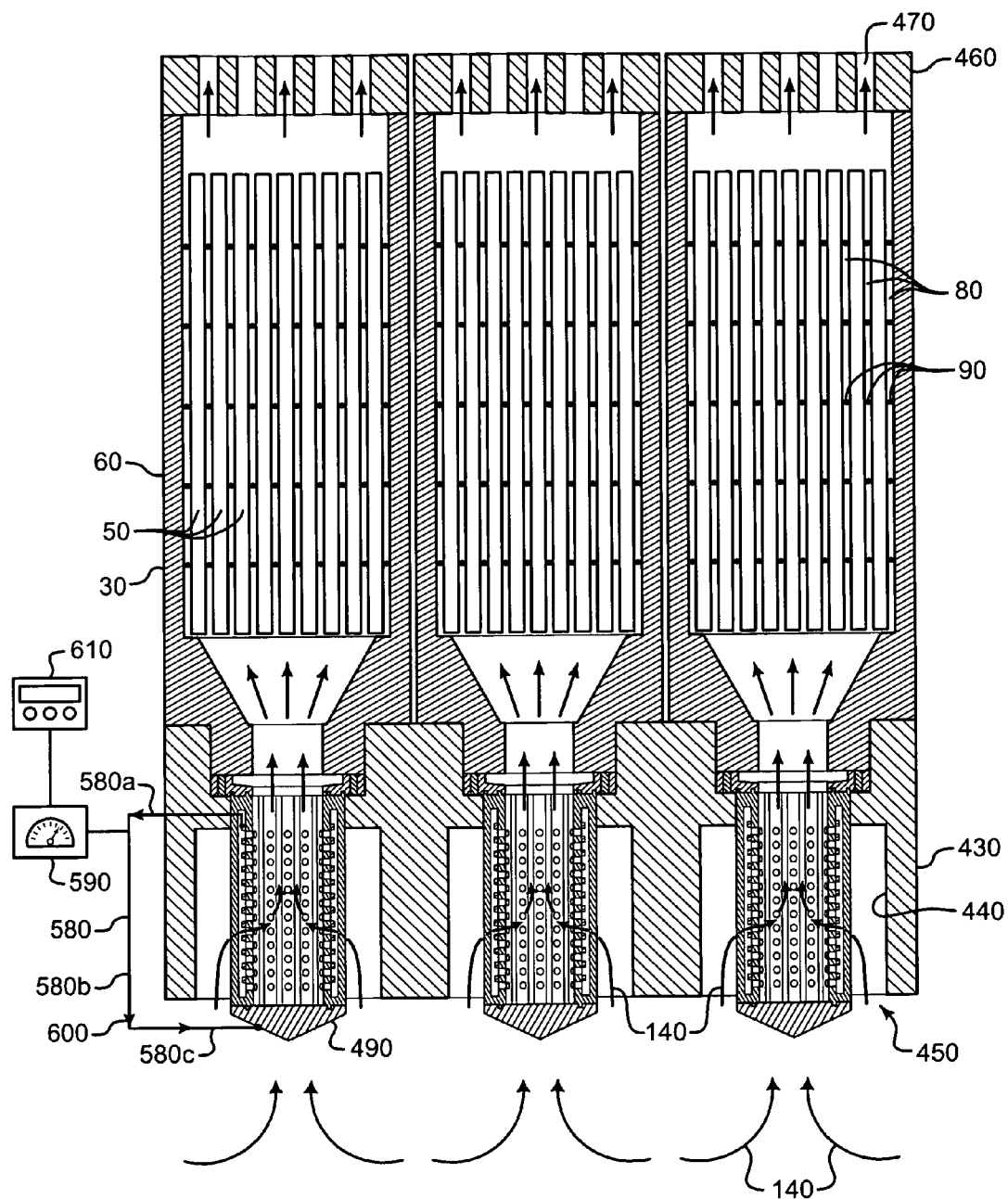
FIGS. 5B-5C are partial cutaway side plan views in partial schematic form of illustrative electromagnetic flow regulators and nuclear fission modules.

Referring now to FIGS. 5A and 5B, each nuclear fission module 30 is mounted on a horizontally-extending reactor core lower support plate 430. Only three adjacent nuclear fission modules 30 are shown, it being understood that a greater or lesser number of nuclear fission modules 30 may be present in the reactor core 20. The reactor core lower support plate 430 suitably extends across a bottom portion of all of the nuclear fission modules 30.

The reactor core lower support plate 430 has a counter bore 440 therethrough. The counter bore 440 has an open end 450 for allowing flow of coolant thereinto. Horizontally extending across a top portion or exit portion of all of the nuclear fission modules 30 and removably connected to all of the nuclear fission modules 30 may be a reactor core upper support plate 460 that caps all of the nuclear fission modules 30. The reactor core upper support plate 460 also may define flow slots 470 for allowing flow of coolant therethrough.

As discussed above, it is desirable to control the temperature of the reactor core 20 and the nuclear fission modules 30 therein, regardless of the configuration selected for reactor core 20. For example, possibility of heat damage to reactor core structural materials may be increased if the peak temperature exceeds material limits. Such peak temperatures may undesirably reduce the operational life of structures subjected to peak temperatures by altering the mechanical properties of the structures, particularly those properties relating to thermal creep. Also, reactor power density is limited, in part, by the ability of core structural materials to withstand high peak temperatures without damage. Also, controlling reactor core temperature may be important for successfully conducting tests, such as tests to determine effects of temperature on reactor materials.

In addition, the nuclear fission modules 30 disposed at or near the center of the reactor core 20 may generate more heat than the nuclear fission modules 30 disposed at or near the periphery of the reactor core 20. Therefore, it would be inefficient to supply a uniform coolant mass flow rate across the reactor core 20 because higher heat flux nuclear fission modules 30 near the center of the reactor core 20 would involve a higher coolant mass flow rate than the nuclear fission modules 30 near the periphery of the reactor core 20, particularly at the beginning of core life.

Referring now to FIGS. 4A, 5A, and 5B, the primary loop pipe 130 delivers reactor coolant to the nuclear fission modules 30 along a coolant flow path or fluid stream indicated by directional flow arrows 140. The primary coolant then continues along the coolant flow path 140 and through an open end 450 that is formed in the core lower support plate 430. The core lower support plate 430 may also form a portion of a core inlet flow plenum. As described in more detail hereinbelow, the reactor coolant can be used to remove heat from or cool selected ones of the nuclear fission modules 30, such as nuclear fission modules 30 disposed in a traveling wave nuclear fission reactor core at the location or vicinity of traveling burn wave 410 (not shown in FIGS. 4A, 5A, or 5B) within the traveling wave nuclear fission reactor core. In other words, in some cases the nuclear fission module 30 may be selected, at least in part, on the basis of whether or not the burn wave 410 is located, detected, or otherwise is disposed within or in the vicinity of or at a location relative to the nuclear fission module 30, as described in more detail below.

Referring additionally to FIG. 4F, in order to regulate flow of electrically conductive reactor coolant to the selected one of nuclear fission modules 30, an electromagnetic flow regulator 490 and associated control system is coupled to at least one nuclear fission module 30. It is again emphasized that, although the discussion and illustrations are directed to the electromagnetic flow regulator 490, except if specifically indicated otherwise the discussion and illustrations are intended to encompass the electromagnetic flow regulators 490a and 490b. In some embodiments, the electromagnetic flow regulator 490 may be integrally connected to the nuclear fission module 30. In some other embodiments, the electromagnetic flow regulator 490 may be connected to the lower support plate 430.

In some embodiments, the electromagnetic flow regulator 490 is adapted to supply a relatively lesser amount of coolant to the nuclear fission module 30 when a lesser amount of the burn wave 410 (i.e., lesser intensity of the burn wave 410) is present within or at a location relative to the nuclear fission module 30. On the other hand, in some embodiments the electromagnetic flow regulator 490 is adapted to supply a relatively greater amount of coolant to the nuclear fission module 30 when a greater amount of the burn wave 410 (i.e., greater intensity of the burn wave 410) is present within or at least at a location relative to the nuclear fission module 30. Presence and intensity of the burn wave 410 may be identified by any one or more suitable parameter, such as without limitation temperature within or relative to the nuclear fission module 30, neutron flux within or relative to the fission module 30, neutron fluence within or relative to the fission module 30, power level within the nuclear fission module 30, a characteristic isotope within the nuclear fission module 30, pressure within the nuclear fission module 30, flow rate of the electrically conductive fluid within the nuclear fission module 30, heat generation rate within the nuclear fission module 30, a width "x" of the burn wave 410, and/or other suitable operating parameter associated with the nuclear fission module 30.

Figure 5C:
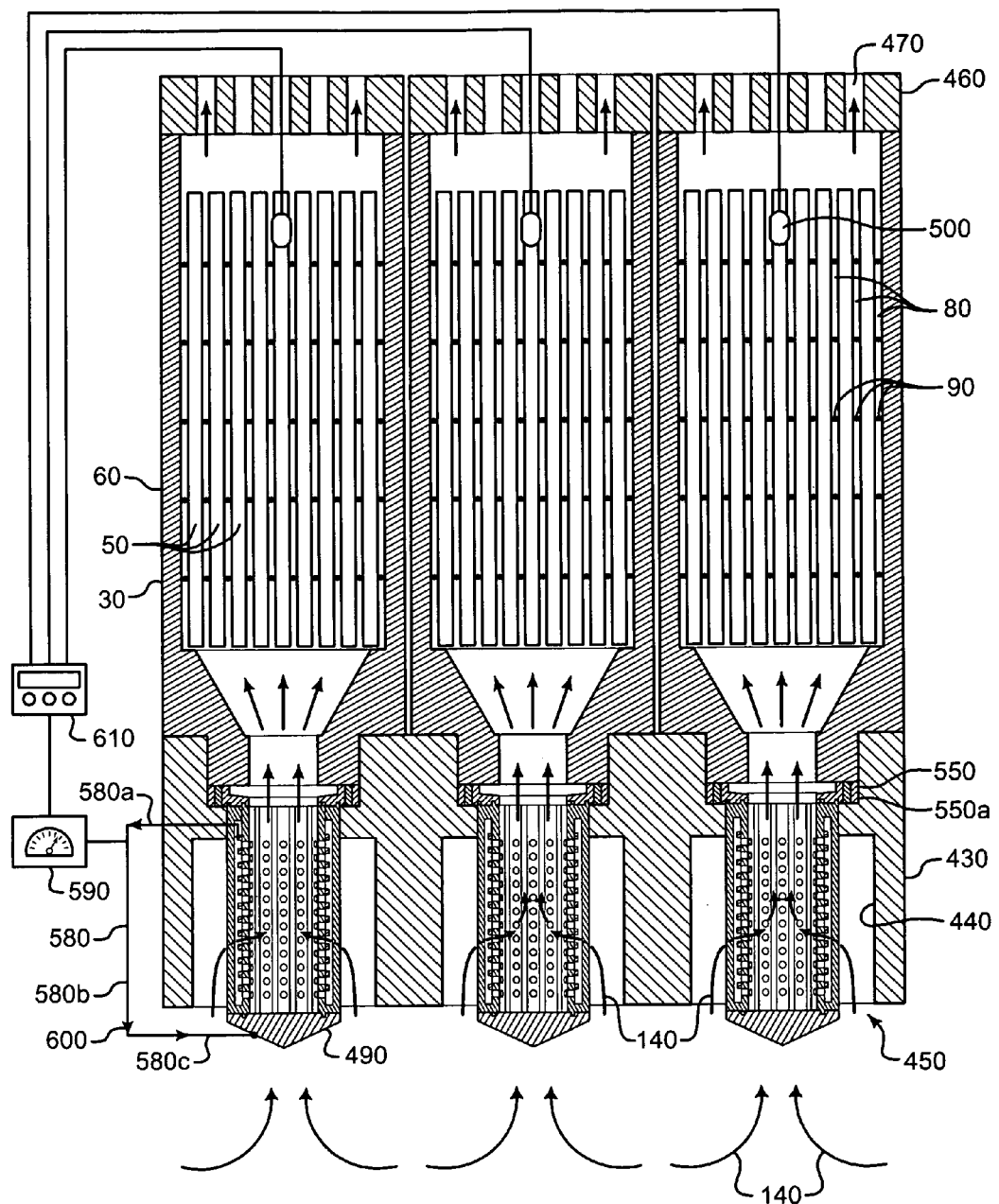

Referring additionally to FIG. 5C, in some embodiments the electromagnetic flow regulator 490 may be adapted to be operated in response to an operating parameter associated with the nuclear fission module 30. In such embodiments, not only does the electromagnetic flow regulator 490 control flow of the coolant in response to the location of the burn wave 410 relative to the nuclear fission modules 30, the electromagnetic flow regulator 490 also controls flow of the coolant in response to certain operating parameters associated with the reactor core 20 and the nuclear fission module 30. In this regard, at least one sensor 500 may be disposed in or near the nuclear fission module 30 to sense status of the operating parameter.

For example, the operating parameter sensed by the sensor 500 may be a current temperature associated with the nuclear fission module 30. In order to sense temperature, the sensor 500 may be a thermocouple device or temperature sensor that may be available from Thermocoax, Incorporated located in Alpharetta, Ga. U.S.A.

As another example, the operating parameter sensed by the sensor 500 may be neutron flux in the nuclear fission module 30. In order to sense neutron flux, the sensor 500 may be a "PN9EB20/25" neutron flux proportional counter detector or the like, such as may be available from Centronic House, Surrey, England.

As another example, the operating parameter sensed by the sensor 500 may be a characteristic isotope in the nuclear fission module 30. The characteristic isotope may be a fission product, an activated isotope, a transmuted product produced by breeding or other characteristic isotope.

As another example, the operating parameter sensed by the sensor 500 may be neutron fluence in the nuclear fission module 30. As is known, neutron fluence is defined as the neutron flux integrated over a certain time period and represents the number of neutrons per unit area that passed during that time period.

As another example, the operating parameter sensed by the sensor 500 may be fission module pressure. In some embodiments, the sensed fission module pressure fission module pressure may be a dynamic fluid pressure. Given by way of nonlimiting examples by way of illustration and not of limitation, fission module pressure may be a dynamic fluid pressure of approximately 10 bars (i.e., approximately 145 psi) for an illustrative sodium cooled reactor or approximately 138 bars (i.e., approximately 2000 psi) for an illustrative pressurized "light" water cooled reactor during normal operation.

In some other embodiments, fission module pressure that is sensed by the sensor 500 may be a static fluid pressure or a fission product pressure. In order to sense either dynamic or static fluid pressure, the sensor 500 may be a custom-designed pressure detector that may be available from Kaman Measuring Systems, Incorporated located in Colorado Springs, Colo. U.S.A.

As another example, the operating parameter sensed by the sensor 500 may be flow rate of the electrically conductive fluid within the nuclear fission module 30. In such embodiments, the sensor 500 may be a suitable flow meter such as a "BLANCETT 1100 TURBINE FLOW METER", available from Instrumart, Incorporated located in Williston, Vt. U.S.A.

It will be appreciated that pressure or mass flow sensors are located throughout operating nuclear reactor systems, such as in the primary loop coolant pipe 130 or the secondary loop coolant pipe 180, in addition to being located within or in the vicinity of the nuclear fission module 30. Such a sensor will be used to detect flow conditions throughout the coolant system.

In addition, the operating parameter to be sensed by the sensor 500 may be determined by a suitable computer-based algorithm (not shown).

In some embodiments, the operating parameter may be selected by operator-initiated action. In such embodiments, the electromagnetic flow regulator 490 is capable of being modified in response to any suitable operating parameter determined by a human operator.

In some other embodiments, the electromagnetic flow regulator 490 is capable of being modified in response to an operating parameter selected by a suitable feedback control system. For example, in such embodiments such a feedback control system may sense changes in temperature and modify coolant flow in response to a changing temperature-sensitive power distribution. Such control could be performed autonomously with suitable feedback controls established between the sensing instrumentation and an electromagnetic flow regulator control system.

In some other embodiments, the electromagnetic flow regulator 490 is capable of being modified in response to an operating parameter determined by an automated control system. As an example, in such embodiments the electromagnetic flow regulation may be modified to provide unimpeded flow to the nuclear fission modules 30 during a core shutdown event initiated by an accident scenario, such as a loss of off-site power or the like. In this manner, conditions for natural circulation flow can be established via the automated control system in a passive manner, specifically during a loss of power to the electromagnetic flow regulators 490. Additionally, in some embodiments the automated control system may include a source of back-up electrical power which can be provided to the electromagnetic flow regulators 490b to maintain forced flow in response to accidents such as loss of off-site power.

Moreover, in some embodiments the electromagnetic flow regulator 490 is capable of being modified in response to a change in decay heat. In this regard, decay heat decreases in the "tail" of the burn wave 410. Detection of the presence of the tail of the burn wave 410 is used to decrease coolant flow rate over time to account for the decrease in decay heat found in the tail of the burn wave 410. This is particularly the case when the nuclear fission module 30 resides behind the burn wave 410. In this case, the electromagnetic flow regulator 490 can be modified in response to changes in decay heat output of the nuclear fission module 30 as the distance of the nuclear fission module 30 from the burn wave 410 changes. Sensing status of such operating parameters can facilitate suitable control and modification of the electromagnetic flow regulator 490 and thus suitable control and modification of temperature in the reactor core 20.

In some embodiments, the electromagnetic flow regulator 490 is capable of controlling or regulating flow of the coolant according to timing of when the traveling burn wave 410 arrives at and/or departs from the nuclear fission module 30. Also, in some embodiments the electromagnetic flow regulator 490 is capable of controlling or regulating flow of the coolant according to timing of when the traveling burn wave 410 is proximate to, in the vicinity of, or generally at a location relative to the nuclear fission module 30. In some embodiments, the electromagnetic flow regulator 490 is also capable of controlling or regulating flow of the coolant according to the width x of the burn wave 410.

In such embodiments, arrival and departure of the burn wave 410, as the burn wave 410 travels through the nuclear fission module 30, may be detected by sensing any one or more of the operating parameters discussed above. For example, the electromagnetic flow regulator 490 may be capable of controlling or regulating flow of the coolant according to temperature sensed in the nuclear fission module 30, in which case the temperature may be indicative of the nearby presence of the propagating or traveling burn wave 410. As another example, the electromagnetic flow regulator 490 may be capable of controlling or regulating flow of the coolant according to temperature sensed in the nuclear fission module 30, in which case the temperature may be indicative of a stationary burn wave 410.

The nuclear fission module 30 that is to receive the variable flow is selected on the basis of the desired value for the operating parameter in the nuclear fission module 30 compared to the value of the operating parameter that is actually sensed in the nuclear fission module 30. As described in more detail presently, fluid flow to the nuclear fission module 30 is adjusted to bring the actual value for the operating parameter into substantial agreement (e.g., plus or minus 5% agreement in terms of the operating parameter) with the desired value for the operating parameter.

In such embodiments, the electromagnetic flow regulator 490 is capable of controlling or regulating flow of the coolant according to the actual value of the operating parameter sensed by the sensor 500 compared to a predetermined desired value for the operating parameter. An appreciable mismatch between the actual value and the desired value of the operating parameter may be a reason to adjust the electromagnetic flow regulator 490 to bring the actual value into substantial agreement with the desired value.

Thus, use of the electromagnetic flow regulator 490 may be arranged to achieve variable coolant flow on a module-by-module (and in some cases fuel assembly-by-fuel assembly) basis. This allows coolant flow to be varied across the reactor core 20 according to the location of the burn wave 410 or the actual values of operating parameters compared to desired values of operating parameters in the reactor core 20.

It will be appreciated that the electromagnetic flow regulator 490 may be coupled to the nuclear fission modules 30 in any manner as desired for a particular application. To that end, several illustrative examples will be set forth below by way of illustration only and not of limitation.

Figure 6A:
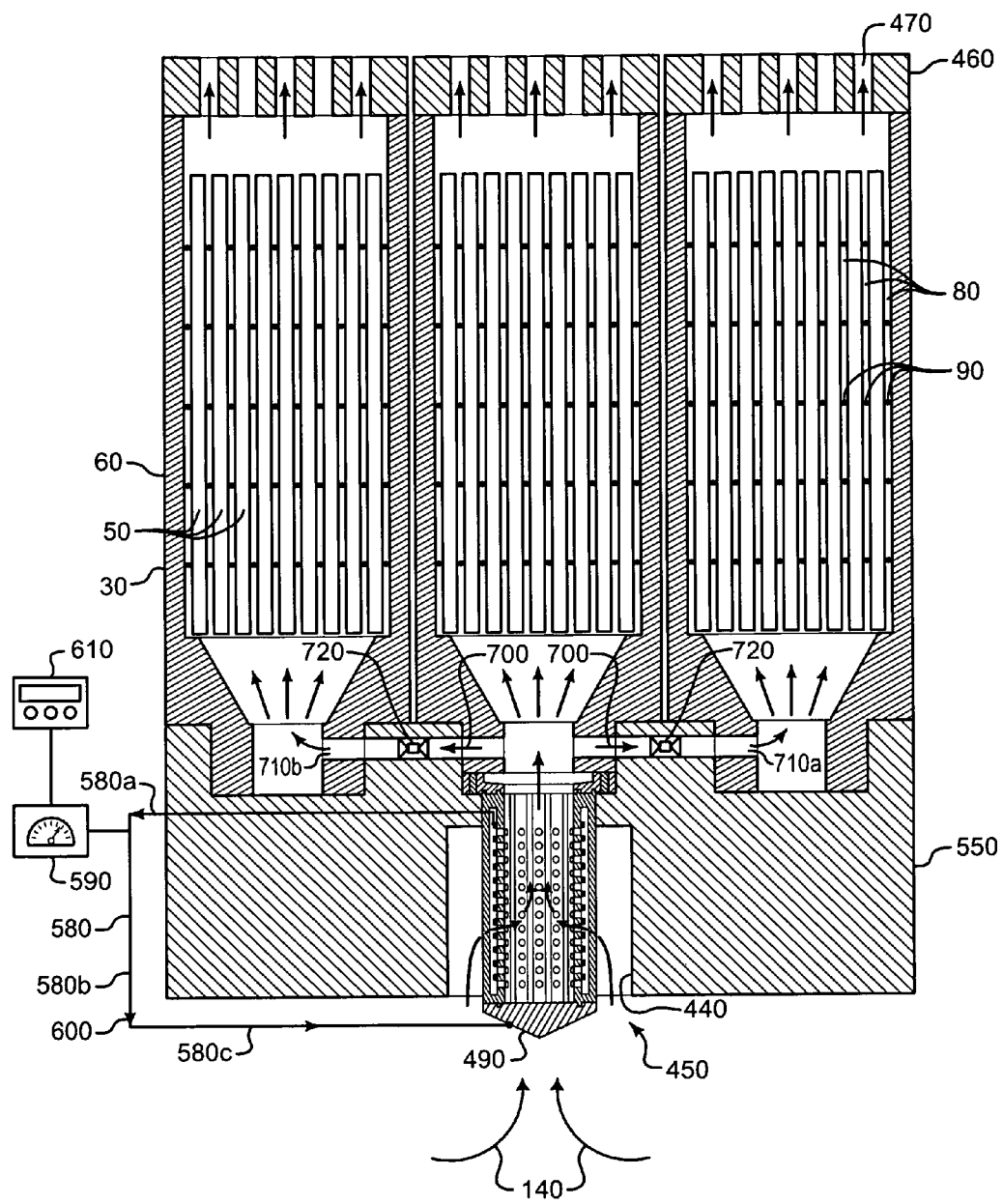
FIGS. 6A-6C are partial cutaway side plan views in partial schematic form of other illustrative electromagnetic flow regulators and nuclear fission modules.

Referring to FIG. 6A, in some embodiments an individual electromagnetic flow regulator 490 diverts at least one portion of the electrically conductive fluid along at least one of diversion flow pathways 700 that extend from the individual electromagnetic flow regulator 490 to respective ones of the nuclear fission modules 30. Flow of the electrically conductive fluid from the individual electromagnetic flow regulator 490 will bifurcate and flow along conduits 710a and 710b as well as flow directly into the nuclear fission module 30 that is vertically aligned with and located above electromagnetic flow regulator 490.

A valve 720, such as a backflow prevention valve, may be disposed in each of the conduits 710a and 710b for controlling flow of the electrically conductive fluid in conduits 710a and 710b, if desired. Each of the valves 720 may be selectively controllable by the control unit 610.

Only three nuclear fission modules 30 and only a pair of the conduits 710a and 710b are shown as being coupled to the individual electromagnetic flow regulator 490. However, it will be appreciated that there may be any number of the nuclear fission modules 30 and conduits 710a and 710b coupled to the individual electromagnetic flow regulator 490 as desired. Therefore, it will be appreciated that a single electromagnetic flow regulator 490 can be used to supply electrically conductive fluid to more than one nuclear fission module 30.

Figure 6B:
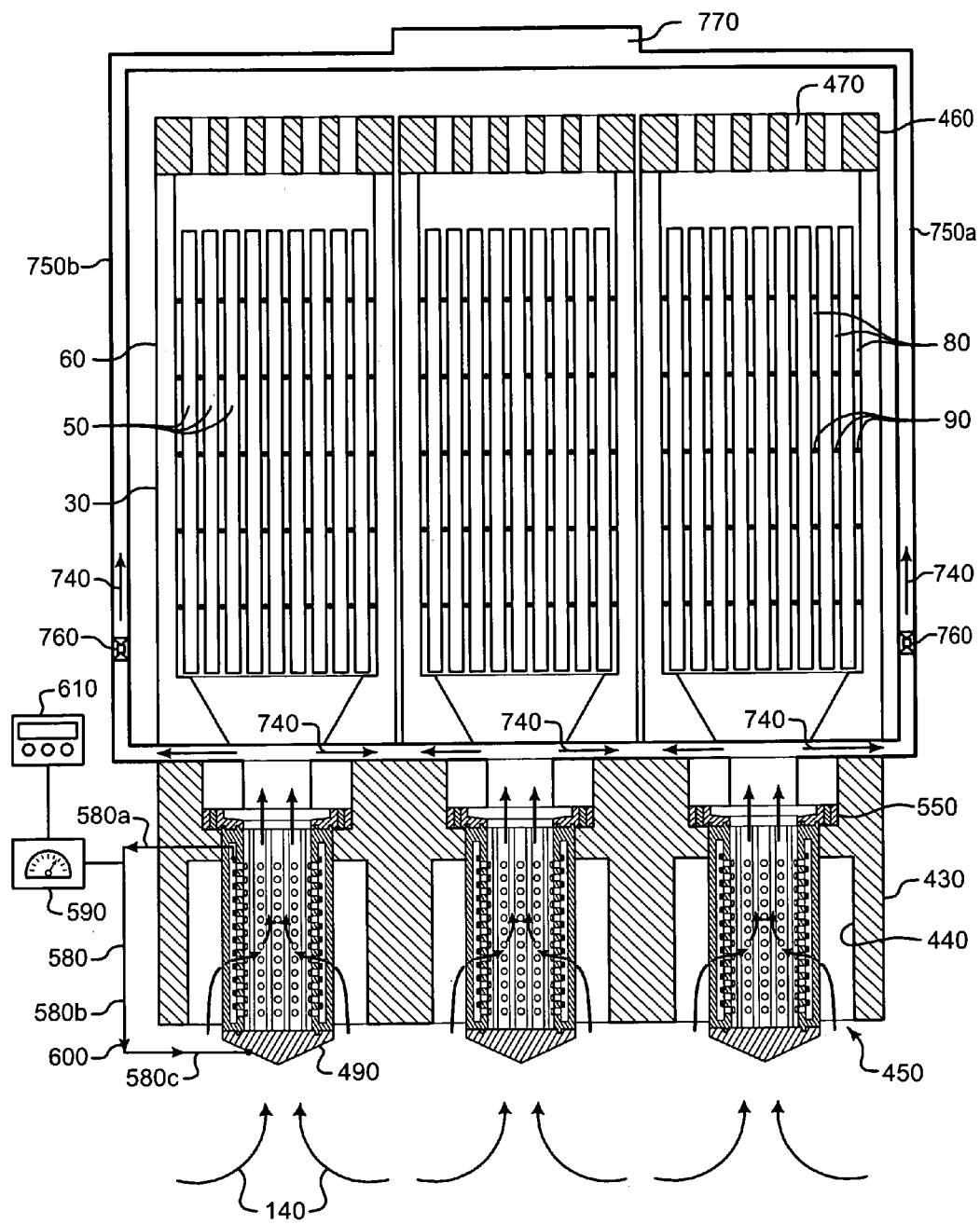

Referring to FIG. 6B, in some other embodiments the electromagnetic flow regulator 490 allows flow of the electrically conductive fluid to bypass selected nuclear fission modules 30. In such embodiments the electromagnetic flow regulator 490 diverts at least one portion of the electrically conductive fluid, so as to bypass selected nuclear fission modules 30. The electromagnetic flow regulator 490 diverts at least one portion of the electrically conductive fluid along diversion flow pathways 740. That is, flow of the electrically conductive fluid will bifurcate from each electromagnetic flow regulator 490 and flow along a pair of conduits 750a and 750b for bypassing the selected nuclear fission modules 30.

A valve 760, such as a backflow prevention valve, may be disposed in each of the conduits 750a and 750b for controlling flow of the electrically conductive fluid in the conduits 750a and 750b, if desired. Each of the valves 760 may be selectively controllable by the control unit 610. Each of the conduits 750a and 750b terminates in an upper plenum 770. The upper plenum 770 combines the flow of the electrically conductive fluid from the conduits 750a and 750b so that a single flow stream 140 is supplied to intermediate heat exchanger 150 (FIG. 4A).

In FIG. 6B, only three nuclear fission modules 30, only three electromagnetic flow regulators 490, only a pair of the valves 760, and only a pair of the conduits 750a and 750b are shown. However, it will be appreciated that there may be any number and combination of fission modules 30, electromagnetic flow regulators 490, valves 760, and conduits 750a and 750b as desired. Therefore, it will be appreciated that the electrically conductive fluid may bypass any desired number of nuclear fission modules 30.

Figure 6C:
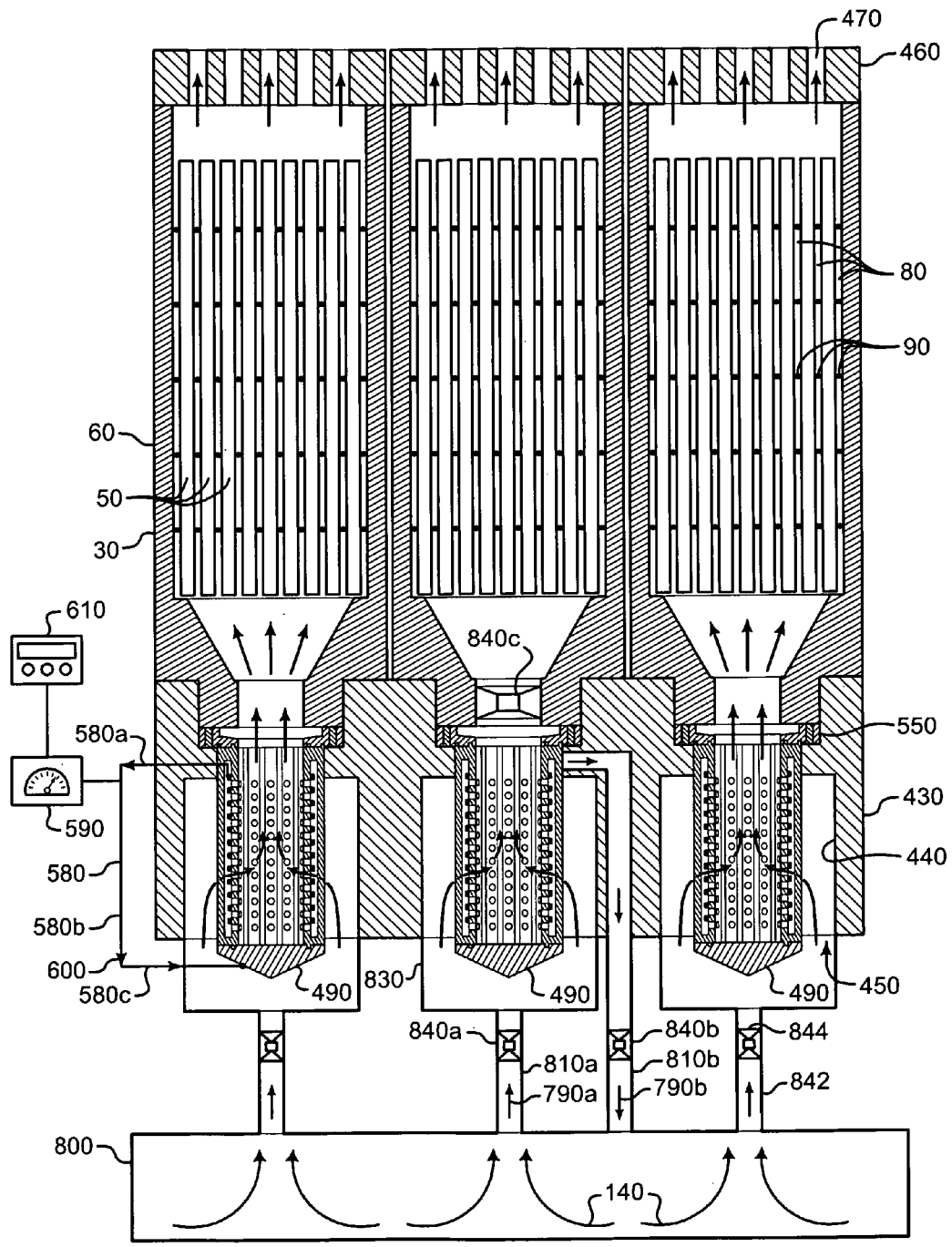

Referring to FIG. 6C, in some embodiments the electromagnetic flow regulator 490 selectively controls flow of the electrically conductive fluid to individual nuclear fission modules 30. In such embodiments, the electromagnetic flow regulator 490 diverts at least one portion of the electrically conductive fluid, so as to direct coolant flow to individual nuclear fission modules 30.

The electromagnetic flow regulator 490 diverts at least one portion of the electrically conductive fluid along a diversion flow pathway 790a and along a diversion flow pathway 790b. The diversion flow pathway 790b may be oriented to conduct fluid flow in a direction opposite the direction of fluid flow in the diversion flow pathway 790a. In this regard, the electrically conductive fluid enters a lower plenum 800 along the flow path 140.

A conduit 810a that is in fluid communication with the electrically conductive fluid in the lower plenum 800 receives the electrically conductive fluid from the lower plenum 800 and conducts the electrically conductive fluid along the diversion flow pathway 790a. A conduit 810b is also in fluid communication with the electrically conductive fluid in the lower plenum 800 and is configured to return the electrically conductive fluid to the lower plenum 800 along the diversion flow pathway 790b. The conduit 810a terminates in an intermediate plenum 830 from which flow of the electrically conductive fluid is supplied to the electromagnetic flow regulator 490.

A valve 840a, such as a backflow prevention valve, may be disposed in the conduit 810a for controlling coolant flow in the conduit 810a. Another valve 840b, such as a backflow prevention valve, may be disposed in the conduit 810b for controlling flow of the electrically conductive fluid in the conduit 810b. Another valve 840c, such as a backflow prevention valve, is interposed between the electromagnetic flow regulator 490 and the nuclear fission module 30 for controlling flow of the electromagnetic fluid from the electromagnetic flow regulator 490 to the nuclear fission module 30.

Each of valves 840a, 840b and 840c may be selectively controllable by means of the control unit 610. In this regard, when the valves 840a and 840c are opened and the valve 840c is closed by the control unit 610, the electrically conductive fluid will freely flow through the conduit 810a, into the intermediate plenum 830, and then to the nuclear fission module 30. When the valve 840c is closed and the valves 840a and 840b are opened by the control unit 610, the electrically conductive fluid will not flow to the nuclear fission module 30. In this latter instance, the electrically conductive fluid is returned to the lower plenum 800.

In some embodiments, a conduit 842, which may have a backflow prevention valve 844 disposed therein, may be provided in fluid communication with the electrically conductive fluid in the lower plenum 800. The conduit 842 terminates in the intermediate plenum 830. When the valve 844 is open, the electrically conductive fluid is supplied to the intermediate plenum 830 and the electromagnetic flow regulator 490, which in turn supplies the electrically conductive fluid to the nuclear fission module 30. When the valve 844 is closed, the electrically conductive fluid is not supplied to the intermediate plenum 830 and the electromagnetic flow regulator 490, and hence the electrically conductive fluid is not supplied to the nuclear fission module 30.

Only three nuclear fission modules 30, only three electromagnetic flow regulators 490, only conduits 810a, 810b, and 842b, and only valves 840a, 840b, 840c, and 844 are shown. However, it will be appreciated that there may be any number and combination of fission modules 30, electromagnetic flow regulators 490, conduits 810a, 810b, and 842, and valves 840a, 840b, 840c, and 844 as desired. Therefore, it will be appreciated that the electrically conductive fluid may flow from the lower plenum 800 to any number of selected nuclear fission modules 30 or return from any number of selected nuclear fission modules 30 to the lower plenum 800.

Figure 6D:
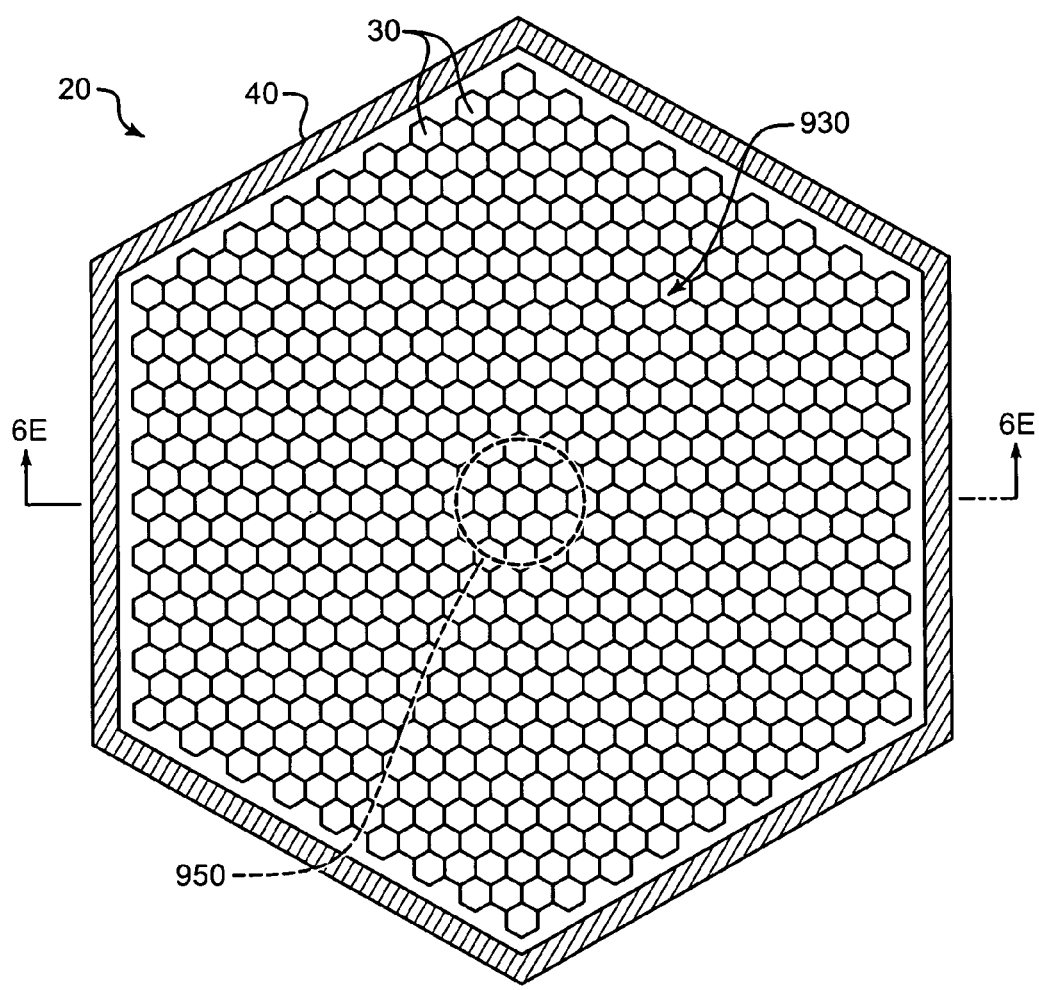
FIG. 6D is a partial cutaway top plan view in partial schematic form of an illustrative reactor core.
Figure 6E:
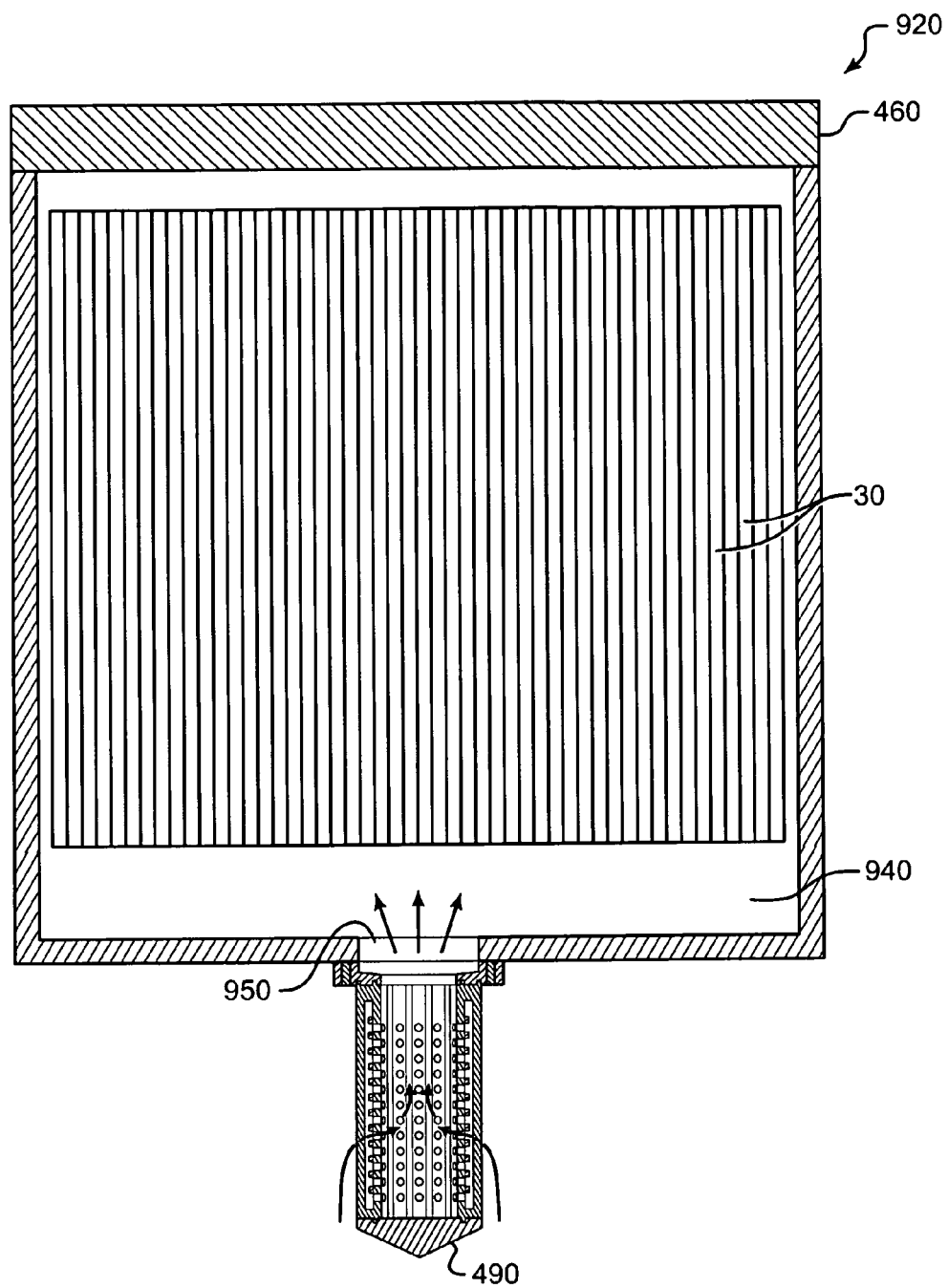
FIG. 6E is a partial cutaway side plan view in partial schematic form of the reactor core of FIG. 6D.

Referring to FIGS. 6D and 6E, in some embodiments the reactor core 20 defines a single coolant flow zone 930 assigned to the entirety of the reactor core 20. An inlet plenum 940 is coupled to the reactor core 20. The electromagnetic flow regulator 490 is coupled to the reactor core 20 and has a coolant flow opening 950 in fluid communication with the inlet plenum 940. Hence, electromagnetic flow regulator 490 will supply the electrically conductive fluid into the inlet plenum 940. The electrically conductive fluid will fill the inlet plenum 940 and then flow to the nuclear fission modules 30 located in the coolant flow zone 930. In such embodiments, a single electromagnetic flow regulator 490 can regulate the flow of electrically conductive coolant to all nuclear fission modules 30 in the reactor core 20.

Figure 6F:
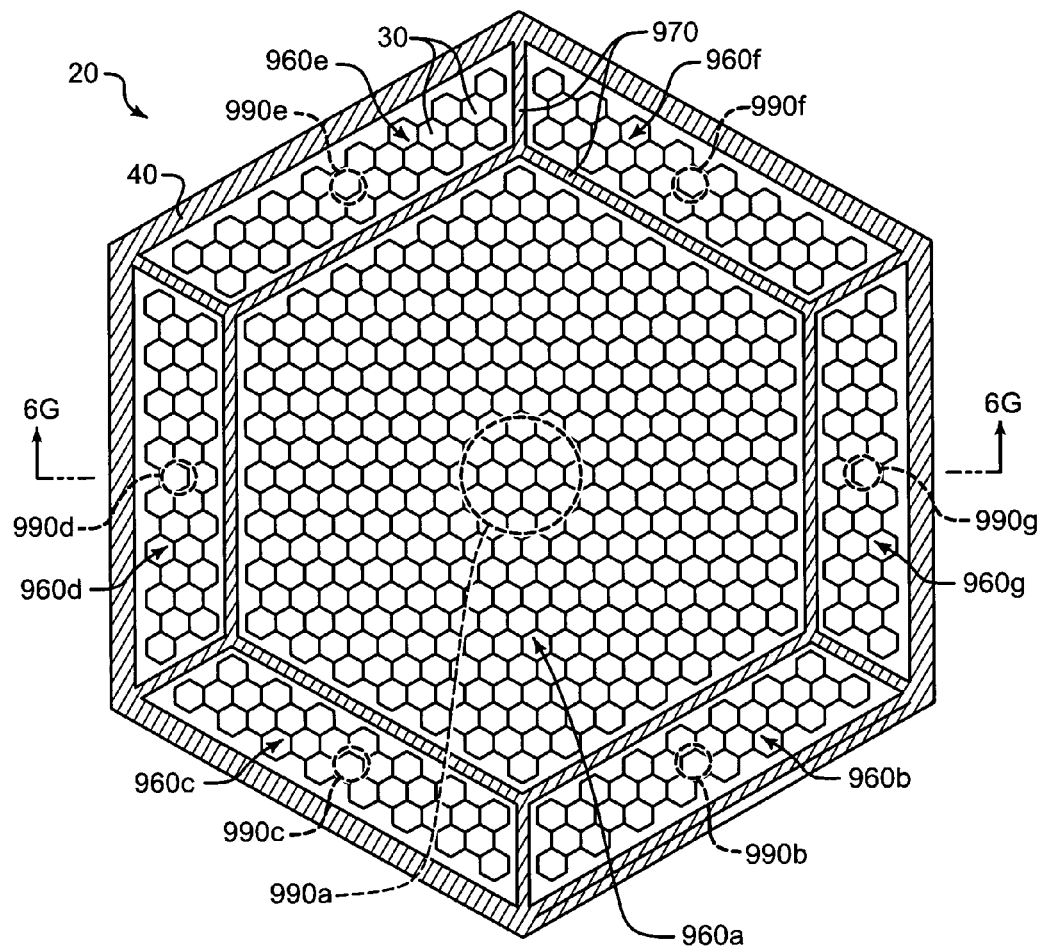
FIG. 6F is a partial cutaway top plan view in partial schematic form of another illustrative reactor core.
Figure 6G:
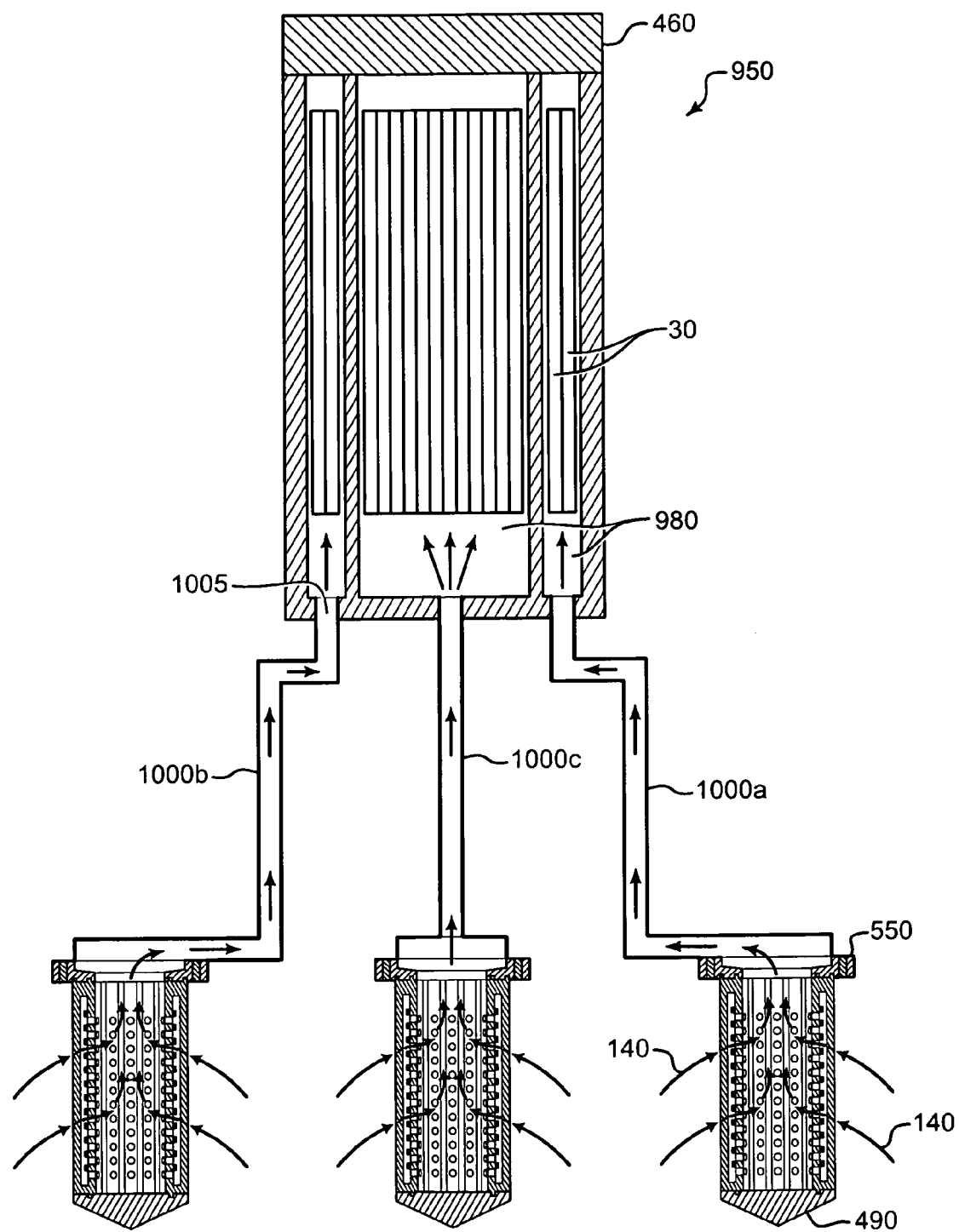
FIG. 6G is a partial cutaway side plan view in partial schematic form of the reactor core of FIG. 6F.

Referring to FIGS. 6F and 6G, in some embodiments the reactor core 20 includes coolant flow zones 960a, 960b, 960c, 960d, 960e, 960f, and 960g. Adjacent coolant flow zones may be separated by a partition 970, if desired. The partition 970 may be made from a material having a low absorption cross section for neutrons in order to reduce interference with the fission chain reaction process.

In this regard, the partition 970 may be made from pure aluminum; a suitable aluminum alloy, such as aluminum alloy No. 1050 comprising iron of about 0.40 weight percent; silicon of about 0.25 weight percent; titanium of about 0.05 weight percent; magnesium of about 0.05 weight percent; manganese of about 0.05 weight percent; copper of about 0.05 weight percent; and the remainder being pure aluminum. The partition 970 may also be made from stainless steel comprising carbon of about 0.55 weight percent; manganese of about 0.90 weight percent; sulfur of about 0.05 weight percent; phosphorus of about 0.04 weight percent; and iron of about 98.46 percent.

The coolant flow zones, which are defined by the partitions 970, allow an operator of the reactor system 10 to tailor coolant flow on a reactor core zone-by-zone basis rather than having individual electromagnetic flow regulators 490 coupled to individual nuclear fission modules 30.

Still referring to FIGS. 6F and 6G, inlet plenums 980 are coupled to respective ones of the coolant flow zones 960a, 960b, 960c, 960d, 960e, 960f, and 960g, such as by conduits 1000a, 1000b, 1000c, 1000d, 1000e, 1000f, and 1000g. The conduits 1000a, 1000b, 1000c, 1000d, 1000e, 1000f, and 1000g are, in turn, coupled to respective electromagnetic flow regulators 490. Thus, the electromagnetic flow regulators 490 are coupled to respective coolant flow zones 960a, 960b, 960c, 960d, 960e, 960f, and 960g.

Each electromagnetic flow regulator 490 has a coolant flow opening 1005 in fluid communication with the inlet plenum 980. Hence, the electromagnetic flow regulator 490 will supply the electrically conductive fluid into the inlet plenum 980. The electrically conductive fluid will fill the inlet plenum 980 and then flow to the nuclear fission modules 30 located in the coolant flow zones 960a, 960b, 960c, 960d, 960e, 960f, and 960g. The electrically conductive fluid may flow from at least some of the electromagnetic flow regulators 490 via the associated conduits 1000a, 1000b, and 1000c that extend from the electromagnetic flow regulator 490 to their respective inlet plenums 980.

Figure 6H:
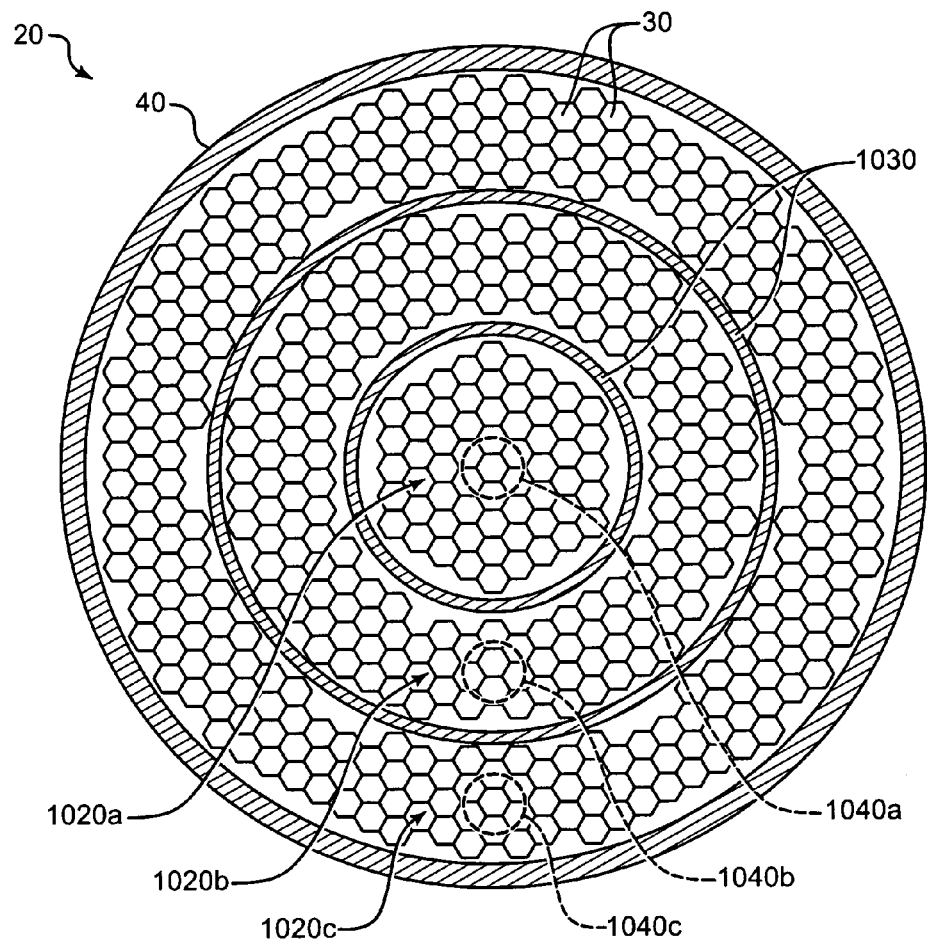
Figure 61:
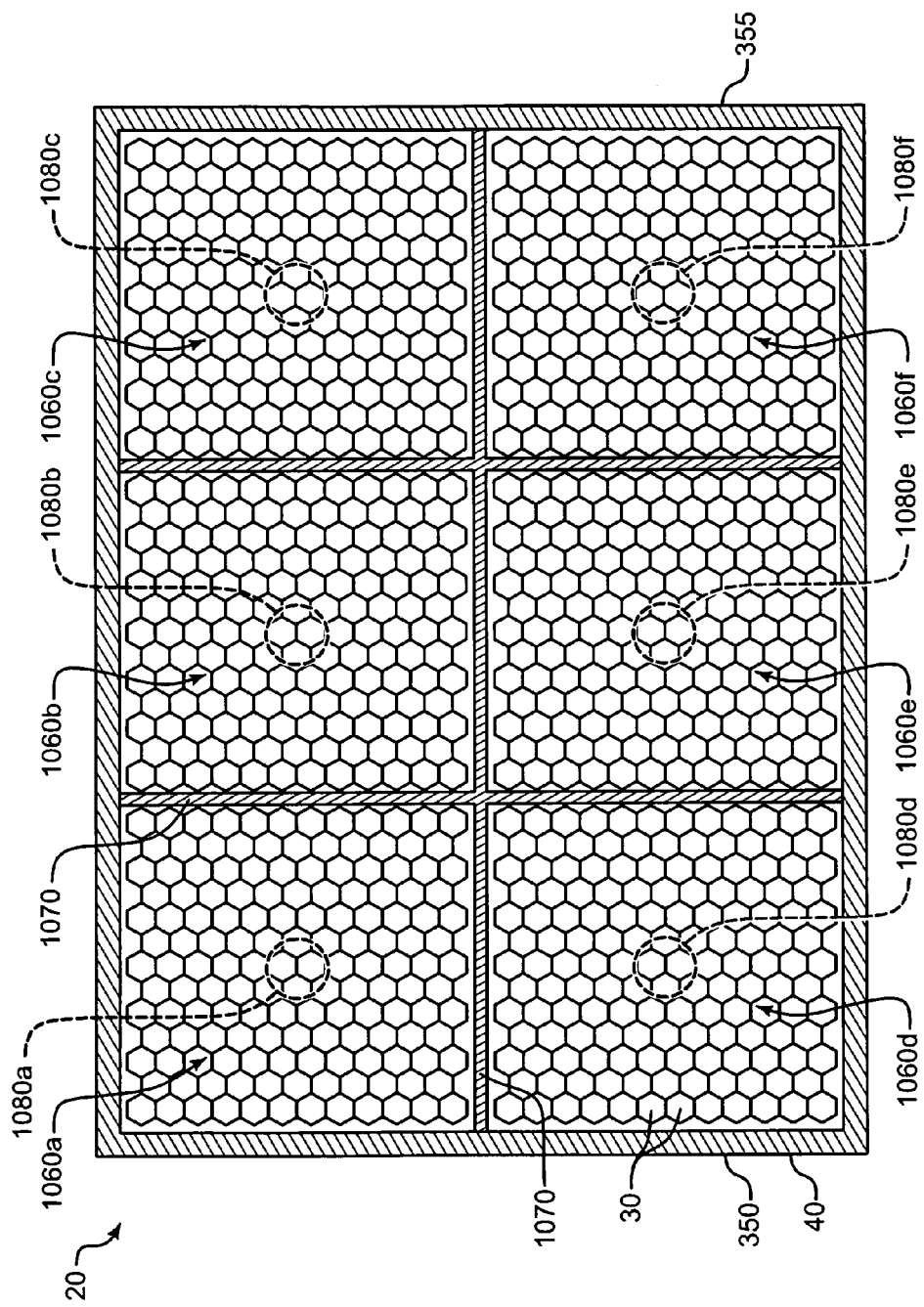

Referring to FIG. 6H, in some embodiments the reactor core 20 includes coolant flow zones 1020a, 1020b, and 1020c. Adjacent coolant flow zones may be separated by a partition 1030 that is of low neutron absorptivity as described above, if desired. Electromagnetic flow regulators 490 are coupled to respective coolant flow zones 1020a, 1020b, and 1020c, such as by respective inlet plenums, which may have a configuration substantially similar to that shown in FIG. 6G. Each electromagnetic flow regulator 490 has conduits 1040a, 1040b, and 1040c in fluid communication with the respective inlet plenums. Hence, the electromagnetic flow regulator 490 will supply the electrically conductive fluid into the inlet plenums. The electrically conductive fluid will fill the inlet plenums and then flow to the nuclear fission modules 30 located in the coolant flow zones 1020a, 1020b, and 1020c.

Referring to FIG. 6I, in some embodiments the reactor core 20 defines coolant flow zones 1060a, 1060b, 1060c, 1060d, 1060e, and 1060f. Adjacent coolant flow zones may be separated by a partition 1070 that is of low neutron absorptivity as described above, if desired.

Electromagnetic flow regulators 490 are coupled to respective coolant flow zones 1060a, 1060b, 1060c, 1060d, 1060e, and 1060f, such as by respective inlet plenums. The electromagnetic flow regulators 490 have respective coolant flow conduits 1080a, 1080b, 1080c, 1080d, 1080e, and 1080f in fluid communication with the respective inlet plenums.

Hence, the electromagnetic flow regulator 490 will supply the electrically conductive fluid into the inlet plenums. The electrically conductive fluid will fill the inlet plenums and then flow to the nuclear fission modules 30 located in the coolant flow zones 1060a, 1060b, 1060c, 1060d, 1060e, and 1060f.

Figure 6J:
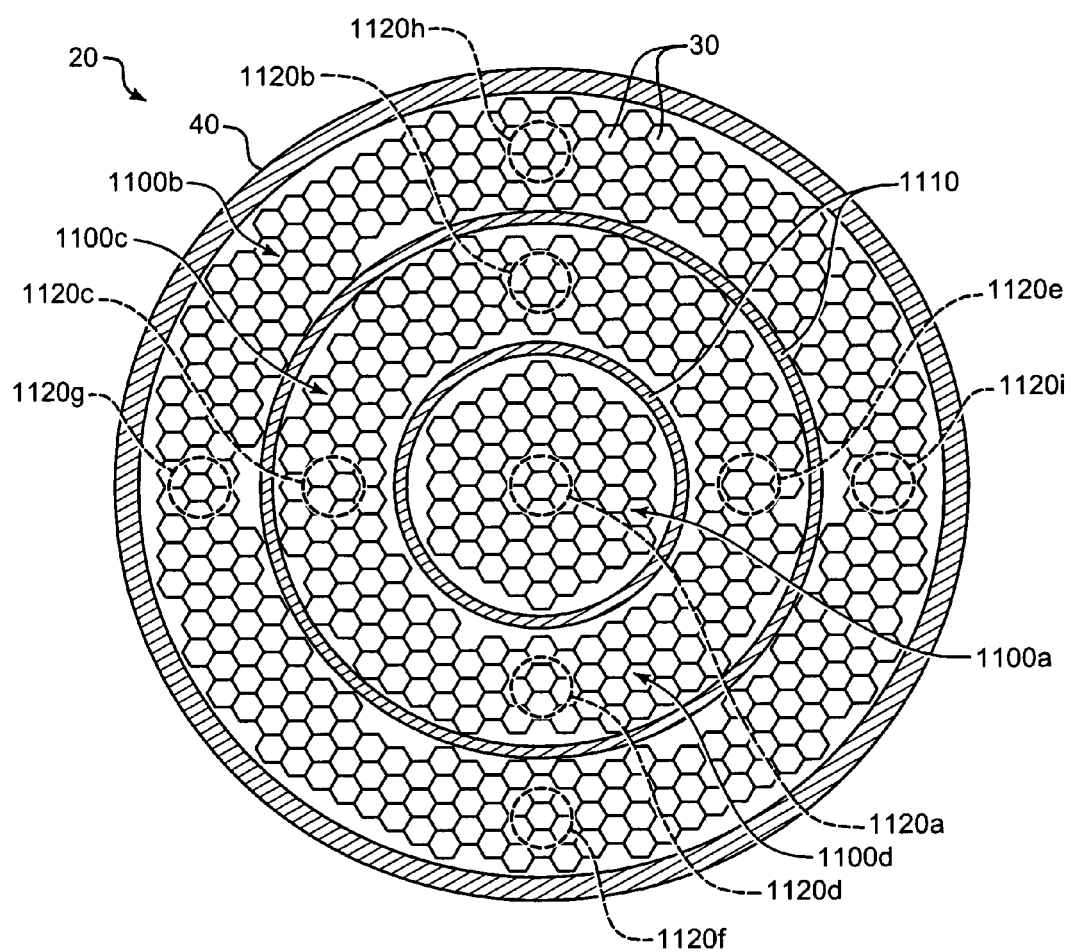

Referring to FIG. 6J, in some embodiments the nuclear fission reactor core 20 defines non-partitioned flow zones 1100c and 1100d that are partitioned from flow zones 1100a and 1100b. Electromagnetic flow regulators 490 are coupled to respective coolant flow zones 1100a, 1100b, 1100c, and 1100d, such as by respective inlet conduits. The electromagnetic flow regulators 490 have respective coolant flow openings 1120a, 1120b, 1120c, 1120d, 1120e, 1120f, 1120g, 1120hh and 1120i in fluid communication with their respective coolant flow zones 1100a, 1100b, 1100c, and 1100d. Hence, the electromagnetic flow regulator 490 will supply the electrically conductive fluid into the coolant flow zones 1100a, 1100b, 1100c, and 1100d. The electrically conductive fluid will fill the inlet plenums and then flow to the nuclear fission modules 30 located in the coolant flow zones 1100a, 1100b, 1100c, and 1100d.

It will be appreciated that a system for electromagnetically regulating flow of an electrically conductive reactor coolant may include a source of electrical power, such as the power supply 590, and the electromagnetic flow regulator 490. Another system for electromagnetically regulating flow of an electrically conductive fluid may include a source of electrical power, such as the power supply 590, and the electromagnetic flow regulator 490a. Similarly, another system for electromagnetically regulating flow of an electrically conductive fluid may include a source of electrical power, such as the power supply 590, and the electromagnetic flow regulator 490b. Any of the above systems may also include a controller, such as the control unit 610, and/or a sensor, such as the sensor 500, if desired. The power supply 590, the control unit 610, the sensor 500, and the electromagnetic flow regulators 490, 490a, and 490b have been discussed above. Details of their construction and operation need not be repeated for an understanding.

Now that illustrative details have been set forth above regarding construction and operation of the electromagnetic flow regulators 490, 490a, and 490b, and regarding various nuclear fission reactors that include the electromagnetic flow regulators 490, 490a, and 490b, various methods for electromagnetically regulating flow of an electrically conductive reactor coolant will be set forth.

Figure 7A:
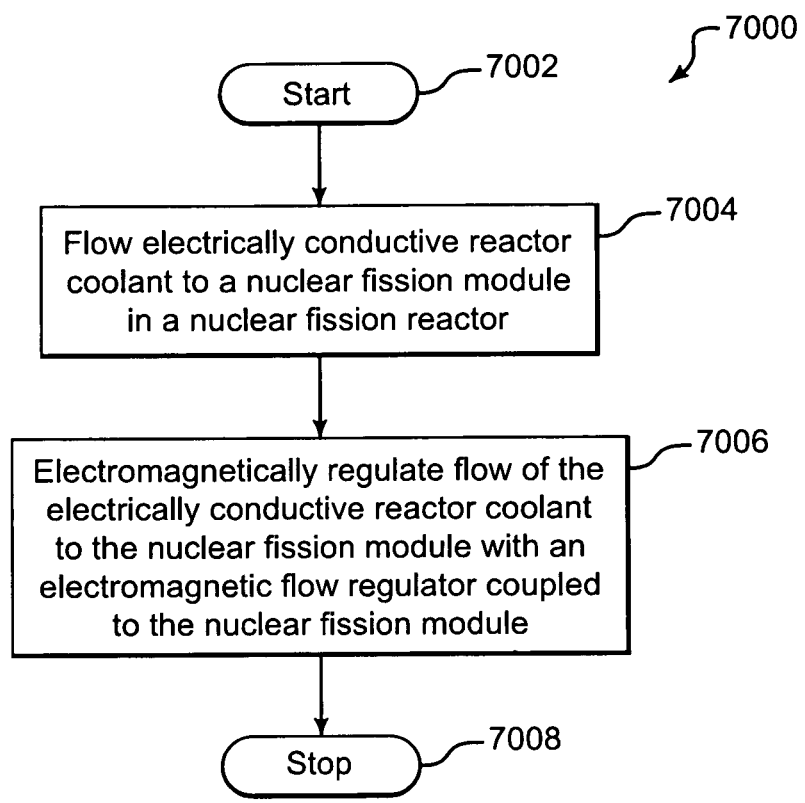
FIG. 7A is a flowchart of an illustrative method of regulating flow of an electrically conductive reactor coolant.

Referring now to FIG. 7A, a method 7000 is provided for regulating flow of an electrically conductive reactor coolant in a nuclear fission reactor. The method 7000 starts at a block 7002. At a block 7004 electrically conductive reactor coolant is flowed to a nuclear fission module in a nuclear fission reactor. At a block 7006 flow of the electrically conductive reactor coolant is electromagnetically regulated to the nuclear fission module with an electromagnetic flow regulator coupled to the nuclear fission module. The method 7000 stops at a block 7008.

Figure 7B:
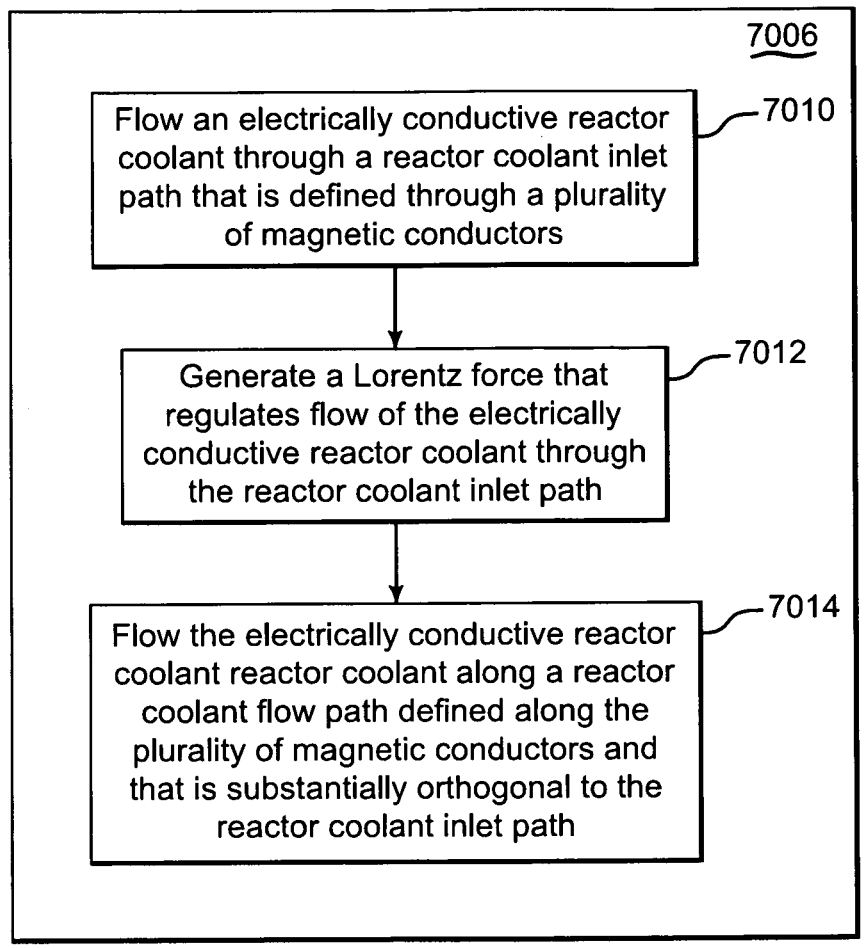
FIGS. 7B-7S are flowcharts of details of the method of FIG. 7A.

Referring additionally to FIG. 7B, electromagnetically regulating flow of the electrically conductive reactor coolant to the nuclear fission module with an electromagnetic flow regulator coupled to the nuclear fission module at the block 7006 may include flowing an electrically conductive reactor coolant through a reactor coolant inlet path that is defined through a plurality of magnetic conductors at a block 7010. Electromagnetically regulating flow of the electrically conductive reactor coolant to the nuclear fission module with an electromagnetic flow regulator coupled to the nuclear fission module at the block 7006 may also include generating a Lorentz force that regulates flow of the electrically conductive reactor coolant through the reactor coolant inlet path at a block 7012. Electromagnetically regulating flow of the electrically conductive reactor coolant to the nuclear fission module with an electromagnetic flow regulator coupled to the nuclear fission module at the block 7006 may also include flowing the electrically conductive reactor coolant along a reactor coolant flow path defined along the plurality of magnetic conductors and that is substantially orthogonal to the reactor coolant inlet path at a block 2014.

Figure 7C:
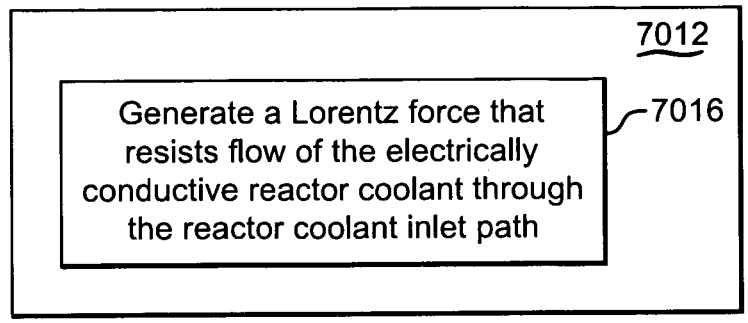
Figure 7D:
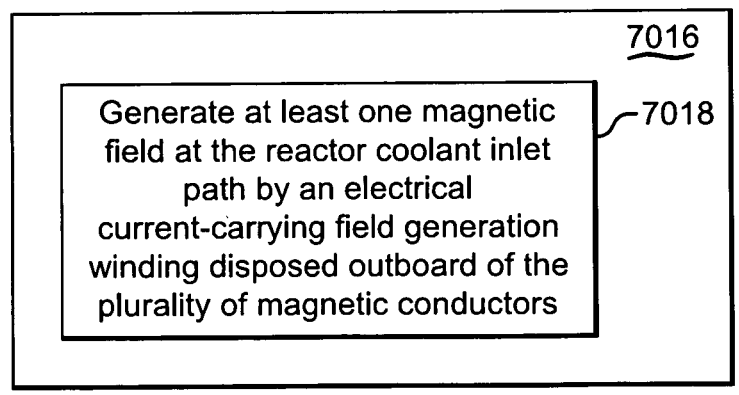

Referring additionally to FIG. 7C, in some embodiments generating a Lorentz force that regulates flow of the electrically conductive reactor coolant through the reactor coolant inlet path at the block 7012 may include generating a Lorentz force that resists flow of the electrically conductive reactor coolant through the reactor coolant inlet path at a block 7016. For example and referring additionally to FIG. 7D, generating a Lorentz force that resists flow of the electrically conductive reactor coolant through the reactor coolant inlet path at the block 7016 may include generating at least one magnetic field at the reactor coolant inlet path by an electrical current-carrying field generation winding disposed outboard of the plurality of magnetic conductors at a block 7018.

Figure 7E:
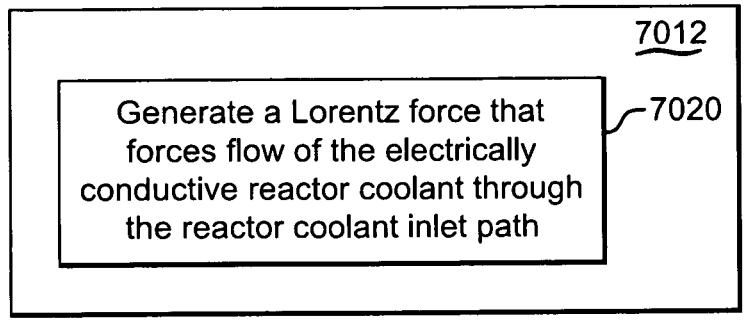
Figure 7F:
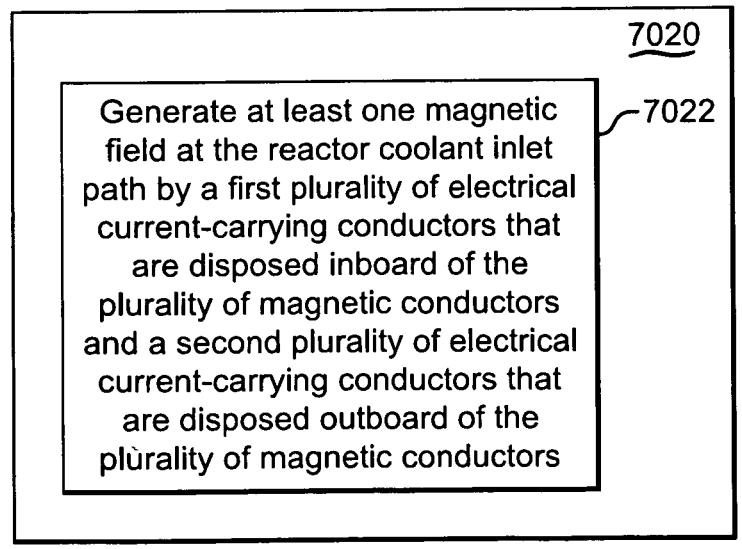

In some other embodiments and referring now to FIGS. 7A, 7B, and 7E, generating a Lorentz force that regulates flow of the electrically conductive reactor coolant through the reactor coolant inlet path at the block 7012 may include generating a Lorentz force that forces flow of the electrically conductive reactor coolant through the reactor coolant inlet path at a block 7020. For example and referring additionally to FIG. 7F, generating a Lorentz force that forces flow of the electrically conductive reactor coolant through the reactor coolant inlet path at the block 7020 may include generating at least one magnetic field at the reactor coolant inlet path by a first plurality of electrical current-carrying conductors that are disposed inboard of the plurality of magnetic conductors and a second plurality of electrical current-carrying conductors that are disposed outboard of the plurality of magnetic conductors at a block 7022.

Figure 7G:
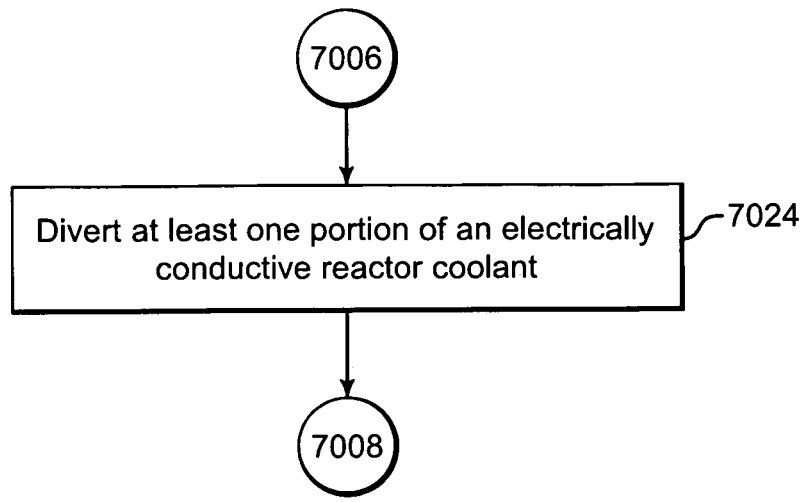

Referring now to FIGS. 7A and 7G, in some embodiments at least one portion of an electrically conductive reactor coolant may be diverted at a block 7024.

Figure 7H:
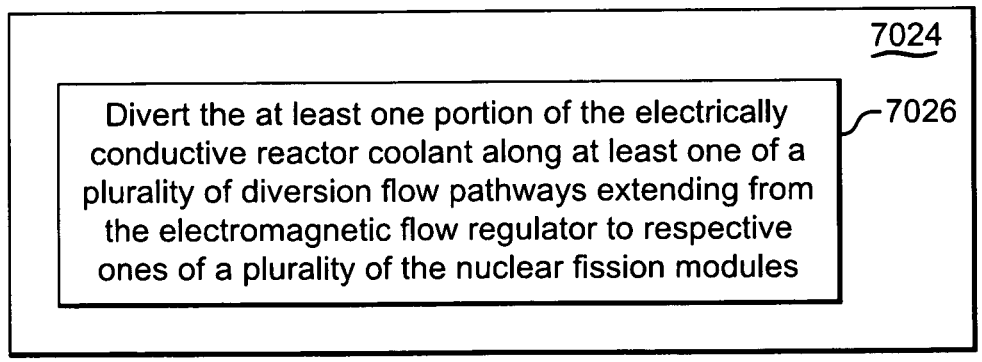

For example and referring additionally to FIG. 7H, in some embodiments diverting at least one portion of an electrically conductive reactor coolant at the block 7024 may include diverting the at least one portion of the electrically conductive reactor coolant along at least one of a plurality of diversion flow pathways extending from the electromagnetic flow regulator to respective ones of a plurality of the nuclear fission modules at a block 7026.

Figure 7I:
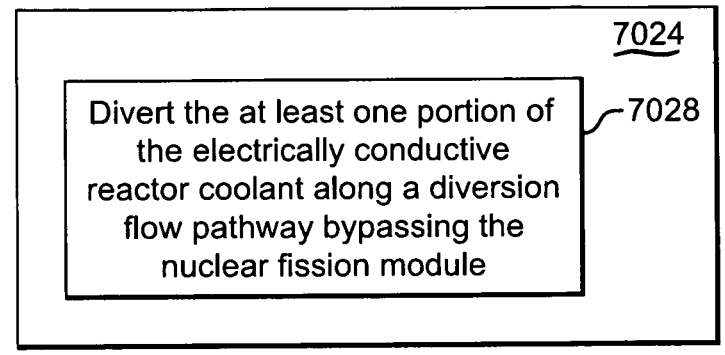

As another example and referring now to FIGS. 7A, 7G, and 7I, in some other embodiments diverting at least one portion of an electrically conductive reactor coolant at the block 7024 may include diverting the at least one portion of the electrically conductive reactor coolant along a diversion flow pathway bypassing the nuclear fission module at a block 7028.

Figure 7J:
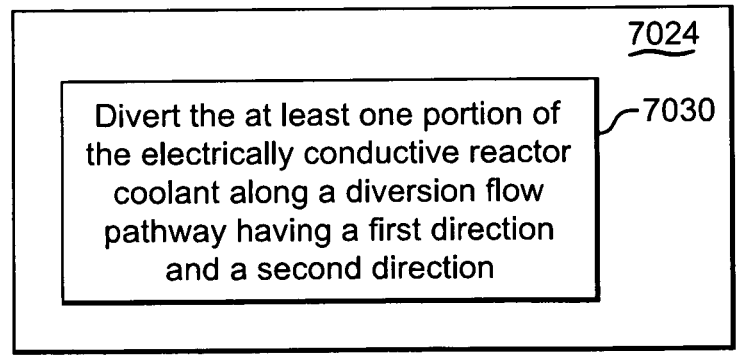

As another example and referring now to FIGS. 7A, 7G, and 7J, in some other embodiments diverting at least one portion of an electrically conductive reactor coolant at the block 7024 may include diverting the at least one portion of the electrically conductive reactor coolant along a diversion flow pathway having a first direction and a second direction at a block 7030.

Figure 7K:
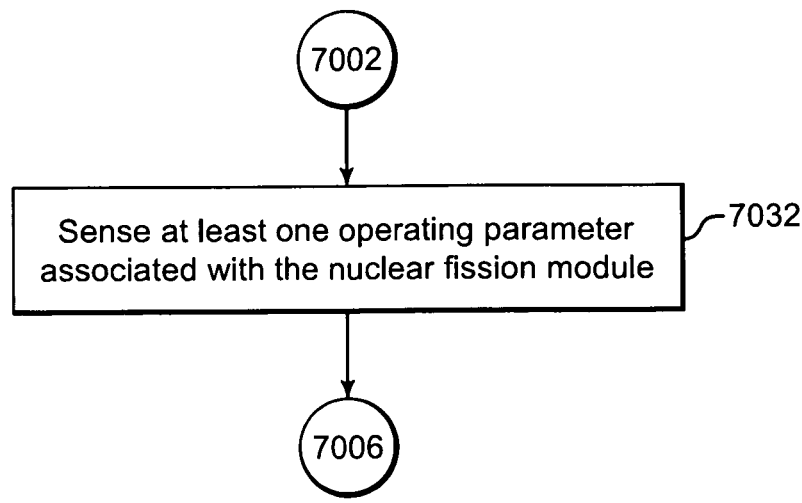

Referring now to FIGS. 7A and 7K, in some embodiments at least one operating parameter associated with the nuclear fission module may be sensed at a block 7032.

Figure 7L:
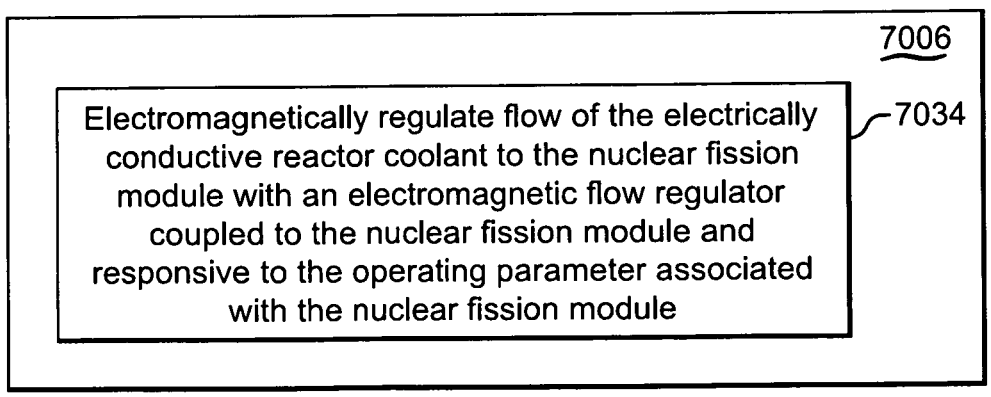

In some such cases and referring additionally to FIG. 7L, electromagnetically regulating flow of the electrically conductive reactor coolant to the nuclear fission module with an electromagnetic flow regulator coupled to the nuclear fission module at the block 7006 may include electromagnetically regulating flow of the electrically conductive reactor coolant to the nuclear fission module with an electromagnetic flow regulator coupled to the nuclear fission module and responsive to the operating parameter associated with the nuclear fission module at a block 7034.

The operating parameter associated with the nuclear fission module may include any parameter as desired. In various embodiments, the operating parameter may include without limitation temperature, neutron flux, neutron fluence, a characteristic isotope, pressure, and/or flow rate of the electrically conductive reactor coolant.

Figure 7M:
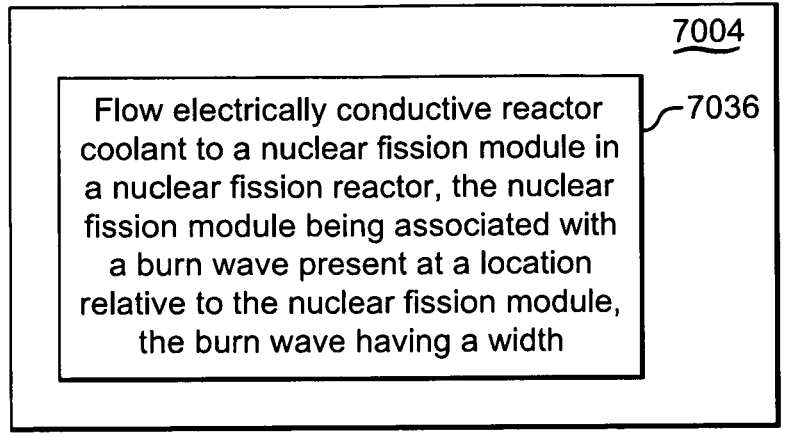

In some other embodiments and referring to FIGS. 7A and 7M, flowing electrically conductive reactor coolant to a nuclear fission module in a nuclear fission reactor at the block 7004 may include flowing electrically conductive reactor coolant to a nuclear fission module in a nuclear fission reactor, the nuclear fission module being associated with a burn wave present at a location relative to the nuclear fission module, the burn wave having a width, at a block 7036.

Figure 7N:
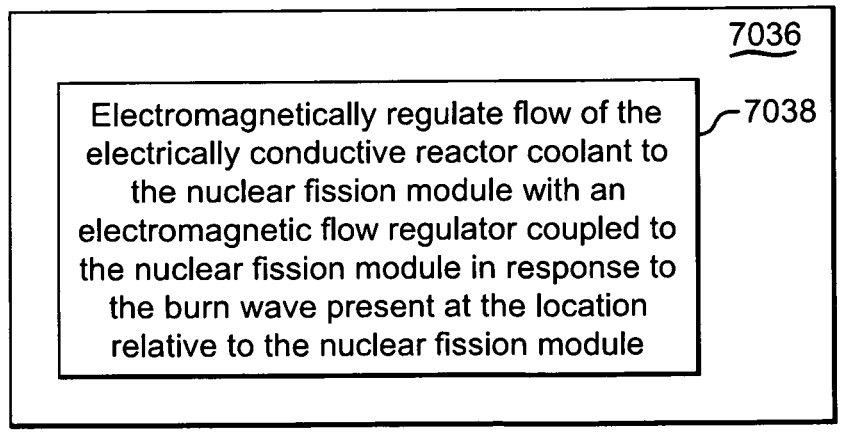
Figure 7O:
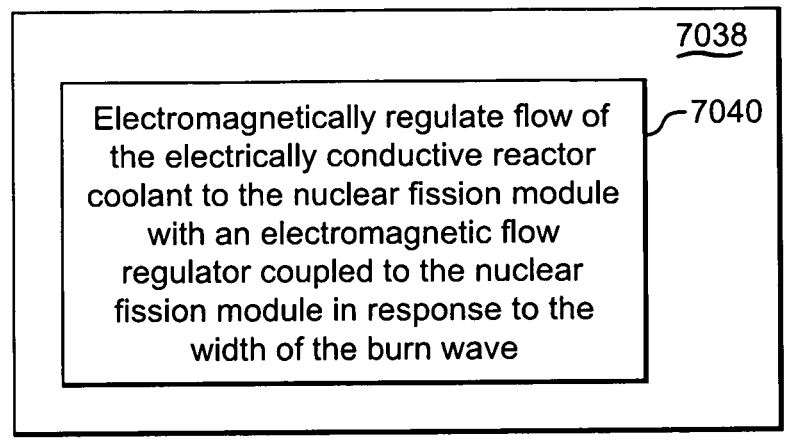

Referring additionally to FIG. 7N, in some such cases electromagnetically regulating flow of the electrically conductive reactor coolant to the nuclear fission module with an electromagnetic flow regulator coupled to the nuclear fission module at the block 7036 may include electromagnetically regulating flow of the electrically conductive reactor coolant to the nuclear fission module with an electromagnetic flow regulator coupled to the nuclear fission module in response to the burn wave present at the location relative to the nuclear fission module at a block 7038. For example and referring additionally to FIG. 7O, electromagnetically regulating flow of the electrically conductive reactor coolant to the nuclear fission module with an electromagnetic flow regulator coupled to the nuclear fission module in response to the burn wave present at the location relative to the nuclear fission module at the block 7038 may include electromagnetically regulating flow of the electrically conductive reactor coolant to the nuclear fission module with an electromagnetic flow regulator coupled to the nuclear fission module in response to the width of the burn wave at a block 7040.

Figure 7P:
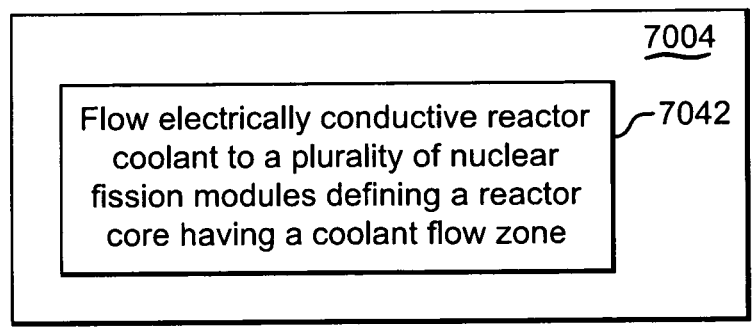

Referring now to FIGS. 7A and 7P, in some embodiments flowing electrically conductive reactor coolant to a nuclear fission module in a nuclear fission reactor at the block 7004 may include flowing electrically conductive reactor coolant to a plurality of nuclear fission modules defining a reactor core having a coolant flow zone at a block 7042.

Figure 7Q:
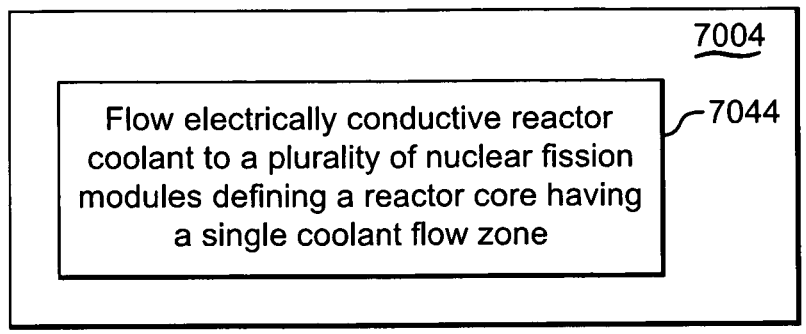

Referring to FIGS. 7A and 7Q, in some embodiments flowing electrically conductive reactor coolant to a nuclear fission module in a nuclear fission reactor at the block 7004 may include flowing electrically conductive reactor coolant to a plurality of nuclear fission modules defining a reactor core having a single coolant flow zone at a block 7044.

Figure 7R:
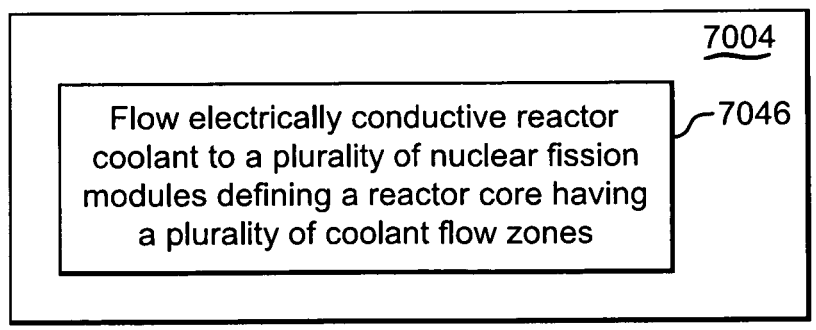

Referring to FIGS. 7A and 7R, in some embodiments flowing electrically conductive reactor coolant to a nuclear fission module in a nuclear fission reactor at the block 7004 may include flowing electrically conductive reactor coolant to a plurality of nuclear fission modules defining a reactor core having a plurality of coolant flow zones at a block 7046.

Figure 7S:
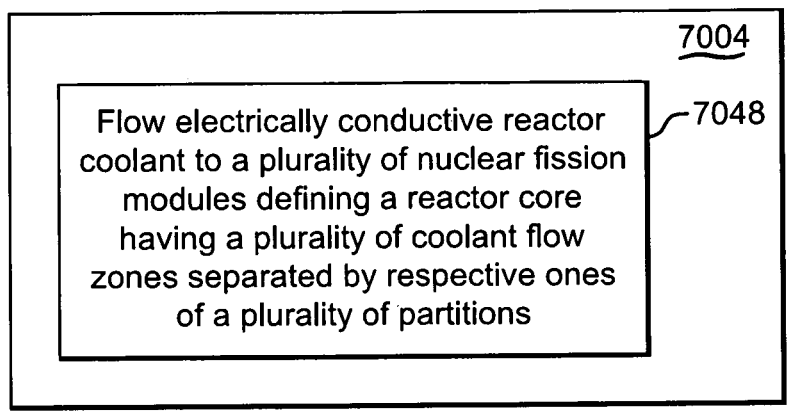

Referring to FIGS. 7A and 7S, in some embodiments flowing electrically conductive reactor coolant to a nuclear fission module in a nuclear fission reactor at the block 7004 may include flowing electrically conductive reactor coolant to a plurality of nuclear fission modules defining a reactor core having a plurality of coolant flow zones separated by respective ones of a plurality of partitions at a block 7048.

Figure 7T:
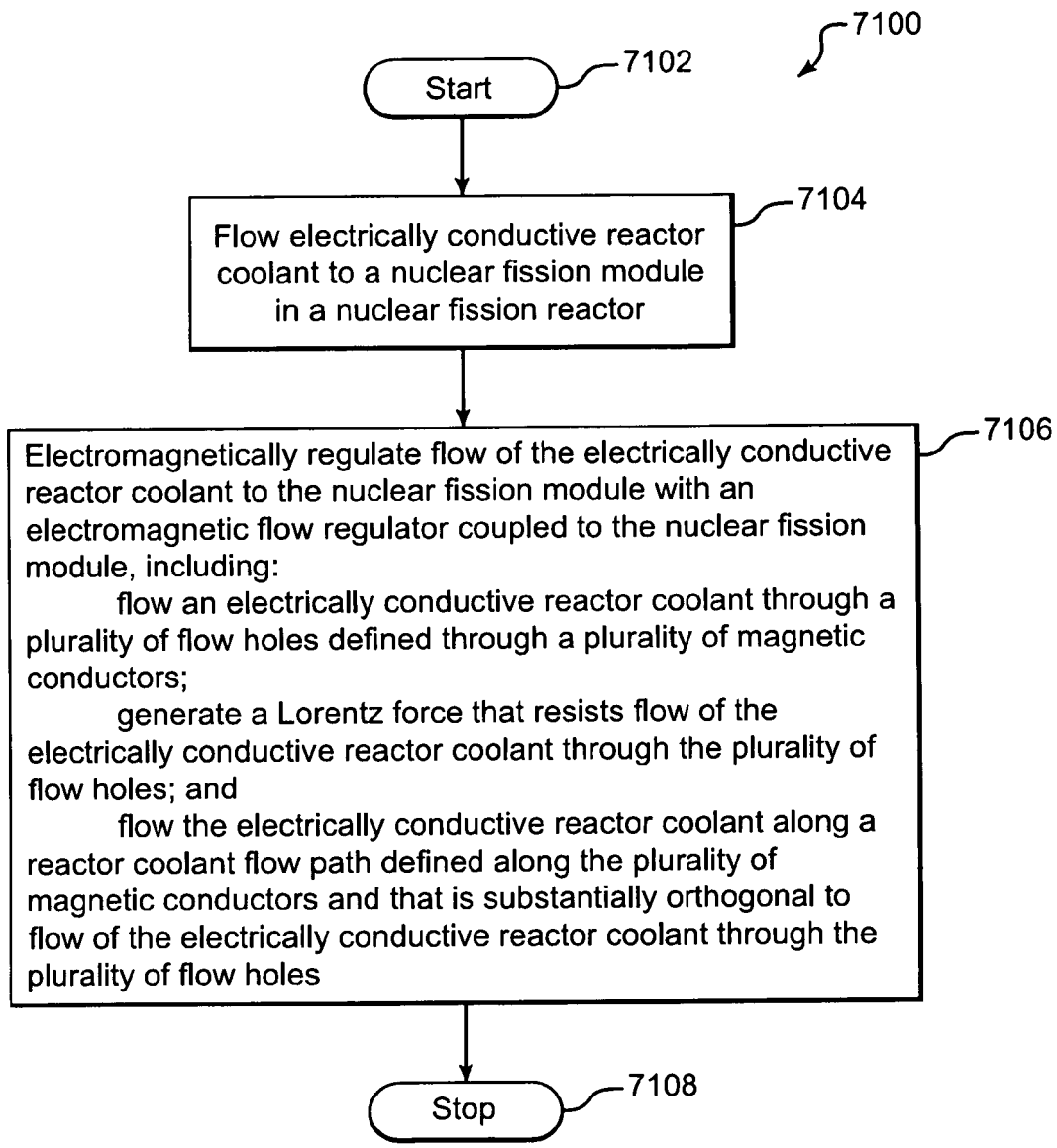
FIG. 7T is a flowchart of an illustrative method of regulating flow of another electrically conductive reactor coolant.

Referring now to FIG. 7T, an illustrative method 7100 is provided for regulating flow of an electrically conductive reactor coolant in a nuclear fission reactor. The method 7100 starts at a block 7102. At a block 7104, electrically conductive reactor coolant is flowed to a nuclear fission module in a nuclear fission reactor. At a block 7106 flow of the electrically conductive reactor coolant to the nuclear fission module is electromagnetically regulated with an electromagnetic flow regulator coupled to the nuclear fission module. Electromagnetically regulating flow of the electrically conductive reactor coolant to the nuclear fission module with an electromagnetic flow regulator coupled to the nuclear fission module at the block 7106 includes flowing an electrically conductive reactor coolant through a plurality of flow holes defined through a plurality of magnetic conductors. Electromagnetically regulating flow of the electrically conductive reactor coolant to the nuclear fission module with an electromagnetic flow regulator coupled to the nuclear fission module at the block 7106 also includes generating a Lorentz force that resists flow of the electrically conductive reactor coolant through the plurality of flow holes. Electromagnetically regulating flow of the electrically conductive reactor coolant to the nuclear fission module with an electromagnetic flow regulator coupled to the nuclear fission module at the block 7106 also includes flowing the electrically conductive reactor coolant along a reactor coolant flow path defined along the plurality of magnetic conductors and that is substantially orthogonal to flow of the electrically conductive reactor coolant through the plurality of flow holes. The method 7100 stops at a block 7108.

Figure 7U:
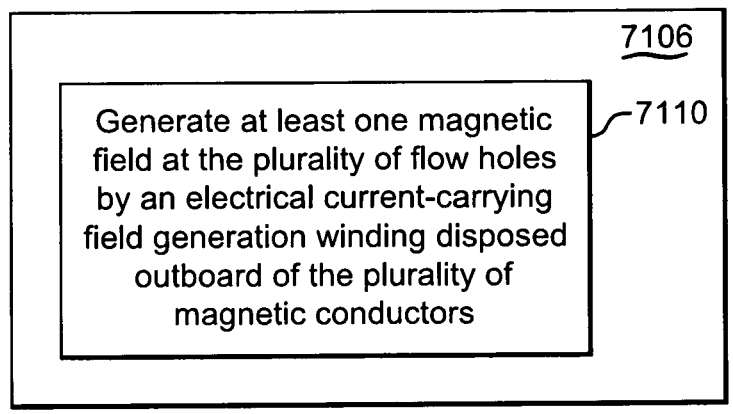

Referring additionally to FIG. 7U, in some embodiments generating a Lorentz force that resists flow of the electrically conductive reactor coolant through the plurality of flow holes at the block 7106 may include generating at least one magnetic field at the plurality of flow holes by an electrical current-carrying field generation winding disposed outboard of the plurality of magnetic conductors at a block 7110.

Figure 7V:
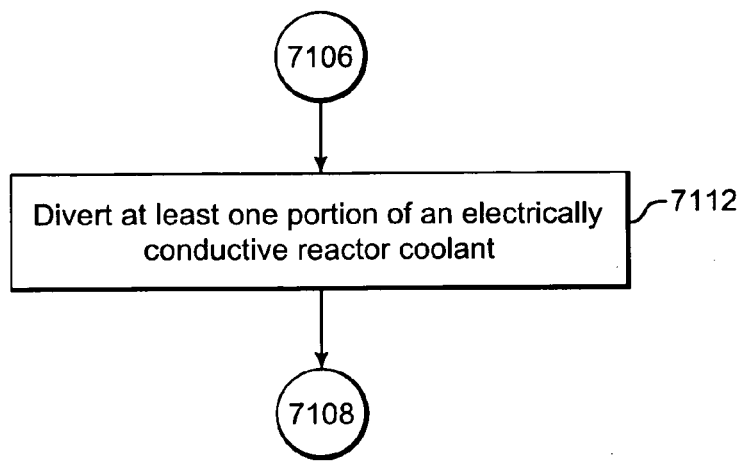

Referring now to FIGS. 7T and 7V, in some embodiments at least one portion of an electrically conductive reactor coolant may be diverted at a block 7112.

Figure 7W:
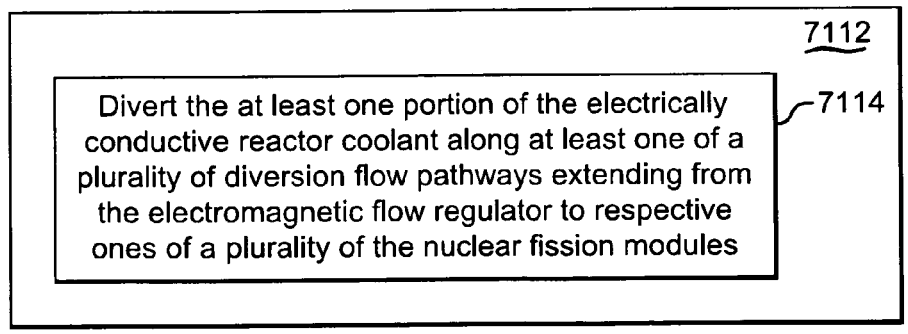

For example and referring additionally to FIG. 7W, in some embodiments diverting at least one portion of an electrically conductive reactor coolant at the block 7112 may include diverting the at least one portion of the electrically conductive reactor coolant along at least one of a plurality of diversion flow pathways extending from the electromagnetic flow regulator to respective ones of a plurality of the nuclear fission modules at a block 7114.

Figure 7X:
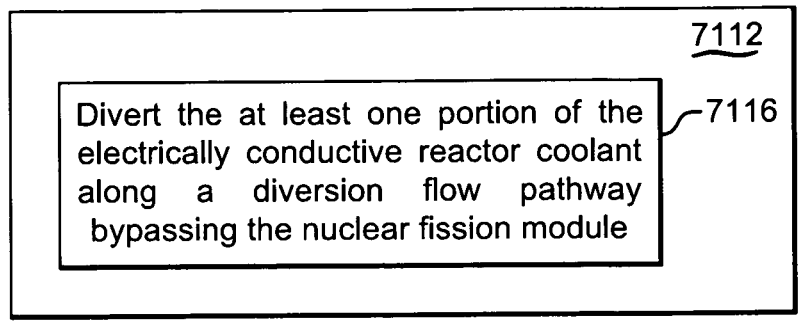

As another example and referring now to FIGS. 7T, 7V, and 7X, in some other embodiments diverting at least one portion of an electrically conductive reactor coolant at the block 7112 may include diverting the at least one portion of the electrically conductive reactor coolant along a diversion flow pathway bypassing the nuclear fission module at a block 7116.

Figure 7Y:
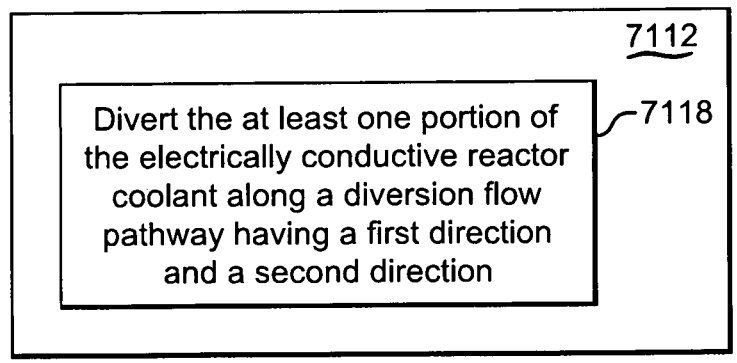

As another example and referring now to FIGS. 7T, 7V, and 7Y, in some other embodiments diverting at least one portion of an electrically conductive reactor coolant at the block 7112 may include diverting the at least one portion of the electrically conductive reactor coolant along a diversion flow pathway having a first direction and a second direction at a block 7118.

Figure 7Z:
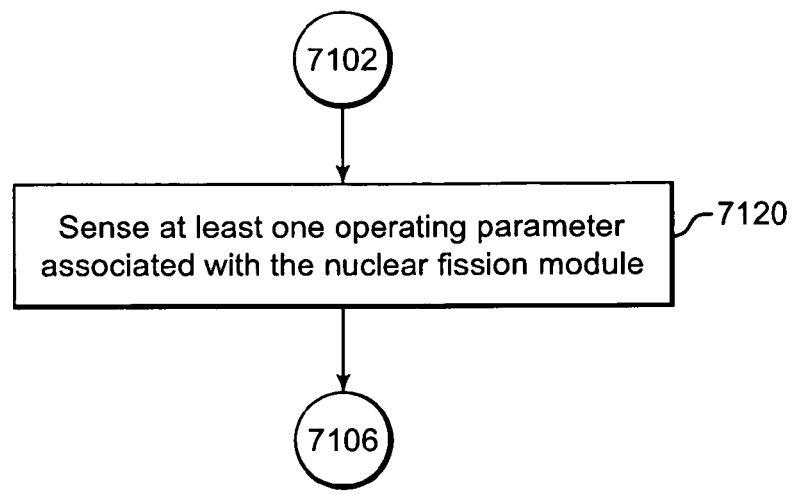
Figure 7A:
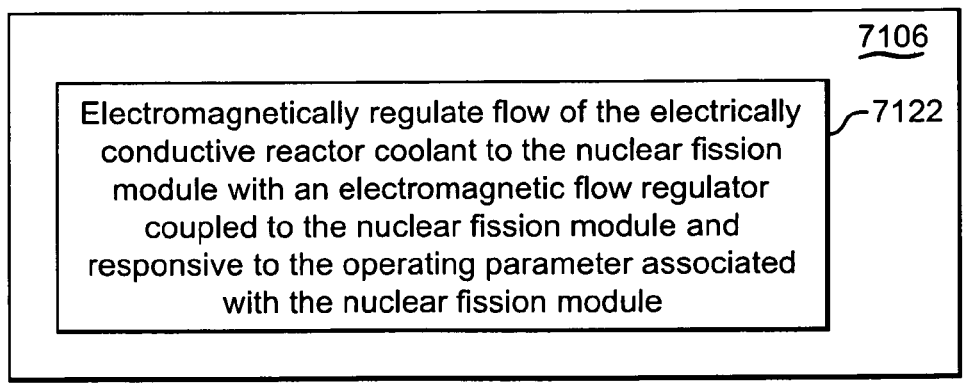
Figure 7A:
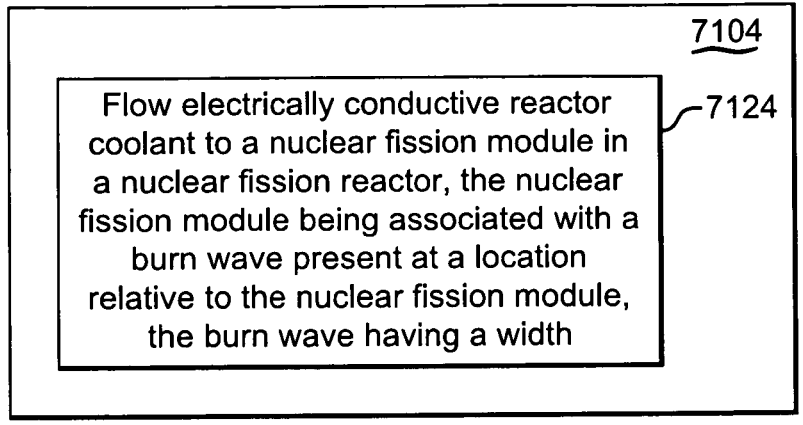
Figure 7A:
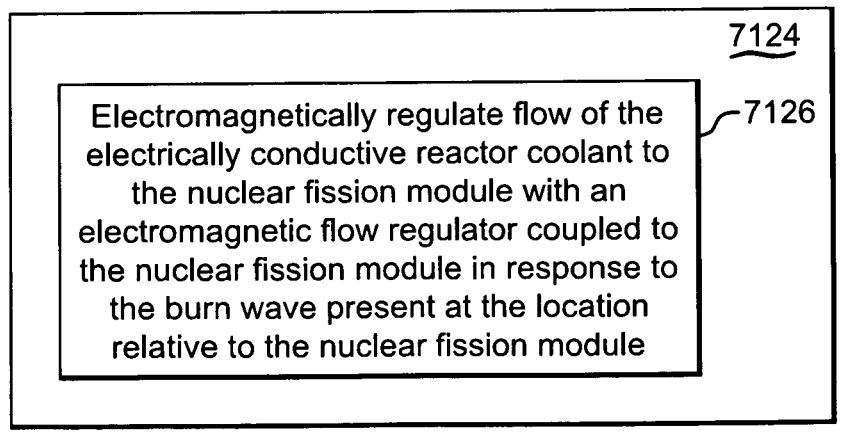
Figure 7A:
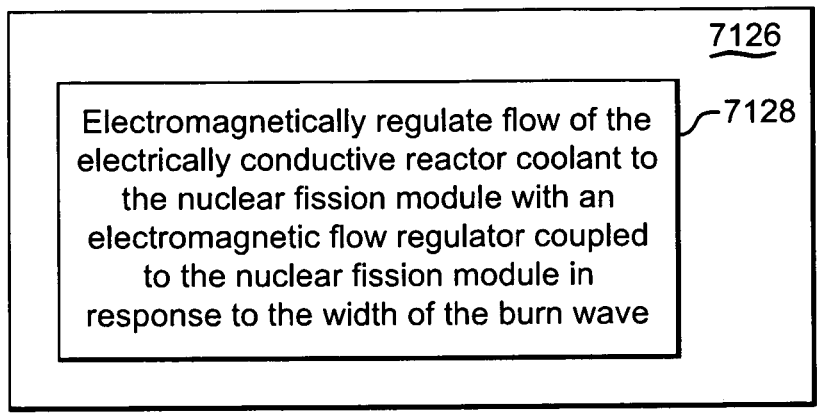
Figure 7A:
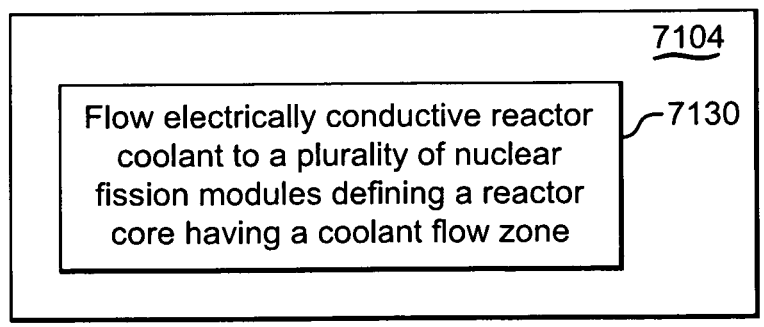
Figure 7A:
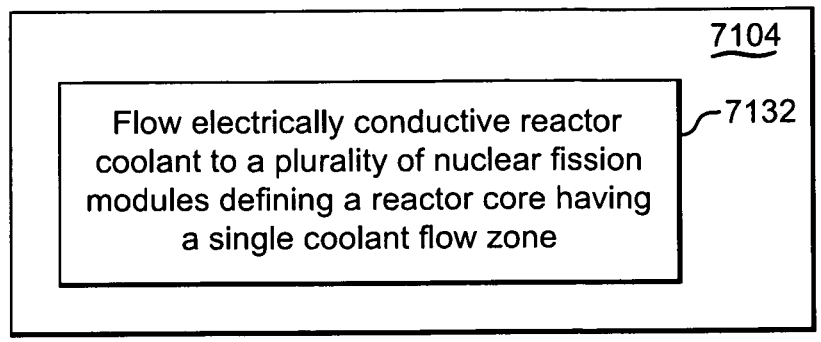
Figure 7A:
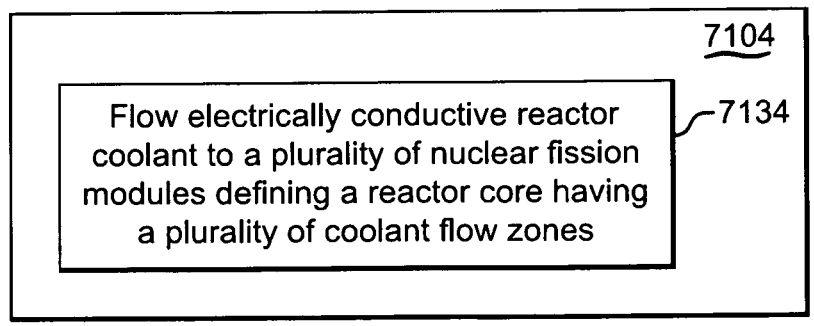
Figure 7A:
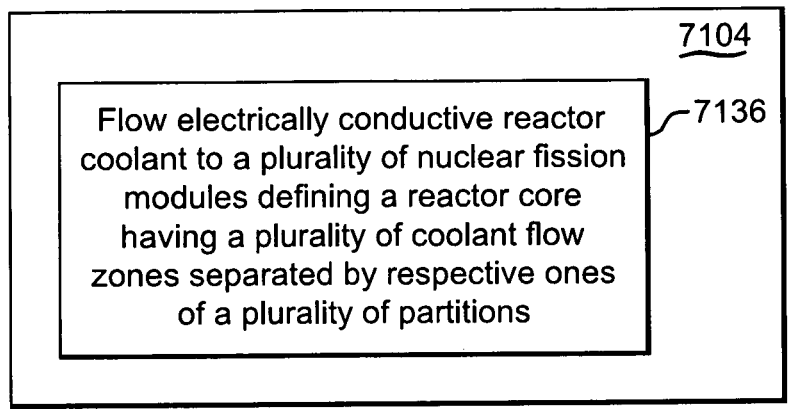
Figure 7A:
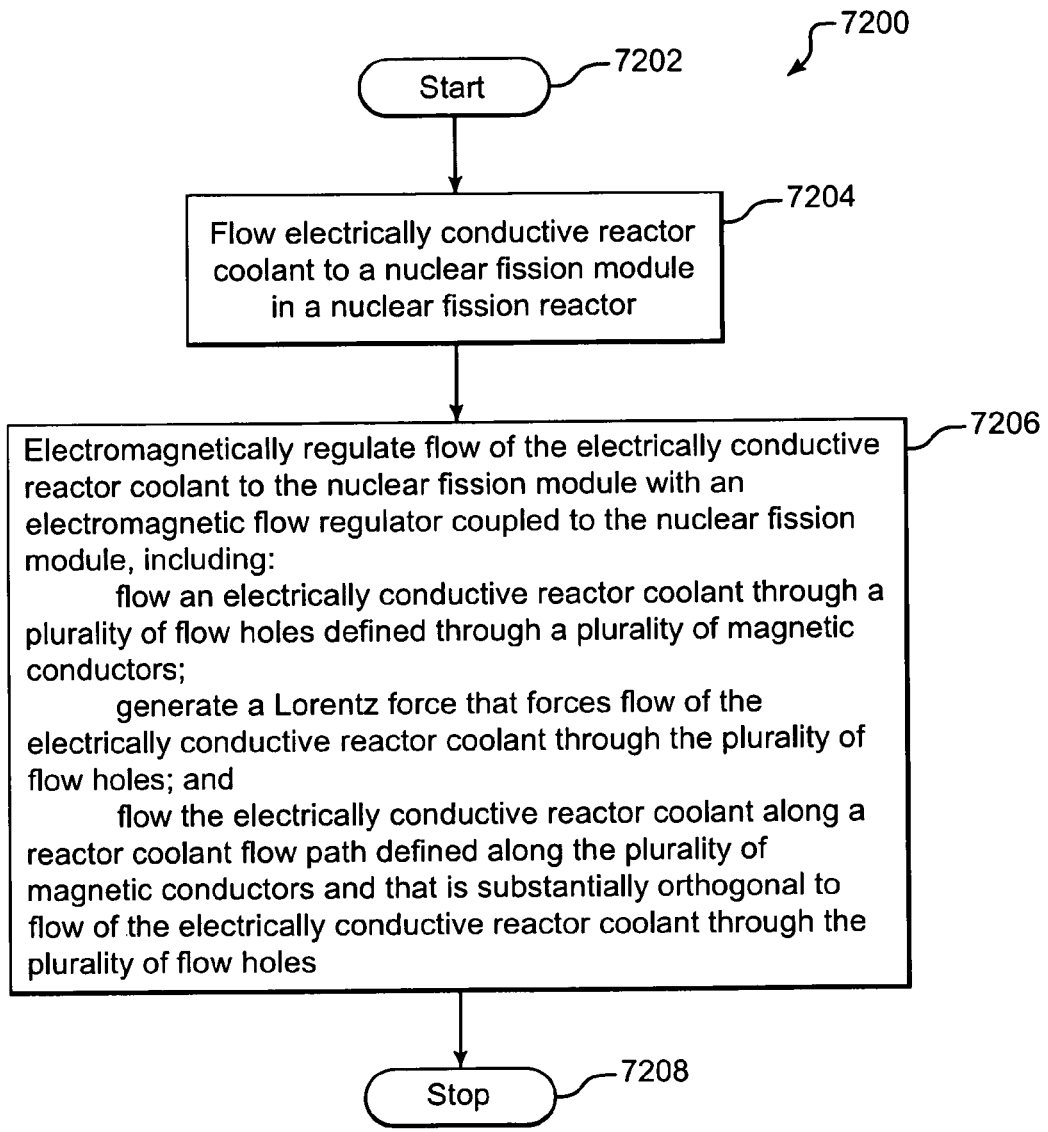
Figure 7A:
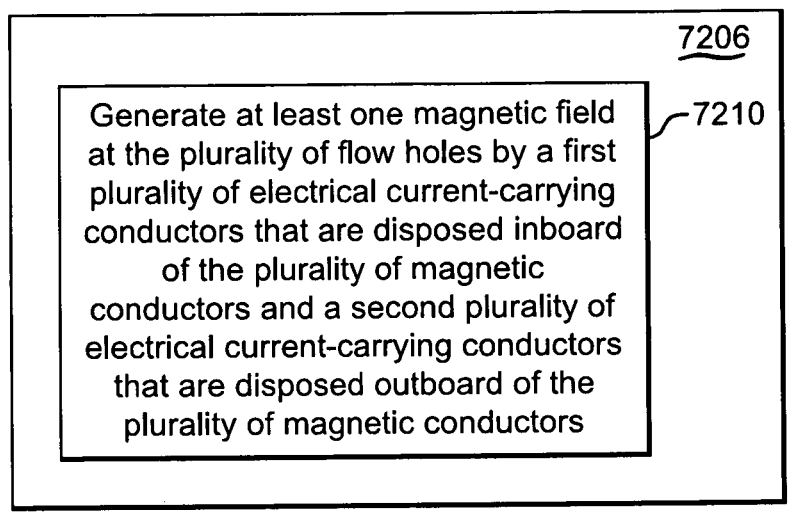
Figure 7A:
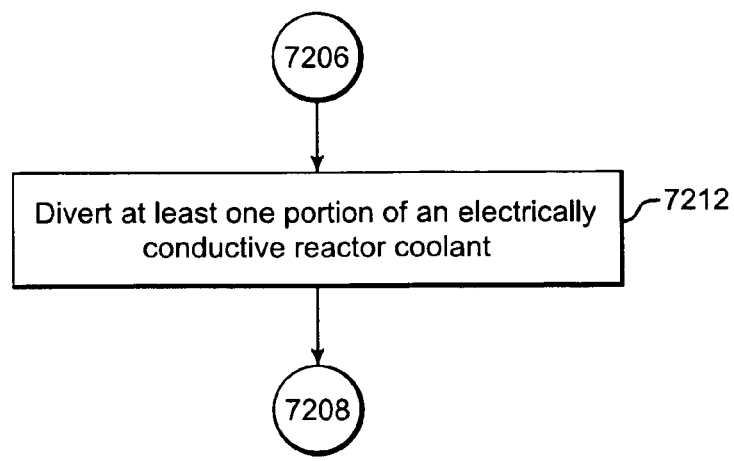
Figure 7A:
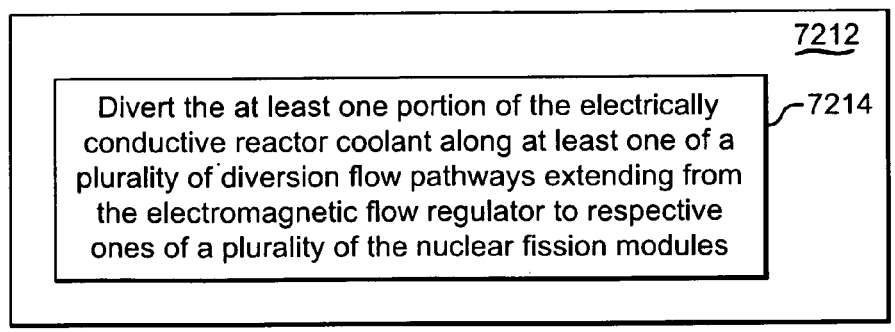
Figure 7A:
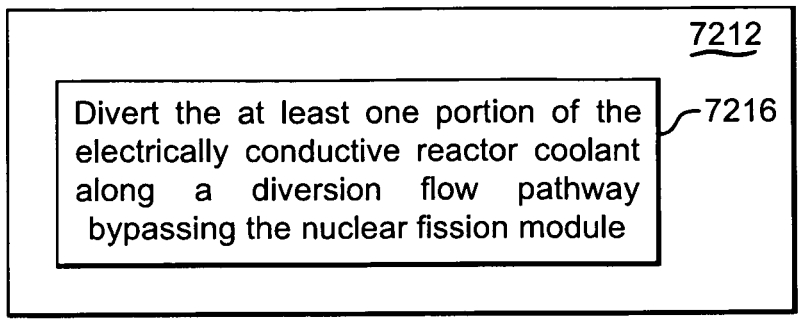
Figure 7A:
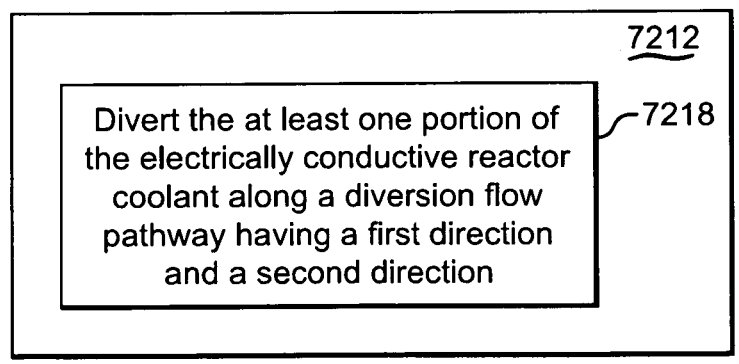
Figure 7A:
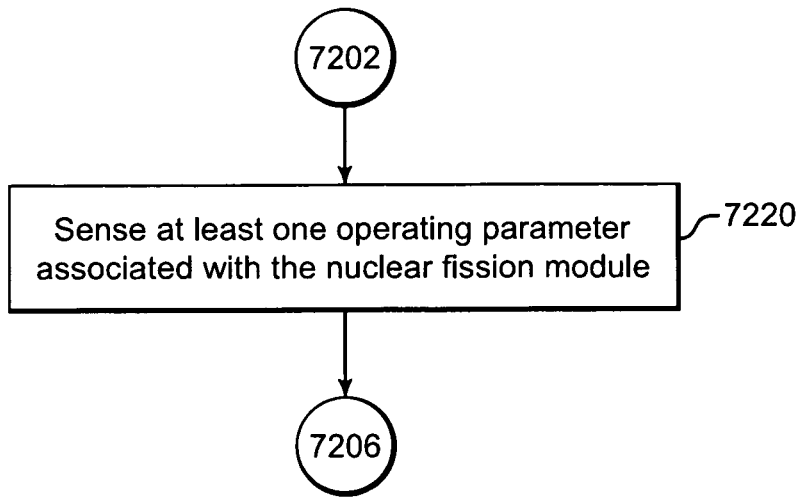
Figure 7A:
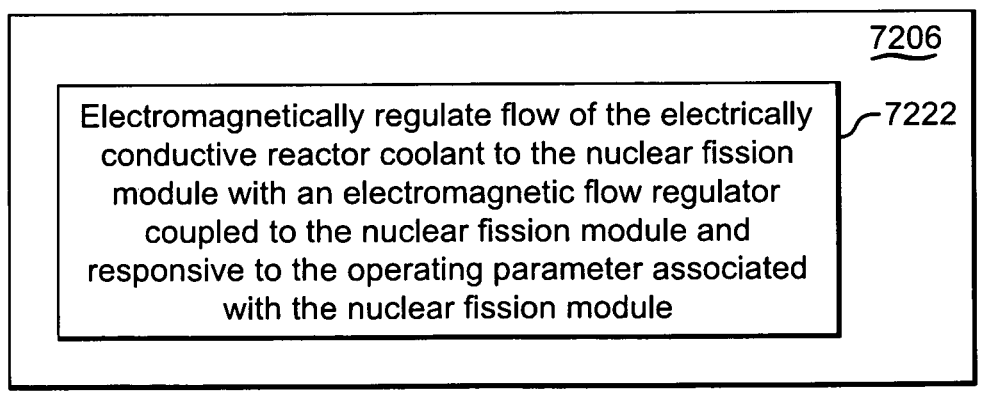
Figure 7A:
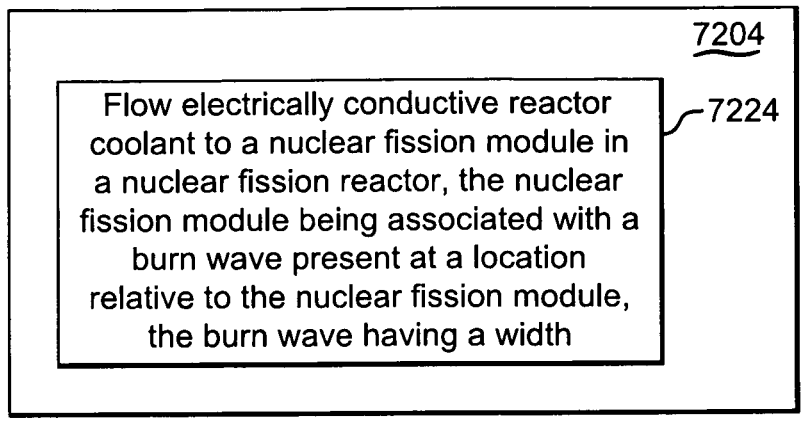
Figure 7A:
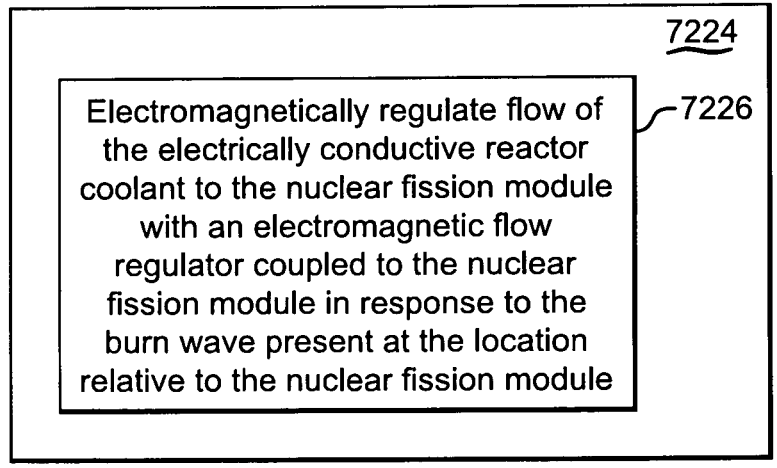
Figure 7A:
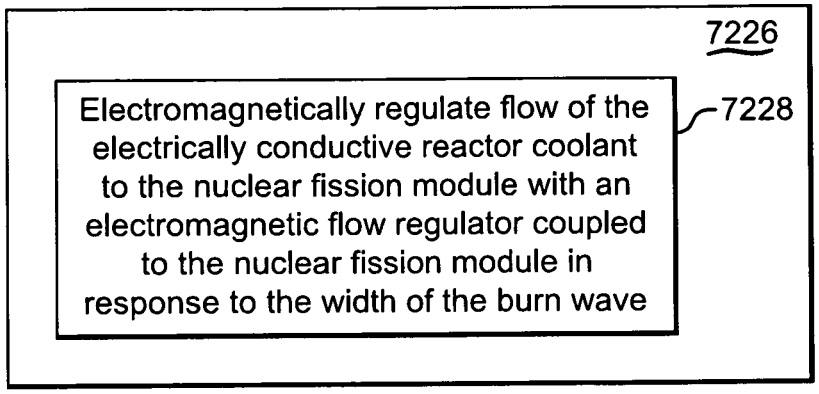
Figure 7A:
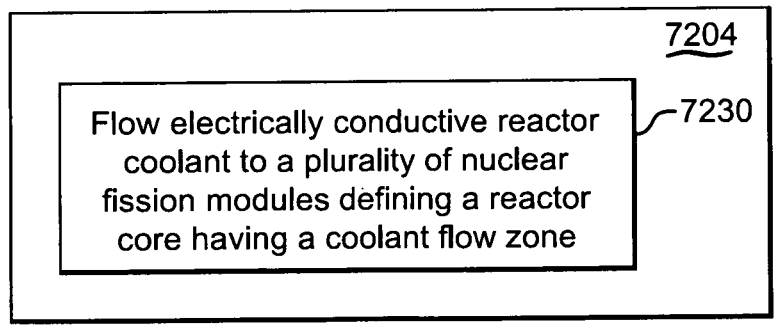
Figure 7A:
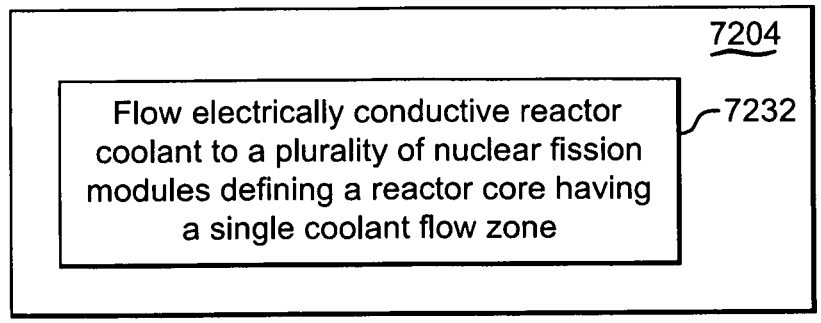
Figure 7A:
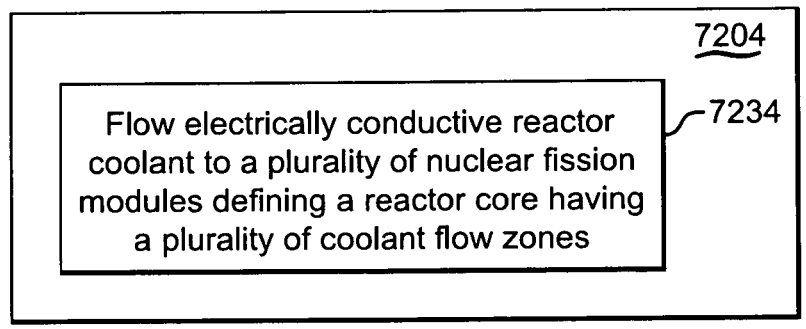
Figure 7A:
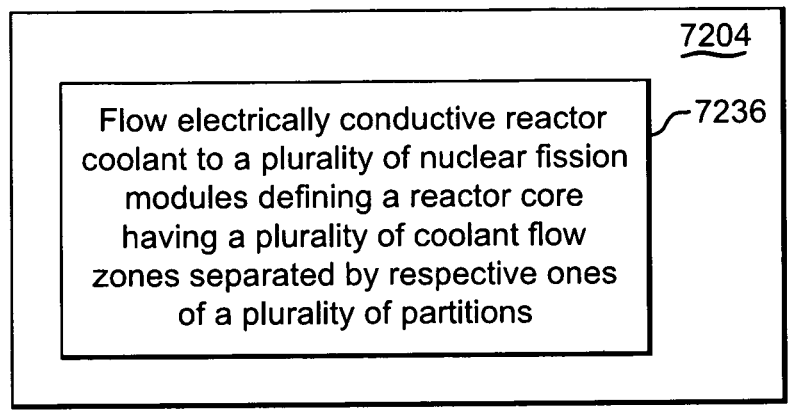

Referring now to FIGS. 7T and 7Z, in some embodiments at least one operating parameter associated with the nuclear fission module may be sensed at a block 7120.

Referring additionally to FIG. 7AA, in such cases electromagnetically regulating flow of the electrically conductive reactor coolant to the nuclear fission module with an electromagnetic flow regulator coupled to the nuclear fission module at the block 7106 may include electromagnetically regulating flow of the electrically conductive reactor coolant to the nuclear fission module with an electromagnetic flow regulator coupled to the nuclear fission module and responsive to the operating parameter associated with the nuclear fission module at a block 7122.

The operating parameter associated with the nuclear fission module may include any parameter as desired. In various embodiments, the operating parameter may include without limitation temperature, neutron flux, neutron fluence, a characteristic isotope, pressure, and/or flow rate of the electrically conductive reactor coolant.

In some other embodiments and referring to FIGS. 7T and 7AB, flowing electrically conductive reactor coolant to a nuclear fission module in a nuclear fission reactor at the block 7104 may include flowing electrically conductive reactor coolant to a nuclear fission module in a nuclear fission reactor, the nuclear fission module being associated with a burn wave present at a location relative to the nuclear fission module, the burn wave having a width, at a block 7124.

Referring additionally to FIG. 7AC, in some such cases electromagnetically regulating flow of the electrically conductive reactor coolant to the nuclear fission module with an electromagnetic flow regulator coupled to the nuclear fission module at the block 7124 may include electromagnetically regulating flow of the electrically conductive reactor coolant to the nuclear fission module with an electromagnetic flow regulator coupled to the nuclear fission module in response to the burn wave present at the location relative to the nuclear fission module at a block 7126. For example and referring additionally to FIG. 7AD, electromagnetically regulating flow of the electrically conductive reactor coolant to the nuclear fission module with an electromagnetic flow regulator coupled to the nuclear fission module in response to the burn wave present at the location relative to the nuclear fission module at the block 7126 may include electromagnetically regulating flow of the electrically conductive reactor coolant to the nuclear fission module with an electromagnetic flow regulator coupled to the nuclear fission module in response to the width of the burn wave at a block 7128.

Referring now to FIGS. 7T and 7AE, in some embodiments flowing electrically conductive reactor coolant to a nuclear fission module in a nuclear fission reactor at the block 7104 may include flowing electrically conductive reactor coolant to a plurality of nuclear fission modules defining a reactor core having a coolant flow zone at a block 7130.

Referring to FIGS. 7T and 7AF, in some embodiments flowing electrically conductive reactor coolant to a nuclear fission module in a nuclear fission reactor at the block 7104 may include flowing electrically conductive reactor coolant to a plurality of nuclear fission modules defining a reactor core having a single coolant flow zone at a block 7132.

Referring to FIGS. 7T and 7AG, in some embodiments flowing electrically conductive reactor coolant to a nuclear fission module in a nuclear fission reactor at the block 7104 may include flowing electrically conductive reactor coolant to a plurality of nuclear fission modules defining a reactor core having a plurality of coolant flow zones at a block 7134.

Referring to FIGS. 7T and 7AH, in some embodiments flowing electrically conductive reactor coolant to a nuclear fission module in a nuclear fission reactor at the block 7104 may include flowing electrically conductive reactor coolant to a plurality of nuclear fission modules defining a reactor core having a plurality of coolant flow zones separated by respective ones of a plurality of partitions at a block 7136.

Referring now to FIG. 7I, an illustrative method 7200 is provided for regulating flow of an electrically conductive reactor coolant in a nuclear fission reactor. The method 7200 starts at a block 7202. At a block 7204, electrically conductive reactor coolant is flowed to a nuclear fission module in a nuclear fission reactor. At a block 7206 flow of the electrically conductive reactor coolant to the nuclear fission module is electromagnetically regulated with an electromagnetic flow regulator coupled to the nuclear fission module. Electromagnetically regulating flow of the electrically conductive reactor coolant to the nuclear fission module with an electromagnetic flow regulator coupled to the nuclear fission module at the block 7206 includes flowing an electrically conductive reactor coolant through a plurality of flow holes defined through a plurality of magnetic conductors. Electromagnetically regulating flow of the electrically conductive reactor coolant to the nuclear fission module with an electromagnetic flow regulator coupled to the nuclear fission module at the block 7206 also includes generating a Lorentz force that forces flow of the electrically conductive reactor coolant through the plurality of flow holes. Electromagnetically regulating flow of the electrically conductive reactor coolant to the nuclear fission module with an electromagnetic flow regulator coupled to the nuclear fission module at the block 7206 also includes flowing the electrically conductive reactor coolant along a reactor coolant flow path defined along the plurality of magnetic conductors and that is substantially orthogonal to flow of the electrically conductive reactor coolant through the plurality of flow holes. The method 7200 stops at a block 7208.

Referring additionally to FIG. 7AJ, in some embodiments generating a Lorentz force that forces flow of the electrically conductive reactor coolant through the plurality of flow holes at the block 7206 may include generating at least one magnetic field at the plurality of flow holes by a first plurality of electrical current-carrying conductors that are disposed inboard of the plurality of magnetic conductors and a second plurality of electrical current-carrying conductors that are disposed outboard of the plurality of magnetic conductors at a block 7210.

Referring now to FIGS. 7AI and 7AK, in some embodiments at least one portion of an electrically conductive reactor coolant may be diverted at a block 7212.

For example and referring additionally to FIG. 7AL, in some embodiments diverting at least one portion of an electrically conductive reactor coolant at the block 7212 may include diverting the at least one portion of the electrically conductive reactor coolant along at least one of a plurality of diversion flow pathways extending from the electromagnetic flow regulator to respective ones of a plurality of the nuclear fission modules at a block 7214.

As another example and referring now to FIGS. 7AI, 7AK, and 7AM, in some other embodiments diverting at least one portion of an electrically conductive reactor coolant at the block 7212 may include diverting the at least one portion of the electrically conductive reactor coolant along a diversion flow pathway bypassing the nuclear fission module at a block 7216.

As another example and referring now to FIGS. 7AI, 7AK, and 7AN, in some other embodiments diverting at least one portion of an electrically conductive reactor coolant at the block 7212 may include diverting the at least one portion of the electrically conductive reactor coolant along a diversion flow pathway having a first direction and a second direction at a block 7218.

Referring now to FIGS. 7AI and 7AO, in some embodiments at least one operating parameter associated with the nuclear fission module may be sensed at a block 7220.

Referring additionally to FIG. 7AP, in such cases electromagnetically regulating flow of the electrically conductive reactor coolant to the nuclear fission module with an electromagnetic flow regulator coupled to the nuclear fission module at the block 7206 may include electromagnetically regulating flow of the electrically conductive reactor coolant to the nuclear fission module with an electromagnetic flow regulator coupled to the nuclear fission module and responsive to the operating parameter associated with the nuclear fission module at a block 7222.

The operating parameter associated with the nuclear fission module may include any parameter as desired. In various embodiments, the operating parameter may include without limitation temperature, neutron flux, neutron fluence, a characteristic isotope, pressure, and/or flow rate of the electrically conductive reactor coolant.

In some other embodiments and referring to FIGS. 7AI and 7AQ, flowing electrically conductive reactor coolant to a nuclear fission module in a nuclear fission reactor at the block 7204 may include flowing electrically conductive reactor coolant to a nuclear fission module in a nuclear fission reactor, the nuclear fission module being associated with a burn wave present at a location relative to the nuclear fission module, the burn wave having a width, at a block 7224.

Referring additionally to FIG. 7AR, in some such cases electromagnetically regulating flow of the electrically conductive reactor coolant to the nuclear fission module with an electromagnetic flow regulator coupled to the nuclear fission module at the block 7224 may include electromagnetically regulating flow of the electrically conductive reactor coolant to the nuclear fission module with an electromagnetic flow regulator coupled to the nuclear fission module in response to the burn wave present at the location relative to the nuclear fission module at a block 7226. For example and referring additionally to FIG. 7AS, electromagnetically regulating flow of the electrically conductive reactor coolant to the nuclear fission module with an electromagnetic flow regulator coupled to the nuclear fission module in response to the burn wave present at the location relative to the nuclear fission module at the block 7226 may include electromagnetically regulating flow of the electrically conductive reactor coolant to the nuclear fission module with an electromagnetic flow regulator coupled to the nuclear fission module in response to the width of the burn wave at a block 7228.

Referring now to FIGS. 7AI and 7AT, in some embodiments flowing electrically conductive reactor coolant to a nuclear fission module in a nuclear fission reactor at the block 7204 may include flowing electrically conductive reactor coolant to a plurality of nuclear fission modules defining a reactor core having a coolant flow zone at a block 7230.

Referring to FIGS. 7AI and 7AU, in some embodiments flowing electrically conductive reactor coolant to a nuclear fission module in a nuclear fission reactor at the block 7204 may include flowing electrically conductive reactor coolant to a plurality of nuclear fission modules defining a reactor core having a single coolant flow zone at a block 7232.

Referring to FIGS. 7AI and 7AV, in some embodiments flowing electrically conductive reactor coolant to a nuclear fission module in a nuclear fission reactor at the block 7204 may include flowing electrically conductive reactor coolant to a plurality of nuclear fission modules defining a reactor core having a plurality of coolant flow zones at a block 71342.

Referring to FIGS. 7AI and 7AW, in some embodiments flowing electrically conductive reactor coolant to a nuclear fission module in a nuclear fission reactor at the block 7204 may include flowing electrically conductive reactor coolant to a plurality of nuclear fission modules defining a reactor core having a plurality of coolant flow zones separated by respective ones of a plurality of partitions at a block 7236.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Moreover, those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Moreover, the various aspects and embodiments disclosed herein are for purposes of illustration and are not intended to be limiting, with the true scope and spirit being indicated by the following claims.

What is claimed is:

1. A method of regulating flow of an electrically conductive reactor coolant in a nuclear fission reactor, the method comprising:
    flowing electrically conductive reactor coolant to a nuclear fission module in a nuclear fission reactor; and
    electromagnetically regulating flow of the electrically conductive reactor coolant to the nuclear fission module with an electromagnetic flow regulator operatively coupled to the nuclear fission module, including:
        flowing an electrically conductive reactor coolant through a reactor coolant inlet path that is defined through a plurality of magnetic conductors;
        generating a Lorentz force that regulates flow of the electrically conductive reactor coolant through the reactor coolant inlet path; and
        flowing the electrically conductive reactor coolant along a reactor coolant flow path defined along the plurality of magnetic conductors and that is substantially orthogonal to the reactor coolant inlet path.

2. The method of claim 1, wherein generating a Lorentz force that regulates flow of the electrically conductive reactor coolant through the reactor coolant inlet path includes generating a Lorentz force that resists flow of the electrically conductive reactor coolant through the reactor coolant inlet path.

3. The method of claim 2, wherein generating a Lorentz force that resists flow of the electrically conductive reactor coolant through the reactor coolant inlet path includes generating at least one magnetic field at the reactor coolant inlet path by an electrical current-carrying field generation winding disposed exterior of the plurality of magnetic conductors.

4. The method of claim 1, wherein generating a Lorentz force that regulates flow of the electrically conductive reactor coolant through the reactor coolant inlet path includes generating a Lorentz force that forces flow of the electrically conductive reactor coolant through the reactor coolant inlet path.

5. The method of claim 4, wherein generating a Lorentz force that forces flow of the electrically conductive reactor coolant through the reactor coolant inlet path includes generating at least one magnetic field at the reactor coolant inlet path by a first plurality of electrical current-carrying conductors that are disposed interior of the plurality of magnetic conductors and a second plurality of electrical current-carrying conductors that are disposed exterior of the plurality of magnetic conductors.

6. The method of claim 1, further comprising flowing at least one portion of an electrically conductive reactor coolant from the electromagnetic flow regulator to respective ones of a plurality of the nuclear fission modules.

7. The method of claim 1, further comprising flowing at least one portion of an electrically conductive reactor coolant to bypass the nuclear fission module.

8. The method of claim 1, further comprising:
    sensing at least one operating parameter associated with the nuclear fission module.

9. The method of claim 8, wherein electromagnetically regulating flow of the electrically conductive reactor coolant to the nuclear fission module with an electromagnetic flow regulator operatively coupled to the nuclear fission module includes electromagnetically regulating flow of the electrically conductive reactor coolant to the nuclear fission module with an electromagnetic flow regulator operatively coupled to the nuclear fission module and responsive to the at least one operating parameter associated with the nuclear fission module.

10. The method of claim 9, wherein the operating parameter associated with the nuclear fission module includes at least one parameter chosen from temperature, neutron flux, neutron fluence, power, pressure, and flow rate of the electrically conductive reactor coolant.

11. The method of claim 1, further comprising generating a burn wave with the nuclear fission module, the burn wave having a width.

12. The method of claim 11, wherein electromagnetically regulating flow of the electrically conductive reactor coolant to the nuclear fission module with an electromagnetic flow regulator operatively coupled to the nuclear fission module includes electromagnetically regulating flow of the electrically conductive reactor coolant to the nuclear fission module with an electromagnetic flow regulator operatively coupled to the nuclear fission module in response to the burn wave.

13. The method of claim 12, wherein electromagnetically regulating flow of the electrically conductive reactor coolant to the nuclear fission module with an electromagnetic flow regulator operatively coupled to the nuclear fission module in response to the burn wave includes electromagnetically regulating flow of the electrically conductive reactor coolant to the nuclear fission module with an electromagnetic flow regulator operatively coupled to the nuclear fission module in response to the width of the burn wave.

14. The method of claim 1, wherein flowing electrically conductive reactor coolant to a nuclear fission module in a nuclear fission reactor includes flowing electrically conductive reactor coolant to a plurality of nuclear fission modules defining a reactor core having a coolant flow zone.

15. The method of claim 1, wherein flowing electrically conductive reactor coolant to a nuclear fission module in a nuclear fission reactor includes flowing electrically conductive reactor coolant to a plurality of nuclear fission modules defining a reactor core having a single coolant flow zone.

16. The method of claim 1, wherein flowing electrically conductive reactor coolant to a nuclear fission module in a nuclear fission reactor includes flowing electrically conductive reactor coolant to a plurality of nuclear fission modules defining a reactor core having a plurality of coolant flow zones.

17. The method of claim 16, wherein a single electromagnetic flow regulator flows electrically conductive reactor coolant to each of the plurality of coolant flow zones.

18. The method of claim 16, wherein a plurality of electromagnetic flow regulators flow electrically conductive reactor coolant to each of the plurality of coolant flow zones.

19. The method of claim 1, wherein flowing electrically conductive reactor coolant to a nuclear fission module in a nuclear fission reactor includes flowing electrically conductive reactor coolant to a plurality of nuclear fission modules defining a reactor core having a plurality of coolant flow zones separated by respective ones of a plurality of partitions.

20. A method of regulating flow of an electrically conductive reactor coolant in a nuclear fission reactor, the method comprising:
   flowing electrically conductive reactor coolant to a nuclear fission module in a nuclear fission reactor; and
   electromagnetically regulating flow of the electrically conductive reactor coolant to the nuclear fission module with an electromagnetic flow regulator operatively coupled to the nuclear fission module, including:
   flowing an electrically conductive reactor coolant through a plurality of flow holes defined through a plurality of magnetic conductors;
   generating a Lorentz force that resists flow of the electrically conductive reactor coolant through the plurality of flow holes; and
   flowing the electrically conductive reactor coolant along a reactor coolant flow path defined along the plurality of magnetic conductors and that is substantially orthogonal to flow of the electrically conductive reactor coolant through the plurality of flow holes.

21. The method of claim 20, wherein generating a Lorentz force that resists flow of the electrically conductive reactor coolant through the plurality of flow holes includes generating at least one magnetic field at the plurality of flow holes by an electrical current-carrying field generation winding disposed exterior of the plurality of magnetic conductors.

22. The method of claim 20, further comprising flowing at least one portion of an electrically conductive reactor coolant from the electromagnetic flow regulator to respective ones of a plurality of the nuclear fission modules.

23. The method of claim 20, further comprising flowing at least one portion of an electrically conductive reactor coolant to bypass the nuclear fission module.

24. The method of claim 20, further comprising:
   sensing at least one operating parameter associated with the nuclear fission module.

25. The method of claim 24, wherein electromagnetically regulating flow of the electrically conductive reactor coolant to the nuclear fission module with an electromagnetic flow regulator operatively coupled to the nuclear fission module includes electromagnetically regulating flow of the electrically conductive reactor coolant to the nuclear fission module with an electromagnetic flow regulator operatively coupled to the nuclear fission module and responsive to the at least one operating parameter associated with the nuclear fission module.

26. The method of claim 25, wherein the operating parameter associated with the nuclear fission module includes at least one parameter chosen from temperature, neutron flux, neutron fluence, power, pressure, and flow rate of the electrically conductive reactor coolant.

27. The method of claim 20, further comprising generating a burn wave with the nuclear fission module, the burn wave having a width.

28. The method of claim 27, wherein electromagnetically regulating flow of the electrically conductive reactor coolant to the nuclear fission module with an electromagnetic flow regulator operatively coupled to the nuclear fission module includes electromagnetically regulating flow of the electrically conductive reactor coolant to the nuclear fission module with an electromagnetic flow regulator operatively coupled to the nuclear fission module in response to the burn wave.

29. The method of claim 27, wherein electromagnetically regulating flow of the electrically conductive reactor coolant to the nuclear fission module with an electromagnetic flow regulator operatively coupled to the nuclear fission module in response to the burn wave includes electromagnetically regulating flow of the electrically conductive reactor coolant to the nuclear fission module with an electromagnetic flow regulator operatively coupled to the nuclear fission module in response to the width of the burn wave.

30. The method of claim 20, wherein flowing electrically conductive reactor coolant to a nuclear fission module in a nuclear fission reactor includes flowing electrically conductive reactor coolant to a plurality of nuclear fission modules defining a reactor core having a coolant flow zone.

31. The method of claim 20, wherein flowing electrically conductive reactor coolant to a nuclear fission module in a nuclear fission reactor includes flowing electrically conductive reactor coolant to a plurality of nuclear fission modules defining a reactor core having a single coolant flow zone.

32. The method of claim 20, wherein flowing electrically conductive reactor coolant to a nuclear fission module in a nuclear fission reactor includes flowing electrically conductive reactor coolant to a plurality of nuclear fission modules defining a reactor core having a plurality of coolant flow zones.

33. The method of claim 32, wherein a single electromagnetic flow regulator flows electrically conductive reactor coolant to each of the plurality of coolant flow zones.

34. The method of claim 32, wherein a plurality of electromagnetic flow regulators flow electrically conductive reactor coolant to each of the plurality of coolant flow zones.

35. The method of claim 20, wherein flowing electrically conductive reactor coolant to a nuclear fission module in a nuclear fission reactor includes flowing electrically conductive reactor coolant to a plurality of nuclear fission modules defining a reactor core having a plurality of coolant flow zones separated by respective ones of a plurality of partitions.

36. A method of regulating flow of an electrically conductive reactor coolant in a nuclear fission reactor, the method comprising:
   flowing electrically conductive reactor coolant to a nuclear fission module in a nuclear fission reactor; and
   electromagnetically regulating flow of the electrically conductive reactor coolant to the nuclear fission module with an electromagnetic flow regulator operatively coupled to the nuclear fission module, including:
   flowing an electrically conductive reactor coolant through a plurality of flow holes defined through a plurality of magnetic conductors;
   generating a Lorentz force that forces flow of the electrically conductive reactor coolant through the plurality of flow holes; and
   flowing the electrically conductive reactor coolant along a reactor coolant flow path defined along the plurality of magnetic conductors and that is substantially orthogonal to flow of the electrically conductive reactor coolant through the plurality of flow holes.

37. The method of claim 36, wherein generating a Lorentz force that forces flow of the electrically conductive reactor coolant through the plurality of flow holes includes generating at least one magnetic field at the plurality of flow holes by a first plurality of electrical current-carrying conductors that are disposed interior of the plurality of magnetic conductors and a second plurality of electrical current-carrying conductors that are disposed exterior of the plurality of magnetic conductors.

38. The method of claim 36, further comprising flowing at least one portion of an electrically conductive reactor coolant from the electromagnetic flow regulator to respective ones of a plurality of the nuclear fission modules.

39. The method of claim 36, further comprising flowing at least one portion of an electrically conductive reactor coolant to bypass the nuclear fission module.

40. The method of claim 36, further comprising:
sensing at least one operating parameter associated with the nuclear fission module.

41. The method of claim 40, wherein electromagnetically regulating flow of the electrically conductive reactor coolant to the nuclear fission module with an electromagnetic flow regulator operatively coupled to the nuclear fission module includes electromagnetically regulating flow of the electrically conductive reactor coolant to the nuclear fission module with an electromagnetic flow regulator operatively coupled to the nuclear fission module and responsive to the at least one operating parameter associated with the nuclear fission module.

42. The method of claim 41, wherein the operating parameter associated with the nuclear fission module includes at least one parameter chosen from temperature, neutron flux, neutron fluence, power, pressure, and flow rate of the electrically conductive reactor coolant.

43. The method of claim 36, further comprising generating a burn wave with the nuclear fission module, the burn wave having a width.

44. The method of claim 43, wherein electromagnetically regulating flow of the electrically conductive reactor coolant to the nuclear fission module with an electromagnetic flow regulator operatively coupled to the nuclear fission module includes electromagnetically regulating flow of the electrically conductive reactor coolant to the nuclear fission module with an electromagnetic flow regulator operatively coupled to the nuclear fission module in response to the burn wave.

45. The method of claim 44, wherein electromagnetically regulating flow of the electrically conductive reactor coolant to the nuclear fission module with an electromagnetic flow regulator operatively coupled to the nuclear fission module in response to the burn wave includes electromagnetically regulating flow of the electrically conductive reactor coolant to the nuclear fission module with an electromagnetic flow regulator operatively coupled to the nuclear fission module in response to the width of the burn wave.

46. The method of claim 36, wherein flowing electrically conductive reactor coolant to a nuclear fission module in a nuclear fission reactor includes flowing electrically conductive reactor coolant to a plurality of nuclear fission modules defining a reactor core having a coolant flow zone.

47. The method of claim 36, wherein flowing electrically conductive reactor coolant to a nuclear fission module in a nuclear fission reactor includes flowing electrically conductive reactor coolant to a plurality of nuclear fission modules defining a reactor core having a single coolant flow zone.

48. The method of claim 36, wherein flowing electrically conductive reactor coolant to a nuclear fission module in a nuclear fission reactor includes flowing electrically conductive reactor coolant to a plurality of nuclear fission modules defining a reactor core having a plurality of coolant flow zones.

49. The method of claim 48, wherein a single electromagnetic flow regulator flows electrically conductive reactor coolant to each of the plurality of coolant flow zones.

50. The method of claim 48, wherein a plurality of electromagnetic flow regulators flow electrically conductive reactor coolant to each of the plurality of coolant flow zones.

51. The method of claim 36, wherein flowing electrically conductive reactor coolant to a nuclear fission module in a nuclear fission reactor includes flowing electrically conductive reactor coolant to a plurality of nuclear fission modules defining a reactor core having a plurality of coolant flow zones separated by respective ones of a plurality of partitions.

* * * * *